United States Patent
Haller et al.

(10) Patent No.: US 10,115,155 B1
(45) Date of Patent: *Oct. 30, 2018

(54) MULTI-BUREAU CREDIT FILE FREEZE AND UNFREEZE

(71) Applicant: Experian Information Solutions, Inc., Costa Mesa, CA (US)

(72) Inventors: Eric Haller, Escondido, CA (US); Kelly Kent, Newport Beach, CA (US)

(73) Assignee: EXPERIAN INFORMATION SOLUTION, INC., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/704,289

(22) Filed: Sep. 14, 2017

Related U.S. Application Data

(63) Continuation of application No. 15/344,003, filed on Nov. 4, 2016, now Pat. No. 9,792,648, which is a
(Continued)

(51) Int. Cl.
G06Q 40/02 (2012.01)
G06F 21/62 (2013.01)

(52) U.S. Cl.
CPC ....... *G06Q 40/025* (2013.01); *G06F 21/6245* (2013.01)

(58) Field of Classification Search
CPC ...................................... G06F 40/02
See application file for complete search history.

(56) References Cited

U.S. PATENT DOCUMENTS

| 3,316,395 A | 4/1967 | Lavin et al. |
| 3,405,457 A | 10/1968 | Bitzer |

(Continued)

FOREIGN PATENT DOCUMENTS

| CN | 101452555 | 6/2009 |
| CN | 102096886 | 6/2011 |

(Continued)

OTHER PUBLICATIONS

International Search Report and Written Opinion for Application No. PCT/US2017/048265, dated Dec. 5, 2017.
(Continued)

*Primary Examiner* — Chikaodinaka Ojiaku
(74) *Attorney, Agent, or Firm* — Knobbe Martens Olson & Bear LLP

(57) ABSTRACT

The systems and methods described herein allow consumers to lock or unlock their credit files at multiple credit bureaus in real-time or near real-time. The service may allow a consumer to provide identifying information, such as a personal identifier to lock or unlock credit files at a plurality of credit bureaus over a network. Upon receiving the personal identifier, the system may use the personal identifier to translate the identifier into a plurality of access codes for respective credit bureaus, for example by accessing a data structure, such as a database or table, that stores a personal identifier and access codes that are associated with a consumer. The system may then use the access codes to automatically initiate locking or unlocking of credit files for the consumer at the respective credit bureaus.

7 Claims, 8 Drawing Sheets

Related U.S. Application Data continuation of application No. 15/015,407, filed on Feb. 4, 2016, now Pat. No. 9,489,694, which is a continuation of application No. 12/541,835, filed on Aug. 14, 2009, now Pat. No. 9,256,904.

(60) Provisional application No. 61/088,905, filed on Aug. 14, 2008.

(56) References Cited

U.S. PATENT DOCUMENTS

| | | |
|---|---|---|
| 4,346,442 A | 8/1982 | Musmanno |
| 4,491,725 A | 1/1985 | Pritchard |
| 4,734,858 A | 3/1988 | Schlafly |
| 4,736,294 A | 4/1988 | Gill |
| 4,755,940 A | 7/1988 | Brachtl et al. |
| 4,774,664 A | 9/1988 | Campbell et al. |
| 4,812,628 A | 3/1989 | Boston et al. |
| 4,872,113 A | 10/1989 | Dinerstein |
| 4,876,592 A | 10/1989 | Von Kohorn |
| 4,891,503 A | 1/1990 | Jewell |
| 4,895,518 A | 1/1990 | Arnold |
| 4,947,028 A | 8/1990 | Gorog |
| 4,977,595 A | 12/1990 | Ohta et al. |
| 4,989,141 A | 1/1991 | Lyons et al. |
| 5,034,807 A | 7/1991 | Von Kohorn |
| 5,148,365 A | 9/1992 | Dembo |
| 5,220,501 A | 6/1993 | Lawlor et al. |
| 5,239,462 A | 8/1993 | Jones et al. |
| 5,259,766 A | 11/1993 | Sack |
| 5,262,941 A | 11/1993 | Saladin |
| 5,274,547 A | 12/1993 | Zoffel et al. |
| 5,301,105 A | 4/1994 | Cummings, Jr. |
| 5,336,870 A | 8/1994 | Hughes et al. |
| 5,383,113 A | 1/1995 | Kight et al. |
| 5,404,518 A | 4/1995 | Gilbertson et al. |
| 5,500,513 A | 3/1996 | Langhans et al. |
| 5,557,514 A | 9/1996 | Seare et al. |
| 5,583,760 A | 12/1996 | Klesse |
| 5,590,038 A | 12/1996 | Pitroda |
| 5,592,560 A | 1/1997 | Deaton et al. |
| 5,611,052 A | 3/1997 | Dykstra et al. |
| 5,615,408 A | 3/1997 | Johnson |
| 5,640,577 A | 6/1997 | Scharmer |
| 5,644,778 A | 7/1997 | Burks et al. |
| 5,649,114 A | 7/1997 | Deaton et al. |
| 5,659,725 A * | 8/1997 | Levy .................. G06F 17/30454 |
| 5,659,731 A | 8/1997 | Gustafson |
| 5,696,907 A | 12/1997 | Tom |
| 5,699,527 A | 12/1997 | Davidson |
| 5,704,029 A | 12/1997 | Wright, Jr. |
| 5,704,044 A | 12/1997 | Tarter et al. |
| 5,719,941 A | 2/1998 | Swift et al. |
| 5,732,400 A | 3/1998 | Mandler |
| 5,739,512 A | 4/1998 | Tognazzini |
| 5,754,632 A | 5/1998 | Smith |
| 5,754,939 A | 5/1998 | Herz et al. |
| 5,764,923 A | 6/1998 | Tallman et al. |
| 5,774,883 A | 6/1998 | Andersen |
| 5,793,972 A | 8/1998 | Shane |
| 5,819,234 A | 10/1998 | Slavin et al. |
| 5,819,291 A | 10/1998 | Haimowitz et al. |
| 5,822,410 A | 10/1998 | McCausland et al. |
| 5,828,837 A | 10/1998 | Eikland |
| 5,832,068 A | 11/1998 | Smith |
| 5,832,447 A | 11/1998 | Rieker et al. |
| 5,842,211 A | 11/1998 | Horadan et al. |
| 5,844,218 A | 12/1998 | Kawan et al. |
| 5,870,721 A | 2/1999 | Norris |
| 5,875,236 A | 2/1999 | Jankowitz |
| 5,878,403 A | 3/1999 | DeFrancesco |
| 5,881,131 A | 3/1999 | Farris et al. |
| 5,884,287 A | 3/1999 | Edesess |
| 5,884,302 A | 3/1999 | Ho |
| 5,903,830 A | 5/1999 | Joao et al. |
| 5,903,881 A | 5/1999 | Schrader et al. |
| 5,907,828 A | 5/1999 | Meyer et al. |
| 5,924,082 A | 7/1999 | Silverman et al. |
| 5,926,800 A | 7/1999 | Baronowski et al. |
| 5,930,759 A | 7/1999 | Moore et al. |
| 5,930,764 A | 7/1999 | Melchione et al. |
| 5,930,776 A | 7/1999 | Dykstra et al. |
| 5,933,809 A | 8/1999 | Hunt et al. |
| 5,940,812 A | 8/1999 | Tengel et al. |
| 5,950,172 A | 9/1999 | Klingman |
| 5,950,179 A | 9/1999 | Buchanan et al. |
| 5,956,693 A | 9/1999 | Geerlings |
| 5,960,430 A | 9/1999 | Haimowitz et al. |
| 5,961,593 A | 10/1999 | Gabber et al. |
| 5,963,939 A | 10/1999 | McCann et al. |
| 5,966,695 A | 10/1999 | Melchione et al. |
| 5,966,699 A | 10/1999 | Zandi |
| 5,970,478 A | 10/1999 | Walker et al. |
| 5,978,780 A | 11/1999 | Watson |
| 5,995,947 A | 11/1999 | Fraser et al. |
| 5,999,596 A | 12/1999 | Walker et al. |
| 6,006,333 A | 12/1999 | Nielsen |
| 6,009,415 A | 12/1999 | Shurling et al. |
| 6,014,632 A | 1/2000 | Gamble et al. |
| 6,018,723 A | 1/2000 | Siegel et al. |
| 6,021,397 A | 2/2000 | Jones et al. |
| 6,021,943 A | 2/2000 | Chastain |
| 6,026,440 A | 2/2000 | Shrader et al. |
| 6,029,149 A | 2/2000 | Dykstra et al. |
| 6,038,551 A | 3/2000 | Barlow et al. |
| 6,044,351 A | 3/2000 | Jones |
| 6,044,352 A | 3/2000 | Deavers |
| 6,064,987 A | 5/2000 | Walker |
| 6,064,990 A | 5/2000 | Goldsmith |
| 6,067,522 A | 5/2000 | Warady et al. |
| 6,070,141 A | 5/2000 | Houvener |
| 6,070,241 A | 5/2000 | Edwards et al. |
| 6,072,894 A | 6/2000 | Payne |
| 6,073,104 A | 6/2000 | Field |
| 6,073,106 A | 6/2000 | Rozen et al. |
| 6,073,140 A | 6/2000 | Morgan et al. |
| 6,085,242 A | 7/2000 | Chandra |
| 6,088,686 A | 7/2000 | Walker et al. |
| 6,094,643 A | 7/2000 | Anderson et al. |
| 6,098,052 A | 8/2000 | Kosiba et al. |
| 6,105,007 A | 8/2000 | Norris |
| 6,108,641 A | 8/2000 | Kenna et al. |
| 6,115,690 A | 9/2000 | Wong |
| 6,119,103 A | 9/2000 | Basch et al. |
| 6,128,599 A | 10/2000 | Walker |
| 6,128,602 A | 10/2000 | Northington et al. |
| 6,128,603 A | 10/2000 | Dent |
| 6,129,273 A | 10/2000 | Shah |
| 6,144,948 A | 11/2000 | Walker et al. |
| 6,149,441 A | 11/2000 | Pellegrino et al. |
| 6,154,729 A | 11/2000 | Cannon et al. |
| 6,157,707 A | 12/2000 | Baulier et al. |
| 6,161,139 A | 12/2000 | Win et al. |
| 6,163,770 A | 12/2000 | Gamble et al. |
| 6,171,112 B1 | 1/2001 | Clark et al. |
| 6,178,420 B1 | 1/2001 | Sassano |
| 6,182,068 B1 | 1/2001 | Culliss |
| 6,182,229 B1 * | 1/2001 | Nielsen .................. G06F 21/41 713/170 |
| 6,185,543 B1 | 2/2001 | Galperin et al. |
| 6,202,053 B1 | 3/2001 | Christiansen et al. |
| 6,208,973 B1 | 3/2001 | Boyer et al. |
| 6,233,566 B1 | 5/2001 | Levine et al. |
| 6,249,770 B1 | 6/2001 | Erwin et al. |
| 6,253,202 B1 | 6/2001 | Gilmour |
| 6,253,203 B1 | 6/2001 | O'Flaherty et al. |
| 6,254,000 B1 | 7/2001 | Degen et al. |
| 6,263,447 B1 | 7/2001 | French et al. |
| 6,269,369 B1 | 7/2001 | Robertson |
| 6,275,824 B1 | 8/2001 | O'Flaherty et al. |
| 6,282,658 B2 | 8/2001 | French et al. |
| 6,298,348 B1 | 10/2001 | Eldering |
| 6,304,860 B1 | 10/2001 | Martin et al. |
| 6,311,169 B2 | 10/2001 | Duhon |

(56) References Cited

U.S. PATENT DOCUMENTS

| | | |
|---|---|---|
| 6,321,205 B1 | 11/2001 | Eder |
| 6,321,339 B1 | 11/2001 | French et al. |
| 6,324,524 B1 | 11/2001 | Lent et al. |
| 6,327,578 B1 | 12/2001 | Linehan |
| 6,330,575 B1 | 12/2001 | Moore et al. |
| 6,343,279 B1 | 1/2002 | Bissonette et al. |
| 6,353,778 B1 | 3/2002 | Brown |
| 6,356,937 B1 | 3/2002 | Montville et al. |
| 6,374,229 B1 | 4/2002 | Lowrey et al. |
| 6,374,230 B1 | 4/2002 | Walker et al. |
| 6,384,844 B1 | 5/2002 | Stewart et al. |
| 6,385,594 B1 | 5/2002 | Lebda et al. |
| 6,386,444 B1 | 5/2002 | Sullivan |
| 6,393,406 B1 | 5/2002 | Eder |
| 6,397,197 B1 | 5/2002 | Gindlesperger |
| 6,397,212 B1 | 5/2002 | Biffar |
| 6,397,224 B1 | 5/2002 | Zubeldia et al. |
| 6,405,173 B1 | 6/2002 | Honarvar |
| 6,405,181 B2 | 6/2002 | Lent et al. |
| 6,421,675 B1 | 7/2002 | Ryan et al. |
| 6,422,462 B1 | 7/2002 | Cohen |
| 6,424,878 B1 | 7/2002 | Barker et al. |
| 6,453,297 B1 | 9/2002 | Burks et al. |
| 6,453,353 B1 | 9/2002 | Win et al. |
| 6,456,983 B1 | 9/2002 | Keyes et al. |
| 6,457,012 B1 | 9/2002 | Jatkowski |
| 6,463,533 B1 | 10/2002 | Calamera et al. |
| 6,496,827 B2 | 12/2002 | Kozam et al. |
| 6,496,936 B1 | 12/2002 | French et al. |
| 6,513,018 B1 | 1/2003 | Culhane |
| 6,523,021 B1 | 2/2003 | Monberg et al. |
| 6,523,041 B1 | 2/2003 | Morgan et al. |
| 6,532,450 B1 | 3/2003 | Brown et al. |
| 6,539,377 B1 | 3/2003 | Culliss |
| 6,539,392 B1 | 3/2003 | Rebane |
| 6,543,683 B2 | 4/2003 | Hoffman |
| 6,564,210 B1 | 5/2003 | Korda et al. |
| 6,567,791 B2 | 5/2003 | Lent et al. |
| 6,571,236 B1 | 5/2003 | Ruppelt |
| 6,574,736 B1 | 6/2003 | Andrews |
| 6,581,025 B2 | 6/2003 | Lehman |
| 6,581,059 B1 | 6/2003 | Barrett et al. |
| 6,587,841 B1 | 7/2003 | DeFrancesco |
| 6,598,030 B1 | 7/2003 | Siegel et al. |
| 6,601,173 B1 | 7/2003 | Mohler |
| 6,611,816 B2 | 8/2003 | Lebda et al. |
| 6,615,193 B1 | 9/2003 | Kingdon et al. |
| 6,622,131 B1 | 9/2003 | Brown et al. |
| 6,629,245 B1 | 9/2003 | Stone et al. |
| 6,647,383 B1 | 11/2003 | August et al. |
| 6,658,393 B1 | 12/2003 | Basch et al. |
| 6,665,715 B1 | 12/2003 | Houri |
| 6,678,694 B1 | 1/2004 | Zimmermann et al. |
| 6,684,093 B2 | 1/2004 | Kuth |
| 6,703,930 B2 | 3/2004 | Skinner |
| 6,714,944 B1 | 3/2004 | Shapiro et al. |
| 6,725,381 B1 | 4/2004 | Smith et al. |
| 6,734,886 B1 | 5/2004 | Hagan et al. |
| 6,745,938 B2 | 6/2004 | Sullivan |
| 6,750,985 B2 | 6/2004 | Rhoads |
| 6,754,665 B1 | 6/2004 | Futagami et al. |
| 6,766,327 B2 | 7/2004 | Morgan, Jr. et al. |
| 6,766,946 B2 | 7/2004 | Iida et al. |
| 6,781,608 B1 | 8/2004 | Crawford |
| 6,782,379 B2 | 8/2004 | Lee |
| 6,792,088 B2 | 9/2004 | Takeuchi |
| 6,792,263 B1 | 9/2004 | Kite |
| 6,796,497 B2 | 9/2004 | Benkert et al. |
| 6,804,346 B1 | 10/2004 | Mewhinney |
| 6,805,287 B2 | 10/2004 | Bishop et al. |
| 6,807,533 B1 | 10/2004 | Land et al. |
| 6,816,850 B2 | 11/2004 | Culliss |
| 6,816,871 B2 | 11/2004 | Lee |
| 6,823,319 B1 | 11/2004 | Lynch et al. |
| 6,826,535 B2 | 11/2004 | Wood et al. |
| 6,845,448 B1 | 1/2005 | Chaganti et al. |
| 6,847,942 B1 | 1/2005 | Land et al. |
| 6,857,073 B2 | 2/2005 | French et al. |
| 6,871,287 B1 | 3/2005 | Ellingson |
| 6,873,972 B1 | 3/2005 | Marcial et al. |
| 6,892,307 B1 | 5/2005 | Wood et al. |
| 6,901,406 B2 | 5/2005 | Nabe et al. |
| 6,910,624 B1 | 6/2005 | Natsuno |
| 6,928,487 B2 | 8/2005 | Eggebraaten et al. |
| 6,934,714 B2 | 8/2005 | Meinig |
| 6,941,323 B1 | 9/2005 | Galperin |
| 6,947,989 B2 | 9/2005 | Gullotta et al. |
| 6,950,807 B2 | 9/2005 | Brock |
| 6,950,858 B2 | 9/2005 | Ogami |
| 6,954,757 B2 | 10/2005 | Zargham et al. |
| 6,962,336 B2 | 11/2005 | Glass |
| 6,965,881 B1 | 11/2005 | Brickell et al. |
| 6,968,319 B1 | 11/2005 | Remington et al. |
| 6,973,462 B2 | 12/2005 | Dattero et al. |
| 6,983,379 B1 | 1/2006 | Spalink et al. |
| 6,985,887 B1 | 1/2006 | Sunstein et al. |
| 6,988,085 B2 | 1/2006 | Hedy |
| 6,999,941 B1 | 2/2006 | Agarwal |
| 7,003,491 B2 | 2/2006 | Starkman |
| 7,016,907 B2 | 3/2006 | Boreham et al. |
| 7,028,013 B2 | 4/2006 | Saeki |
| 7,028,052 B2 | 4/2006 | Chapman et al. |
| 7,039,607 B2 | 5/2006 | Watarai et al. |
| 7,043,476 B2 | 5/2006 | Robson |
| 7,046,139 B2 | 5/2006 | Kuhn et al. |
| 7,058,386 B2 | 6/2006 | McGregor et al. |
| 7,058,817 B1 | 6/2006 | Ellmore |
| 7,062,475 B1 | 6/2006 | Szabo et al. |
| 7,065,566 B2 | 6/2006 | Menard et al. |
| 7,069,240 B2 | 6/2006 | Spero et al. |
| 7,069,249 B2 | 6/2006 | Stolfo et al. |
| 7,072,842 B2 | 7/2006 | Provost et al. |
| 7,072,909 B2 | 7/2006 | Polk |
| 7,076,462 B1 | 7/2006 | Nelson et al. |
| 7,076,475 B2 | 7/2006 | Honarvar et al. |
| 7,085,727 B2 | 8/2006 | VanOrman |
| 7,089,594 B2 | 8/2006 | Lal et al. |
| 7,107,241 B1 | 9/2006 | Pinto |
| 7,124,144 B2 | 10/2006 | Christianson et al. |
| 7,133,840 B1 | 11/2006 | Kenna et al. |
| 7,133,935 B2 | 11/2006 | Hedy |
| 7,143,063 B2 | 11/2006 | Lent |
| 7,155,739 B2 | 12/2006 | Bari et al. |
| 7,171,371 B2 | 1/2007 | Goldstein |
| 7,174,302 B2 | 2/2007 | Patricelli et al. |
| 7,181,418 B1 | 2/2007 | Zucker et al. |
| 7,181,427 B1 | 2/2007 | DeFrancesco |
| 7,188,169 B2 | 3/2007 | Buus et al. |
| 7,191,150 B1 | 3/2007 | Shao et al. |
| 7,191,451 B2 | 3/2007 | Nakagawa |
| 7,194,416 B1 | 3/2007 | Provost et al. |
| 7,197,468 B1 | 3/2007 | Patricelli et al. |
| 7,200,602 B2 | 4/2007 | Jonas |
| 7,206,768 B1 | 4/2007 | deGroeve et al. |
| 7,209,895 B2 | 4/2007 | Kundtz et al. |
| 7,212,995 B2 | 5/2007 | Schulkins |
| 7,218,912 B2 | 5/2007 | Erskine et al. |
| 7,219,107 B2 | 5/2007 | Beringer |
| 7,222,369 B2 | 5/2007 | Vering et al. |
| 7,234,156 B2 | 6/2007 | French et al. |
| 7,234,160 B2 | 6/2007 | Vogel et al. |
| 7,236,950 B2 | 6/2007 | Savage et al. |
| 7,243,369 B2 | 7/2007 | Bhat et al. |
| 7,246,067 B2 | 7/2007 | Austin et al. |
| 7,246,068 B2 | 7/2007 | Thomas, Jr. |
| 7,246,740 B2 | 7/2007 | Swift et al. |
| 7,249,076 B1 | 7/2007 | Pendleton et al. |
| 7,249,113 B1 | 7/2007 | Continelli et al. |
| 7,251,625 B2 | 7/2007 | Anglum |
| 7,263,497 B1 | 8/2007 | Wiser et al. |
| 7,277,869 B2 | 10/2007 | Starkman |
| 7,280,980 B1 | 10/2007 | Hoadley et al. |
| 7,281,652 B2 | 10/2007 | Foss |
| 7,289,971 B1 | 10/2007 | O'Neil et al. |

(56) References Cited

U.S. PATENT DOCUMENTS

| | | | |
|---|---|---|---|
| 7,295,988 B1 | 11/2007 | Reeves |
| 7,296,734 B2 | 11/2007 | Pliha |
| 7,298,872 B2 | 11/2007 | Glisson |
| 7,302,272 B2 | 11/2007 | Ackley |
| 7,302,420 B2 | 11/2007 | Aggarwal et al. |
| 7,305,359 B2 | 12/2007 | Bonnell |
| 7,310,611 B2 | 12/2007 | Shibuya et al. |
| 7,310,617 B1 | 12/2007 | Cunningham |
| 7,313,538 B2 | 12/2007 | Wilmes et al. |
| 7,314,167 B1 | 1/2008 | Kiliccote |
| 7,315,837 B2 | 1/2008 | Sloan et al. |
| 7,328,233 B2 | 2/2008 | Salim et al. |
| 7,328,276 B2 | 2/2008 | Alisuag |
| 7,330,717 B2 | 2/2008 | Gidron et al. |
| 7,330,835 B2 | 2/2008 | Deggendorf |
| 7,333,635 B2 | 2/2008 | Tsantes et al. |
| 7,333,937 B2 | 2/2008 | Baldwin, Jr. et al. |
| 7,337,133 B1 | 2/2008 | Bezos et al. |
| 7,337,468 B2 | 2/2008 | Metzger |
| 7,340,424 B2 | 3/2008 | Gang et al. |
| 7,340,434 B2 | 3/2008 | Schnall |
| 7,340,679 B2 | 3/2008 | Botscheck et al. |
| 7,343,149 B2 | 3/2008 | Benco |
| 7,343,295 B2 | 3/2008 | Pomerance |
| 7,346,576 B2 | 3/2008 | Lent et al. |
| 7,356,516 B2 | 4/2008 | Richey et al. |
| 7,366,694 B2 | 4/2008 | Lazerson |
| 7,370,044 B2 | 5/2008 | Mulhern et al. |
| 7,373,324 B1 | 5/2008 | Engin et al. |
| 7,379,913 B2 | 5/2008 | Steele et al. |
| 7,380,707 B1 | 6/2008 | Fredman |
| 7,383,988 B2 | 6/2008 | Slonecker, Jr. |
| 7,386,511 B2 | 6/2008 | Buchanan et al. |
| 7,389,913 B2 | 6/2008 | Starrs |
| 7,392,216 B1 | 6/2008 | Palmgren et al. |
| 7,395,273 B2 | 7/2008 | Khan et al. |
| 7,403,923 B2 | 7/2008 | Elliott et al. |
| 7,403,942 B1 | 7/2008 | Bayliss |
| 7,409,369 B1 | 8/2008 | Homuth et al. |
| 7,412,228 B2 | 8/2008 | Barclay et al. |
| 7,433,864 B2 | 10/2008 | Malik |
| 7,437,679 B2 | 10/2008 | Uemura et al. |
| 7,444,518 B1 | 10/2008 | Dharmarajan et al. |
| 7,451,095 B1 | 11/2008 | Bradley et al. |
| 7,451,113 B1 | 11/2008 | Kasower |
| 7,458,508 B1 | 12/2008 | Shao et al. |
| 7,460,857 B2 | 12/2008 | Roach, Jr. |
| 7,467,401 B2 | 12/2008 | Cicchitto |
| 7,475,032 B1 | 1/2009 | Patnode et al. |
| 7,478,157 B2 | 1/2009 | Bohrer et al. |
| 7,479,949 B2 | 1/2009 | Jobs et al. |
| 7,480,631 B1 | 1/2009 | Merced et al. |
| 7,490,356 B2 | 2/2009 | Lieblich et al. |
| 7,503,489 B2 | 3/2009 | Heffez |
| 7,505,939 B2 | 3/2009 | Lent et al. |
| 7,509,117 B2 | 3/2009 | Yum |
| 7,512,221 B2 | 3/2009 | Toms |
| 7,527,967 B2 | 5/2009 | Chao et al. |
| 7,529,698 B2 | 5/2009 | Joao |
| 7,530,097 B2 | 5/2009 | Casco-Arias et al. |
| 7,536,329 B2 | 5/2009 | Goldberg et al. |
| 7,536,346 B2 | 5/2009 | Aliffi et al. |
| 7,536,348 B2 | 5/2009 | Shao et al. |
| 7,542,993 B2 | 6/2009 | Satterfield et al. |
| 7,543,739 B2 | 6/2009 | Brown et al. |
| 7,546,271 B1 | 6/2009 | Chmielewski et al. |
| 7,548,886 B2 | 6/2009 | Kirkland et al. |
| 7,552,086 B1 | 6/2009 | Rajasekar et al. |
| 7,552,089 B2 | 6/2009 | Bruer et al. |
| 7,552,467 B2 | 6/2009 | Lindsay |
| 7,556,192 B2 | 7/2009 | Wokaty, Jr. |
| 7,559,217 B2 | 7/2009 | Bass |
| 7,562,184 B2 | 7/2009 | Henmi et al. |
| 7,562,814 B1 | 7/2009 | Shao et al. |
| 7,571,138 B2 | 8/2009 | Miri et al. |
| 7,571,473 B1 | 8/2009 | Boydstun et al. |
| 7,575,157 B2 | 8/2009 | Barnhardt et al. |
| 7,577,665 B2 | 8/2009 | Ramer et al. |
| 7,577,934 B2 | 8/2009 | Anonsen et al. |
| 7,580,884 B2 | 8/2009 | Cook |
| 7,581,112 B2 | 8/2009 | Brown et al. |
| 7,584,127 B2 | 9/2009 | Byrne et al. |
| 7,584,146 B1 | 9/2009 | Duhon |
| 7,587,366 B2 | 9/2009 | Grim, III et al. |
| 7,587,368 B2 | 9/2009 | Felsher |
| 7,593,889 B2 | 9/2009 | Raines et al. |
| 7,593,891 B2 | 9/2009 | Kornegay et al. |
| 7,594,019 B2 | 9/2009 | Clapper |
| 7,603,317 B2 | 10/2009 | Adler et al. |
| 7,603,701 B2 | 10/2009 | Gaucas |
| 7,606,725 B2 | 10/2009 | Robertson et al. |
| 7,610,216 B1 | 10/2009 | May et al. |
| 7,610,229 B1 | 10/2009 | Kornegay |
| 7,613,600 B2 | 11/2009 | Krane |
| 7,617,116 B2 | 11/2009 | Amar et al. |
| 7,620,596 B2 | 11/2009 | Knudson et al. |
| 7,623,844 B2 | 11/2009 | Herrmann et al. |
| 7,630,932 B2 | 12/2009 | Danaher et al. |
| 7,630,933 B2 | 12/2009 | Peterson et al. |
| 7,634,737 B2 | 12/2009 | Beringer et al. |
| 7,640,200 B2 | 12/2009 | Gardner et al. |
| 7,647,274 B2 | 1/2010 | Peterson et al. |
| 7,647,344 B2 | 1/2010 | Skurtovich, Jr. et al. |
| 7,653,592 B1 | 1/2010 | Flaxman et al. |
| 7,653,600 B2 | 1/2010 | Gustin |
| 7,653,688 B2 | 1/2010 | Bittner |
| 7,672,833 B2 | 3/2010 | Blume et al. |
| 7,676,410 B2 | 3/2010 | Petralia |
| 7,676,418 B1 | 3/2010 | Chung et al. |
| 7,685,209 B1 | 3/2010 | Norton et al. |
| 7,686,214 B1 | 3/2010 | Shao et al. |
| 7,688,813 B2 | 3/2010 | Shin et al. |
| 7,689,487 B1 | 3/2010 | Britto et al. |
| 7,689,505 B2 | 3/2010 | Kasower |
| 7,689,563 B1 | 3/2010 | Jacobson |
| 7,690,032 B1 | 3/2010 | Peirce |
| 7,693,787 B2 | 4/2010 | Provinse |
| 7,698,214 B1 | 4/2010 | Lindgren |
| 7,698,217 B1 | 4/2010 | Phillips et al. |
| 7,698,445 B2 | 4/2010 | Fitzpatrick et al. |
| 7,707,102 B2 | 4/2010 | Rothstein |
| 7,707,122 B2 | 4/2010 | Hull et al. |
| 7,707,271 B2 | 4/2010 | Rudkin et al. |
| 7,708,190 B2 | 5/2010 | Brandt et al. |
| 7,711,635 B2 | 5/2010 | Steele et al. |
| 7,711,636 B2 | 5/2010 | Robida et al. |
| 7,715,832 B2 | 5/2010 | Zhou |
| 7,720,750 B2 | 5/2010 | Brody |
| 7,725,385 B2 | 5/2010 | Royer et al. |
| 7,729,959 B1 | 6/2010 | Wells et al. |
| 7,730,078 B2 | 6/2010 | Schwabe et al. |
| 7,739,139 B2 | 6/2010 | Robertson et al. |
| 7,739,707 B2 | 6/2010 | Sie et al. |
| 7,747,520 B2 | 6/2010 | Livermore et al. |
| 7,747,521 B2 | 6/2010 | Serio |
| 7,747,559 B2 | 6/2010 | Leitner et al. |
| 7,756,789 B2 | 7/2010 | Welker et al. |
| 7,761,384 B2 | 7/2010 | Madhogarhia |
| 7,765,148 B2 | 7/2010 | German et al. |
| 7,765,166 B2 | 7/2010 | Beringer et al. |
| 7,765,311 B2 | 7/2010 | Itabashi et al. |
| 7,769,696 B2 | 8/2010 | Yoda |
| 7,769,697 B2 | 8/2010 | Fieschi et al. |
| 7,774,257 B2 | 8/2010 | Maggioncalda et al. |
| 7,774,270 B1 | 8/2010 | MacCloskey |
| 7,783,515 B1 | 8/2010 | Kumar et al. |
| 7,783,562 B1 | 8/2010 | Ellis |
| 7,787,869 B2 | 8/2010 | Rice et al. |
| 7,788,040 B2 | 8/2010 | Haskell et al. |
| 7,788,147 B2 | 8/2010 | Haggerty et al. |
| 7,792,715 B1 | 9/2010 | Kasower |
| 7,792,903 B2 | 9/2010 | Fischer et al. |
| 7,793,835 B1 | 9/2010 | Coggeshall et al. |
| 7,797,252 B2 | 9/2010 | Rosskamm et al. |

(56) References Cited

U.S. PATENT DOCUMENTS

| | | | |
|---|---|---|---|
| 7,797,725 B2 | 9/2010 | Lunt et al. |
| 7,801,807 B2 | 9/2010 | DeFrancesco et al. |
| 7,801,811 B1 | 9/2010 | Merrell et al. |
| 7,801,956 B1 | 9/2010 | Cumberbatch et al. |
| 7,802,104 B2 | 9/2010 | Dickinson |
| 7,805,345 B2 | 9/2010 | Abrahams et al. |
| 7,805,362 B1 | 9/2010 | Merrell et al. |
| 7,809,398 B2 | 10/2010 | Pearson |
| 7,809,797 B2 | 10/2010 | Cooley et al. |
| 7,810,036 B2 | 10/2010 | Bales et al. |
| 7,814,004 B2 | 10/2010 | Haggerty et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,827,115 B2 | 11/2010 | Weller et al. |
| 7,832,006 B2 | 11/2010 | Chen et al. |
| 7,835,983 B2 | 11/2010 | Lefner et al. |
| 7,836,111 B1 | 11/2010 | Shan |
| 7,840,484 B2 | 11/2010 | Haggerty et al. |
| 7,841,004 B1 | 11/2010 | Balducci et al. |
| 7,841,008 B1 | 11/2010 | Cole et al. |
| 7,844,520 B1 | 11/2010 | Franklin |
| 7,844,604 B2 | 11/2010 | Baio et al. |
| 7,848,972 B1 | 12/2010 | Sharma |
| 7,848,978 B2 | 12/2010 | Imrey et al. |
| 7,849,004 B2 | 12/2010 | Choudhuri et al. |
| 7,849,014 B2 | 12/2010 | Erikson |
| 7,853,493 B2 | 12/2010 | DeBie et al. |
| 7,853,518 B2 | 12/2010 | Cagan |
| 7,853,984 B2 | 12/2010 | Antell et al. |
| 7,856,203 B2 | 12/2010 | Lipovski |
| 7,856,386 B2 | 12/2010 | Hazlehurst et al. |
| 7,860,786 B2 | 12/2010 | Blackburn et al. |
| 7,870,078 B2 | 1/2011 | Clark et al. |
| 7,877,304 B1 | 1/2011 | Coulter |
| 7,877,784 B2 | 1/2011 | Chow et al. |
| 7,880,728 B2 | 2/2011 | de Los Reyes et al. |
| 7,890,420 B2 | 2/2011 | Haggerty et al. |
| 7,899,750 B1 | 3/2011 | Klieman et al. |
| 7,900,052 B2 | 3/2011 | Joans |
| 7,904,306 B2 | 3/2011 | Johnson et al. |
| 7,904,367 B2 | 3/2011 | Chung et al. |
| 7,908,242 B1 | 3/2011 | Achanta |
| 7,909,246 B2 | 3/2011 | Hogg et al. |
| 7,912,865 B2 | 3/2011 | Akerman et al. |
| 7,925,582 B1 | 4/2011 | Kornegay et al. |
| 7,930,195 B2 | 4/2011 | Heyns et al. |
| 7,930,252 B2 | 4/2011 | Bender et al. |
| 7,941,363 B2 | 5/2011 | Tanaka et al. |
| 7,954,698 B1 | 6/2011 | Pliha |
| 7,958,046 B2 | 6/2011 | Doerner et al. |
| 7,966,192 B2 | 6/2011 | Pagliari et al. |
| 7,970,676 B2 | 6/2011 | Feinstein |
| 7,970,679 B2 | 6/2011 | Kasower |
| 7,970,698 B2 | 6/2011 | Gupta et al. |
| 7,975,299 B1 | 7/2011 | Balducci et al. |
| 7,979,908 B2 | 7/2011 | Millwee |
| 7,983,932 B2 | 7/2011 | Kane |
| 7,983,976 B2 | 7/2011 | Nafeh et al. |
| 7,983,979 B2 | 7/2011 | Holland, IV |
| 7,991,689 B1 | 8/2011 | Brunzell et al. |
| 8,001,034 B2 | 8/2011 | Chung et al. |
| 8,001,042 B1 | 8/2011 | Brunzell et al. |
| 8,001,043 B1 | 8/2011 | Walker et al. |
| 8,001,153 B2 | 8/2011 | Skurtovich, Jr. et al. |
| 8,001,235 B2 | 8/2011 | Russ et al. |
| 8,015,107 B2 | 9/2011 | Kornegay et al. |
| 8,032,932 B2 | 10/2011 | Speyer et al. |
| 8,037,097 B2 | 10/2011 | Guo et al. |
| 8,055,904 B1 | 11/2011 | Cato et al. |
| 8,060,424 B2 | 11/2011 | Kasower |
| 8,060,916 B2 | 11/2011 | Bajaj et al. |
| 8,065,233 B2 | 11/2011 | Lee et al. |
| 8,065,234 B2 | 11/2011 | Liao et al. |
| 8,073,768 B2 | 12/2011 | Haggerty et al. |
| 8,078,453 B2 | 12/2011 | Shaw |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,078,881 B1 | 12/2011 | Liu |
| 8,082,202 B2 | 12/2011 | Weiss |
| 8,086,523 B1 * | 12/2011 | Palmer | G06Q 40/025 705/38 |
| 8,095,443 B2 | 1/2012 | DeBie |
| 8,095,458 B2 | 1/2012 | Peterson et al. |
| 8,099,309 B1 | 1/2012 | Bober |
| 8,099,341 B2 | 1/2012 | Varghese |
| 8,104,679 B2 | 1/2012 | Brown |
| 8,127,982 B1 | 3/2012 | Casey et al. |
| 8,127,986 B1 | 3/2012 | Taylor et al. |
| 8,131,614 B2 | 3/2012 | Haggerty et al. |
| 8,131,685 B1 | 3/2012 | Gedalius et al. |
| 8,131,777 B2 | 3/2012 | McCullouch |
| 8,135,642 B1 | 3/2012 | Krause |
| 8,160,960 B1 | 4/2012 | Fei et al. |
| 8,175,889 B1 | 5/2012 | Girulat et al. |
| 8,195,549 B2 | 6/2012 | Kasower |
| 8,201,257 B1 | 6/2012 | Andres et al. |
| 8,204,774 B2 | 6/2012 | Chwast et al. |
| 8,204,812 B2 | 6/2012 | Stewart et al. |
| 8,219,535 B1 | 7/2012 | Kobori et al. |
| 8,224,723 B2 | 7/2012 | Bosch et al. |
| 8,225,395 B2 | 7/2012 | Atwood et al. |
| 8,234,498 B2 | 7/2012 | Britti et al. |
| 8,239,130 B1 | 8/2012 | Upstill et al. |
| 8,244,848 B1 | 8/2012 | Narayanan et al. |
| 8,271,393 B2 | 9/2012 | Twining et al. |
| 8,281,372 B1 | 10/2012 | Vidal |
| 8,285,613 B1 | 10/2012 | Coulter |
| 8,285,656 B1 | 10/2012 | Chang et al. |
| 8,290,840 B2 | 10/2012 | Kasower |
| 8,290,856 B1 | 10/2012 | Kasower |
| 8,296,229 B1 | 10/2012 | Yellin et al. |
| 8,312,033 B1 * | 11/2012 | McMillan | G06Q 10/10 707/758 |
| 8,315,942 B2 | 11/2012 | Haggerty et al. |
| 8,321,334 B1 * | 11/2012 | Kornegay | G06Q 20/10 705/35 |
| 8,321,339 B2 | 11/2012 | Imrey et al. |
| 8,327,429 B2 | 12/2012 | Speyer et al. |
| 8,335,741 B2 | 12/2012 | Kornegay et al. |
| 8,340,685 B2 | 12/2012 | Cochran et al. |
| 8,355,967 B2 * | 1/2013 | DeBie | G06Q 40/00 705/30 |
| 8,364,518 B1 | 1/2013 | Blake et al. |
| 8,364,588 B2 | 1/2013 | Celka et al. |
| 8,374,973 B2 | 2/2013 | Herbrich et al. |
| 8,380,618 B1 | 2/2013 | Kazenas et al. |
| 8,412,593 B1 | 4/2013 | Song et al. |
| 8,418,254 B2 | 4/2013 | Britti et al. |
| 8,433,512 B1 | 4/2013 | Lopatenko et al. |
| 8,433,648 B2 | 4/2013 | Keithley et al. |
| 8,442,886 B1 | 5/2013 | Haggerty et al. |
| 8,458,062 B2 | 6/2013 | Dutt et al. |
| 8,458,074 B2 | 6/2013 | Showalter |
| 8,464,939 B1 | 6/2013 | Taylor et al. |
| 8,473,354 B2 | 6/2013 | Psota et al. |
| 8,478,674 B1 | 7/2013 | Kapczynski et al. |
| 8,484,186 B1 | 7/2013 | Kapczynski et al. |
| 8,515,828 B1 | 8/2013 | Wolf et al. |
| 8,515,844 B2 | 8/2013 | Kasower |
| 8,533,118 B2 | 9/2013 | Weller et al. |
| 8,560,436 B2 | 10/2013 | Ingram et al. |
| 8,566,029 B1 | 10/2013 | Lopatenko et al. |
| 8,566,141 B1 | 10/2013 | Nagdev et al. |
| 8,571,971 B1 | 10/2013 | Brown et al. |
| 8,572,083 B1 | 10/2013 | Snell et al. |
| 8,578,496 B1 | 11/2013 | Krishnappa |
| 8,589,069 B1 | 11/2013 | Lehman |
| 8,589,286 B1 | 11/2013 | Kornegay et al. |
| 8,595,101 B1 | 11/2013 | Daukas et al. |
| 8,600,886 B2 | 12/2013 | Ramavarjula et al. |
| 8,601,602 B1 | 12/2013 | Zheng |
| 8,606,694 B2 | 12/2013 | Campbell et al. |

(56) References Cited

U.S. PATENT DOCUMENTS

| | | |
|---|---|---|
| 8,621,562 B2 | 12/2013 | Antell et al. |
| 8,626,618 B2 | 1/2014 | Psota et al. |
| 8,630,938 B2 | 1/2014 | Cheng et al. |
| 8,631,242 B2 | 1/2014 | Britti et al. |
| 8,639,616 B1 | 1/2014 | Rolenaitis et al. |
| 8,646,051 B2 | 2/2014 | Paden et al. |
| 8,646,101 B1 | 2/2014 | Millwee |
| 8,650,407 B2 | 2/2014 | Britti et al. |
| 8,671,107 B2 | 3/2014 | Scully et al. |
| 8,671,115 B2 | 3/2014 | Skurtovich, Jr. et al. |
| 8,694,420 B1 | 4/2014 | Oliai |
| 8,705,718 B2 | 4/2014 | Baniak et al. |
| 8,719,159 B2 | 5/2014 | Keithley |
| 8,725,613 B1 | 5/2014 | Celka et al. |
| 8,738,516 B1 | 5/2014 | Dean et al. |
| 8,744,956 B1 | 6/2014 | DiChiara et al. |
| 8,768,914 B2 | 7/2014 | Scriffignano et al. |
| 8,775,299 B2 | 7/2014 | Achanta et al. |
| 8,781,882 B1 | 7/2014 | Arboletti et al. |
| 8,781,951 B2 | 7/2014 | Lewis et al. |
| 8,781,953 B2 | 7/2014 | Kasower |
| 8,782,217 B1 | 7/2014 | Arone et al. |
| 8,806,218 B2 | 8/2014 | Hatakeda |
| 8,818,888 B1 | 8/2014 | Kapczynski et al. |
| 8,856,894 B1 | 10/2014 | Dean et al. |
| 8,930,251 B2 | 1/2015 | DeBie |
| 8,930,262 B1 | 1/2015 | Searson et al. |
| 8,930,263 B1 | 1/2015 | Mahacek et al. |
| 8,931,058 B2 | 1/2015 | DiChiara et al. |
| 8,949,981 B1 | 2/2015 | Trollope et al. |
| 8,954,459 B1 | 2/2015 | McMillan et al. |
| 8,972,400 B1 | 3/2015 | Kapczynski et al. |
| 9,043,930 B2 | 5/2015 | Britti et al. |
| 9,058,627 B1 | 6/2015 | Wasser et al. |
| 9,143,541 B1 | 9/2015 | Szamonek et al. |
| 9,147,042 B1 | 9/2015 | Haller et al. |
| 9,183,363 B1 | 11/2015 | Millwee |
| 9,251,541 B2 | 2/2016 | Celka et al. |
| 9,256,624 B2 | 2/2016 | Skurtovich, Jr. et al. |
| 9,256,904 B1 | 2/2016 | Haller et al. |
| 9,489,694 B2 | 11/2016 | Haller et al. |
| 9,553,936 B2 | 1/2017 | Dijk et al. |
| 9,652,802 B1 | 5/2017 | Kasower |
| 9,684,905 B1 | 6/2017 | Haller et al. |
| 9,697,263 B1 | 7/2017 | Girulat, Jr. |
| 9,710,523 B2 | 7/2017 | Skurtovich, Jr. et al. |
| 9,792,648 B1 | 10/2017 | Haller et al. |
| 2001/0011247 A1 | 8/2001 | O'Flaherty et al. |
| 2001/0014868 A1 | 8/2001 | Herz et al. |
| 2001/0029470 A1 | 10/2001 | Schultz et al. |
| 2001/0029482 A1 | 10/2001 | Tealdi et al. |
| 2001/0034618 A1 | 10/2001 | Kessler et al. |
| 2001/0037289 A1 | 11/2001 | Mayr et al. |
| 2001/0039523 A1 | 11/2001 | Iwamoto |
| 2001/0039532 A1 | 11/2001 | Coleman, Jr. et al. |
| 2001/0039563 A1 | 11/2001 | Tian |
| 2001/0042785 A1 | 11/2001 | Walker et al. |
| 2001/0044729 A1 | 11/2001 | Pomerance |
| 2001/0044756 A1 | 11/2001 | Watkins et al. |
| 2001/0049274 A1 | 12/2001 | Degraeve |
| 2001/0049620 A1 | 12/2001 | Blasko |
| 2002/0004736 A1 | 1/2002 | Roundtree et al. |
| 2002/0004774 A1 | 1/2002 | Defarlo |
| 2002/0010594 A1 | 1/2002 | Levine |
| 2002/0010616 A1 | 1/2002 | Itzaki |
| 2002/0013827 A1 | 1/2002 | Edstrom et al. |
| 2002/0013899 A1 | 1/2002 | Faul |
| 2002/0026519 A1 | 2/2002 | Itabashi et al. |
| 2002/0032635 A1 | 3/2002 | Harris et al. |
| 2002/0032645 A1 | 3/2002 | Nozaki et al. |
| 2002/0032647 A1 | 3/2002 | Delinsky et al. |
| 2002/0033846 A1 | 3/2002 | Balasubramanian et al. |
| 2002/0035511 A1 | 3/2002 | Haji et al. |
| 2002/0042763 A1 | 4/2002 | Pillay et al. |
| 2002/0045154 A1 | 4/2002 | Wood et al. |
| 2002/0052841 A1 | 5/2002 | Guthrie et al. |
| 2002/0055869 A1 | 5/2002 | Hegg |
| 2002/0055906 A1 | 5/2002 | Katz et al. |
| 2002/0059139 A1 | 5/2002 | Evans |
| 2002/0059201 A1 | 5/2002 | Work |
| 2002/0069122 A1 | 6/2002 | Yun et al. |
| 2002/0077964 A1 | 6/2002 | Brody et al. |
| 2002/0087460 A1 | 7/2002 | Hornung |
| 2002/0091635 A1 | 7/2002 | Dilip et al. |
| 2002/0091650 A1 | 7/2002 | Ellis |
| 2002/0099635 A1 | 7/2002 | Guiragosian |
| 2002/0099641 A1 | 7/2002 | Mills et al. |
| 2002/0099824 A1 | 7/2002 | Bender et al. |
| 2002/0103933 A1 | 8/2002 | Garon et al. |
| 2002/0107849 A1 | 8/2002 | Hickey et al. |
| 2002/0111816 A1 | 8/2002 | Lortscher et al. |
| 2002/0111890 A1 | 8/2002 | Sloan et al. |
| 2002/0119824 A1 | 8/2002 | Allen |
| 2002/0120757 A1 | 8/2002 | Sutherland et al. |
| 2002/0128962 A1 | 9/2002 | Kasower |
| 2002/0133365 A1 | 9/2002 | Grey et al. |
| 2002/0133462 A1 | 9/2002 | Shteyn |
| 2002/0138297 A1 | 9/2002 | Lee |
| 2002/0138409 A1 | 9/2002 | Bass |
| 2002/0138470 A1 | 9/2002 | Zhou |
| 2002/0143943 A1 | 10/2002 | Lee et al. |
| 2002/0147617 A1 | 10/2002 | Schoenbaum et al. |
| 2002/0147669 A1 | 10/2002 | Taylor et al. |
| 2002/0147801 A1 | 10/2002 | Gullotta et al. |
| 2002/0152166 A1 | 10/2002 | Dutta et al. |
| 2002/0156676 A1 | 10/2002 | Ahrens et al. |
| 2002/0156797 A1 | 10/2002 | Lee et al. |
| 2002/0161664 A1 | 10/2002 | Shaya et al. |
| 2002/0165757 A1 | 11/2002 | Lisser |
| 2002/0169747 A1 | 11/2002 | Chapman et al. |
| 2002/0173994 A1 | 11/2002 | Ferguson, III |
| 2002/0174048 A1 | 11/2002 | Dheer et al. |
| 2002/0184054 A1 | 12/2002 | Cox et al. |
| 2002/0188478 A1 | 12/2002 | Breeland et al. |
| 2002/0194103 A1 | 12/2002 | Nabe |
| 2002/0194120 A1 | 12/2002 | Russell et al. |
| 2002/0198800 A1 | 12/2002 | Shamrakov |
| 2002/0198806 A1* | 12/2002 | Blagg .................. G06Q 40/00 705/35 |
| 2002/0198824 A1 | 12/2002 | Cook |
| 2003/0002671 A1 | 1/2003 | Inchalik et al. |
| 2003/0009415 A1 | 1/2003 | Lutnick et al. |
| 2003/0009418 A1 | 1/2003 | Green et al. |
| 2003/0009426 A1 | 1/2003 | Ruiz-Sanchez |
| 2003/0014336 A1 | 1/2003 | Dao et al. |
| 2003/0018549 A1 | 1/2003 | Fei et al. |
| 2003/0018578 A1 | 1/2003 | Schultz |
| 2003/0023531 A1 | 1/2003 | Fergusson |
| 2003/0028402 A1 | 2/2003 | Ulrich et al. |
| 2003/0028466 A1 | 2/2003 | Jenson et al. |
| 2003/0028477 A1 | 2/2003 | Stevenson et al. |
| 2003/0036926 A1 | 2/2003 | Starkey et al. |
| 2003/0036995 A1 | 2/2003 | Lazerson |
| 2003/0037054 A1 | 2/2003 | Dutta et al. |
| 2003/0041019 A1 | 2/2003 | Vagim, III et al. |
| 2003/0041031 A1 | 2/2003 | Hedy |
| 2003/0046112 A1 | 3/2003 | Dutta et al. |
| 2003/0046311 A1 | 3/2003 | Baidya et al. |
| 2003/0050795 A1 | 3/2003 | Baldwin, Jr. et al. |
| 2003/0050796 A1 | 3/2003 | Baldwin, Jr. et al. |
| 2003/0050929 A1 | 3/2003 | Bookman et al. |
| 2003/0061104 A1 | 3/2003 | Thomson et al. |
| 2003/0061163 A1 | 3/2003 | Durfield |
| 2003/0065563 A1 | 4/2003 | Elliott et al. |
| 2003/0069839 A1 | 4/2003 | Whittington et al. |
| 2003/0069943 A1 | 4/2003 | Bahrs et al. |
| 2003/0078877 A1 | 4/2003 | Beirne et al. |
| 2003/0097342 A1 | 5/2003 | Whittingtom |
| 2003/0097380 A1 | 5/2003 | Mulhern et al. |
| 2003/0105646 A1 | 6/2003 | Siepser |
| 2003/0105733 A1 | 6/2003 | Boreham |
| 2003/0105742 A1 | 6/2003 | Boreham et al. |
| 2003/0110111 A1 | 6/2003 | Nalebuff et al. |
| 2003/0115133 A1 | 6/2003 | Bian |

(56) References Cited

U.S. PATENT DOCUMENTS

| | | | |
|---|---|---|---|
| 2003/0149659 A1* | 8/2003 | Danaher | G06Q 40/02 705/38 |
| 2003/0154162 A1 | 8/2003 | Danaher et al. | |
| 2003/0158960 A1 | 8/2003 | Engberg | |
| 2003/0163416 A1 | 8/2003 | Kitajima | |
| 2003/0163435 A1 | 8/2003 | Payone | |
| 2003/0163483 A1 | 8/2003 | Zingher et al. | |
| 2003/0163513 A1 | 8/2003 | Schaeck et al. | |
| 2003/0163733 A1 | 8/2003 | Barriga-Caceres et al. | |
| 2003/0171942 A1 | 9/2003 | Gaito | |
| 2003/0187768 A1 | 10/2003 | Ryan et al. | |
| 2003/0187837 A1 | 10/2003 | Culliss | |
| 2003/0195859 A1 | 10/2003 | Lawrence | |
| 2003/0204429 A1 | 10/2003 | Botscheck et al. | |
| 2003/0204752 A1* | 10/2003 | Garrison | G06F 21/6218 726/5 |
| 2003/0208412 A1 | 11/2003 | Hillestad et al. | |
| 2003/0220858 A1 | 11/2003 | Lam et al. | |
| 2003/0225742 A1 | 12/2003 | Tanner et al. | |
| 2003/0229507 A1 | 12/2003 | Perge | |
| 2003/0229580 A1 | 12/2003 | Gass et al. | |
| 2003/0233259 A1 | 12/2003 | Mistretta et al. | |
| 2004/0006488 A1 | 1/2004 | Fitall et al. | |
| 2004/0006536 A1 | 1/2004 | Kawashima et al. | |
| 2004/0010443 A1 | 1/2004 | May et al. | |
| 2004/0010458 A1 | 1/2004 | Friedman | |
| 2004/0015714 A1 | 1/2004 | Abraham et al. | |
| 2004/0015715 A1 | 1/2004 | Brown | |
| 2004/0019518 A1 | 1/2004 | Abraham et al. | |
| 2004/0019799 A1 | 1/2004 | Vering et al. | |
| 2004/0023637 A1 | 2/2004 | Johnson et al. | |
| 2004/0024709 A1 | 2/2004 | Yu et al. | |
| 2004/0030574 A1 | 2/2004 | DiCostanzo et al. | |
| 2004/0030621 A1 | 2/2004 | Cobb | |
| 2004/0030629 A1 | 2/2004 | Freeman et al. | |
| 2004/0030649 A1* | 2/2004 | Nelson | G06Q 20/40 705/44 |
| 2004/0039586 A1 | 2/2004 | Garvey et al. | |
| 2004/0039688 A1 | 2/2004 | Sulkowski et al. | |
| 2004/0044563 A1 | 3/2004 | Stein | |
| 2004/0044628 A1 | 3/2004 | Mathew et al. | |
| 2004/0044673 A1 | 3/2004 | Brady et al. | |
| 2004/0046033 A1 | 3/2004 | Kolodziej et al. | |
| 2004/0049473 A1 | 3/2004 | Gower et al. | |
| 2004/0050928 A1* | 3/2004 | Bishop | G06O 20/04 235/380 |
| 2004/0054619 A1 | 3/2004 | Watson et al. | |
| 2004/0062213 A1 | 4/2004 | Koss | |
| 2004/0064402 A1 | 4/2004 | Dreyer et al. | |
| 2004/0073456 A1 | 4/2004 | Gottlieb et al. | |
| 2004/0078323 A1 | 4/2004 | Johnston et al. | |
| 2004/0078324 A1 | 4/2004 | Lonnberg et al. | |
| 2004/0088237 A1 | 5/2004 | Moenickheim et al. | |
| 2004/0088255 A1 | 5/2004 | Zielke et al. | |
| 2004/0102197 A1 | 5/2004 | Dietz | |
| 2004/0103147 A1 | 5/2004 | Flesher et al. | |
| 2004/0107250 A1 | 6/2004 | Marciano | |
| 2004/0110119 A1 | 6/2004 | Riconda et al. | |
| 2004/0111292 A1 | 6/2004 | Hutchins | |
| 2004/0111305 A1 | 6/2004 | Gavan et al. | |
| 2004/0111359 A1 | 6/2004 | Hudock | |
| 2004/0117235 A1 | 6/2004 | Shacham | |
| 2004/0117302 A1 | 6/2004 | Weichert et al. | |
| 2004/0122681 A1 | 6/2004 | Ruvolo et al. | |
| 2004/0122696 A1 | 6/2004 | Beringer | |
| 2004/0122697 A1 | 6/2004 | Becerra et al. | |
| 2004/0128150 A1 | 7/2004 | Lundegren | |
| 2004/0128156 A1 | 7/2004 | Beringer et al. | |
| 2004/0128230 A1 | 7/2004 | Oppenheimer et al. | |
| 2004/0133440 A1 | 7/2004 | Carolan et al. | |
| 2004/0133509 A1 | 7/2004 | McCoy et al. | |
| 2004/0133513 A1 | 7/2004 | McCoy et al. | |
| 2004/0133515 A1 | 7/2004 | McCoy et al. | |
| 2004/0138994 A1 | 7/2004 | DeFrancesco et al. | |
| 2004/0138995 A1 | 7/2004 | Hershkowitz et al. | |
| 2004/0139025 A1 | 7/2004 | Coleman | |
| 2004/0141005 A1 | 7/2004 | Banatwala et al. | |
| 2004/0143546 A1 | 7/2004 | Wood et al. | |
| 2004/0143596 A1 | 7/2004 | Sirkin | |
| 2004/0153437 A1 | 8/2004 | Buchan | |
| 2004/0153521 A1 | 8/2004 | Kogo | |
| 2004/0158521 A1 | 8/2004 | Newton | |
| 2004/0158523 A1 | 8/2004 | Dort | |
| 2004/0158723 A1 | 8/2004 | Root | |
| 2004/0159700 A1* | 8/2004 | Khan | G06Q 20/02 235/380 |
| 2004/0167793 A1 | 8/2004 | Masuoka et al. | |
| 2004/0177030 A1 | 9/2004 | Shoham | |
| 2004/0177035 A1 | 9/2004 | Silva | |
| 2004/0177114 A1 | 9/2004 | Friedman et al. | |
| 2004/0186807 A1 | 9/2004 | Nathans et al. | |
| 2004/0193538 A1 | 9/2004 | Raines | |
| 2004/0193891 A1 | 9/2004 | Ollila | |
| 2004/0199456 A1 | 10/2004 | Flint et al. | |
| 2004/0199458 A1 | 10/2004 | Ho | |
| 2004/0199462 A1 | 10/2004 | Starrs | |
| 2004/0199789 A1 | 10/2004 | Shaw et al. | |
| 2004/0210661 A1 | 10/2004 | Thompson | |
| 2004/0215553 A1 | 10/2004 | Gang et al. | |
| 2004/0215554 A1 | 10/2004 | Kemper et al. | |
| 2004/0215555 A1 | 10/2004 | Kemper et al. | |
| 2004/0215556 A1 | 10/2004 | Merkley, Jr. et al. | |
| 2004/0215584 A1 | 10/2004 | Yao | |
| 2004/0220865 A1 | 11/2004 | Lozowski et al. | |
| 2004/0220896 A1 | 11/2004 | Finlay et al. | |
| 2004/0220918 A1 | 11/2004 | Scriffignano et al. | |
| 2004/0225545 A1 | 11/2004 | Turner et al. | |
| 2004/0225594 A1 | 11/2004 | Nolan, III et al. | |
| 2004/0225597 A1 | 11/2004 | Oppenheimer et al. | |
| 2004/0225643 A1 | 11/2004 | Alpha et al. | |
| 2004/0230527 A1 | 11/2004 | Hansen et al. | |
| 2004/0230534 A1 | 11/2004 | McGough | |
| 2004/0236688 A1 | 11/2004 | Bozeman | |
| 2004/0243450 A1 | 12/2004 | Bernard, Jr. et al. | |
| 2004/0243508 A1 | 12/2004 | Samson et al. | |
| 2004/0243588 A1 | 12/2004 | Tanner et al. | |
| 2004/0249811 A1 | 12/2004 | Shostack | |
| 2004/0250107 A1 | 12/2004 | Guo | |
| 2004/0254935 A1 | 12/2004 | Chagoly et al. | |
| 2004/0255127 A1 | 12/2004 | Arnouse | |
| 2004/0267660 A1 | 12/2004 | Greenwood et al. | |
| 2004/0267714 A1 | 12/2004 | Frid et al. | |
| 2005/0004855 A1* | 1/2005 | Jenson | G06Q 40/00 705/35 |
| 2005/0004870 A1 | 1/2005 | McGaughey | |
| 2005/0005168 A1 | 1/2005 | Dick | |
| 2005/0010513 A1 | 1/2005 | Duckworth et al. | |
| 2005/0015273 A1 | 1/2005 | Iyer | |
| 2005/0021476 A1 | 1/2005 | Candella et al. | |
| 2005/0021551 A1 | 1/2005 | Silva et al. | |
| 2005/0027632 A1 | 2/2005 | Zeitoun et al. | |
| 2005/0027633 A1 | 2/2005 | Fortuna et al. | |
| 2005/0027666 A1 | 2/2005 | Beck | |
| 2005/0027983 A1 | 2/2005 | Klawon | |
| 2005/0027995 A1 | 2/2005 | Menschik et al. | |
| 2005/0050027 A1 | 3/2005 | Yeh et al. | |
| 2005/0055231 A1 | 3/2005 | Lee | |
| 2005/0055275 A1 | 3/2005 | Newman et al. | |
| 2005/0055296 A1 | 3/2005 | Hattersley et al. | |
| 2005/0058262 A1 | 3/2005 | Timmins et al. | |
| 2005/0060332 A1 | 3/2005 | Bernstein et al. | |
| 2005/0071328 A1 | 3/2005 | Lawrence | |
| 2005/0086071 A1 | 4/2005 | Fox, Jr. et al. | |
| 2005/0086072 A1 | 4/2005 | Fox, Jr. et al. | |
| 2005/0086126 A1* | 4/2005 | Patterson | A63F 13/12 705/26.8 |
| 2005/0091164 A1 | 4/2005 | Varble | |
| 2005/0097017 A1* | 5/2005 | Hanratty | G06Q 20/04 705/35 |
| 2005/0097039 A1 | 5/2005 | Kulcsar et al. | |
| 2005/0097320 A1 | 5/2005 | Golan et al. | |
| 2005/0102180 A1 | 5/2005 | Gailey et al. | |
| 2005/0102206 A1 | 5/2005 | Savasoglu et al. | |
| 2005/0105719 A1 | 5/2005 | Huda | |

(56) References Cited

U.S. PATENT DOCUMENTS

| | | | |
|---|---|---|---|
| 2005/0108396 A1 | 5/2005 | Bittner | |
| 2005/0108631 A1 | 5/2005 | Amorin et al. | |
| 2005/0114335 A1 | 5/2005 | Wesinger, Jr. et al. | |
| 2005/0114344 A1 | 5/2005 | Wesinger, Jr. et al. | |
| 2005/0114345 A1 | 5/2005 | Wesinger, Jr. et al. | |
| 2005/0125291 A1* | 6/2005 | Demkiw Grayson | G06Q 30/02 705/14.26 |
| 2005/0125397 A1 | 6/2005 | Gross et al. | |
| 2005/0125686 A1 | 6/2005 | Brandt | |
| 2005/0137899 A1 | 6/2005 | Davies et al. | |
| 2005/0137912 A1 | 6/2005 | Rao et al. | |
| 2005/0144452 A1 | 6/2005 | Lynch et al. | |
| 2005/0154617 A1 | 7/2005 | Ruggieri et al. | |
| 2005/0154664 A1 | 7/2005 | Guy et al. | |
| 2005/0154665 A1 | 7/2005 | Kerr | |
| 2005/0154769 A1 | 7/2005 | Eckart et al. | |
| 2005/0197953 A1 | 9/2005 | Broadbent et al. | |
| 2005/0208461 A1 | 9/2005 | Krebs et al. | |
| 2005/0209880 A1 | 9/2005 | Drelicharz et al. | |
| 2005/0209922 A1 | 9/2005 | Hofmeister | |
| 2005/0216434 A1 | 9/2005 | Haveliwala et al. | |
| 2005/0216955 A1 | 9/2005 | Wilkins et al. | |
| 2005/0226224 A1 | 10/2005 | Lee et al. | |
| 2005/0228748 A1 | 10/2005 | Togher et al. | |
| 2005/0240578 A1 | 10/2005 | Biederman et al. | |
| 2005/0251474 A1 | 11/2005 | Shinn et al. | |
| 2005/0267840 A1* | 12/2005 | Holm-Blagg | G06Q 20/10 705/39 |
| 2005/0273431 A1* | 12/2005 | Abel | G06Q 20/02 705/42 |
| 2005/0279827 A1* | 12/2005 | Mascavage | G06Q 20/02 235/380 |
| 2005/0288998 A1 | 12/2005 | Verma et al. | |
| 2006/0004623 A1 | 1/2006 | Jasti | |
| 2006/0004626 A1 | 1/2006 | Holmen et al. | |
| 2006/0010391 A1 | 1/2006 | Uemura et al. | |
| 2006/0014129 A1 | 1/2006 | Coleman et al. | |
| 2006/0015425 A1 | 1/2006 | Brooks | |
| 2006/0029107 A1 | 2/2006 | McCullough et al. | |
| 2006/0031158 A1 | 2/2006 | Orman | |
| 2006/0032909 A1 | 2/2006 | Seegar | |
| 2006/0036543 A1 | 2/2006 | Blagg et al. | |
| 2006/0036748 A1 | 2/2006 | Nusbaum et al. | |
| 2006/0041464 A1 | 2/2006 | Powers et al. | |
| 2006/0041670 A1 | 2/2006 | Musseleck et al. | |
| 2006/0059086 A1 | 3/2006 | Mulhern | |
| 2006/0059110 A1 | 3/2006 | Madhok et al. | |
| 2006/0059362 A1 | 3/2006 | Paden et al. | |
| 2006/0069635 A1 | 3/2006 | Ram et al. | |
| 2006/0074986 A1 | 4/2006 | Mallalieu et al. | |
| 2006/0074991 A1 | 4/2006 | Lussier et al. | |
| 2006/0079211 A1 | 4/2006 | Degraeve | |
| 2006/0080139 A1 | 4/2006 | Mainzer | |
| 2006/0080230 A1 | 4/2006 | Freiberg | |
| 2006/0080233 A1 | 4/2006 | Mendelovich et al. | |
| 2006/0080251 A1 | 4/2006 | Fried et al. | |
| 2006/0080263 A1 | 4/2006 | Willis et al. | |
| 2006/0085334 A1 | 4/2006 | Murphy | |
| 2006/0085361 A1 | 4/2006 | Hoerle et al. | |
| 2006/0089842 A1 | 4/2006 | Medawar | |
| 2006/0095289 A1 | 5/2006 | Bunning | |
| 2006/0095363 A1 | 5/2006 | May | |
| 2006/0100944 A1 | 5/2006 | Reddin et al. | |
| 2006/0100954 A1 | 5/2006 | Schoen | |
| 2006/0101508 A1 | 5/2006 | Taylor | |
| 2006/0106670 A1 | 5/2006 | Cai et al. | |
| 2006/0123461 A1 | 6/2006 | Lunt et al. | |
| 2006/0129419 A1 | 6/2006 | Flaxer et al. | |
| 2006/0129481 A1 | 6/2006 | Bhatt et al. | |
| 2006/0129533 A1 | 6/2006 | Purvis | |
| 2006/0131390 A1 | 6/2006 | Kim | |
| 2006/0136595 A1 | 6/2006 | Satyavolu | |
| 2006/0155573 A1 | 7/2006 | Hartunian | |
| 2006/0155639 A1 | 7/2006 | Lynch et al. | |
| 2006/0155780 A1 | 7/2006 | Sakairi et al. | |
| 2006/0161435 A1 | 7/2006 | Atef et al. | |
| 2006/0161554 A1 | 7/2006 | Lucovsky et al. | |
| 2006/0173772 A1 | 8/2006 | Hayes et al. | |
| 2006/0173776 A1 | 8/2006 | Shalley et al. | |
| 2006/0173792 A1 | 8/2006 | Glass | |
| 2006/0177226 A1 | 8/2006 | Ellis, III | |
| 2006/0178971 A1 | 8/2006 | Owen et al. | |
| 2006/0178983 A1 | 8/2006 | Nice et al. | |
| 2006/0179050 A1 | 8/2006 | Giang et al. | |
| 2006/0184410 A1 | 8/2006 | Ramamurthy et al. | |
| 2006/0184440 A1 | 8/2006 | Britti et al. | |
| 2006/0184585 A1 | 8/2006 | Grear et al. | |
| 2006/0195351 A1 | 8/2006 | Bayburtian | |
| 2006/0202012 A1 | 9/2006 | Grano et al. | |
| 2006/0204051 A1* | 9/2006 | Holland, IV | G06Q 20/02 382/115 |
| 2006/0212386 A1 | 9/2006 | Willey et al. | |
| 2006/0212407 A1 | 9/2006 | Lyon | |
| 2006/0218407 A1 | 9/2006 | Toms | |
| 2006/0223043 A1 | 10/2006 | Dancy-Edwards et al. | |
| 2006/0229799 A1 | 10/2006 | Nimmo et al. | |
| 2006/0229943 A1 | 10/2006 | Mathias et al. | |
| 2006/0229961 A1 | 10/2006 | Lyftogt et al. | |
| 2006/0233332 A1 | 10/2006 | Toms | |
| 2006/0235743 A1 | 10/2006 | Long et al. | |
| 2006/0235935 A1 | 10/2006 | Ng | |
| 2006/0239512 A1 | 10/2006 | Petrillo | |
| 2006/0242046 A1 | 10/2006 | Haggerty et al. | |
| 2006/0253358 A1 | 11/2006 | Delgrosso et al. | |
| 2006/0262929 A1 | 11/2006 | Vatanen et al. | |
| 2006/0271456 A1 | 11/2006 | Romain et al. | |
| 2006/0271457 A1 | 11/2006 | Romain et al. | |
| 2006/0271633 A1 | 11/2006 | Adler | |
| 2006/0277089 A1 | 12/2006 | Hubbard et al. | |
| 2006/0277092 A1 | 12/2006 | Williams | |
| 2006/0277141 A1 | 12/2006 | Palmer | |
| 2006/0282359 A1 | 12/2006 | Nobili et al. | |
| 2006/0282373 A1 | 12/2006 | Stone | |
| 2006/0282374 A1 | 12/2006 | Stone | |
| 2006/0282429 A1 | 12/2006 | Hernandez-Sherrington et al. | |
| 2006/0282819 A1 | 12/2006 | Graham et al. | |
| 2006/0287764 A1 | 12/2006 | Kraft | |
| 2006/0287765 A1 | 12/2006 | Kraft | |
| 2006/0287766 A1 | 12/2006 | Kraft | |
| 2006/0287767 A1 | 12/2006 | Kraft | |
| 2006/0288090 A1* | 12/2006 | Kraft | G06F 17/30522 709/219 |
| 2006/0294199 A1 | 12/2006 | Bertholf | |
| 2007/0005508 A1 | 1/2007 | Chiang | |
| 2007/0005984 A1 | 1/2007 | Florencio et al. | |
| 2007/0011083 A1 | 1/2007 | Bird et al. | |
| 2007/0016500 A1 | 1/2007 | Chatterji et al. | |
| 2007/0016501 A1 | 1/2007 | Chatterji et al. | |
| 2007/0016520 A1 | 1/2007 | Gang et al. | |
| 2007/0022141 A1 | 1/2007 | Singleton et al. | |
| 2007/0022297 A1 | 1/2007 | Britti et al. | |
| 2007/0027778 A1 | 2/2007 | Schellhammer et al. | |
| 2007/0027816 A1 | 2/2007 | Writer | |
| 2007/0032240 A1 | 2/2007 | Finnegan et al. | |
| 2007/0038483 A1 | 2/2007 | Wood | |
| 2007/0038497 A1 | 2/2007 | Britti et al. | |
| 2007/0038568 A1 | 2/2007 | Greene et al. | |
| 2007/0040015 A1 | 2/2007 | Carlson et al. | |
| 2007/0043577 A1 | 2/2007 | Kasower | |
| 2007/0043654 A1 | 2/2007 | Libman | |
| 2007/0045403 A1* | 3/2007 | Slonecker, Jr. | G06Q 20/354 235/380 |
| 2007/0047714 A1 | 3/2007 | Baniak et al. | |
| 2007/0055621 A1 | 3/2007 | Tischler et al. | |
| 2007/0067207 A1 | 3/2007 | Haggerty et al. | |
| 2007/0067297 A1 | 3/2007 | Kublickis | |
| 2007/0072190 A1 | 3/2007 | Aggarwal | |
| 2007/0073889 A1 | 3/2007 | Morris | |
| 2007/0078741 A1 | 4/2007 | Haggerty et al. | |
| 2007/0078908 A1 | 4/2007 | Rohatgi et al. | |
| 2007/0078985 A1 | 4/2007 | Shao et al. | |
| 2007/0083460 A1 | 4/2007 | Bachenheimer | |

(56) References Cited

U.S. PATENT DOCUMENTS

| | | | |
|---|---|---|---|
| 2007/0083463 A1* | 4/2007 | Kraft | G06Q 40/02 705/38 |
| 2007/0088950 A1* | 4/2007 | Wheeler | G06Q 20/00 713/170 |
| 2007/0093234 A1 | 4/2007 | Willis et al. | |
| 2007/0094137 A1 | 4/2007 | Phillips et al. | |
| 2007/0094230 A1 | 4/2007 | Subramaniam et al. | |
| 2007/0094241 A1 | 4/2007 | Blackwell et al. | |
| 2007/0106582 A1 | 5/2007 | Baker et al. | |
| 2007/0112667 A1 | 5/2007 | Rucker | |
| 2007/0112668 A1 | 5/2007 | Celano et al. | |
| 2007/0118410 A1 | 5/2007 | Nadai | |
| 2007/0121843 A1 | 5/2007 | Atazky et al. | |
| 2007/0124235 A1 | 5/2007 | Chakraborty et al. | |
| 2007/0124256 A1 | 5/2007 | Crooks et al. | |
| 2007/0127702 A1 | 6/2007 | Shaffer et al. | |
| 2007/0130070 A1 | 6/2007 | Williams | |
| 2007/0136109 A1 | 6/2007 | Yager et al. | |
| 2007/0143123 A1 | 6/2007 | Goldberg et al. | |
| 2007/0156554 A1 | 7/2007 | Nikoley et al. | |
| 2007/0156692 A1 | 7/2007 | Rosewarne | |
| 2007/0160458 A1 | 7/2007 | Yen | |
| 2007/0162414 A1 | 7/2007 | Horowitz et al. | |
| 2007/0174186 A1 | 7/2007 | Hokland | |
| 2007/0174448 A1 | 7/2007 | Ahuja et al. | |
| 2007/0174903 A1 | 7/2007 | Greff | |
| 2007/0192121 A1 | 8/2007 | Routson et al. | |
| 2007/0192122 A1 | 8/2007 | Routson et al. | |
| 2007/0192347 A1 | 8/2007 | Rossmark et al. | |
| 2007/0198336 A1 | 8/2007 | Thompson | |
| 2007/0198407 A1 | 8/2007 | Winter | |
| 2007/0204338 A1 | 8/2007 | Aiello et al. | |
| 2007/0205266 A1 | 9/2007 | Carr et al. | |
| 2007/0208640 A1 | 9/2007 | Banasiak et al. | |
| 2007/0214000 A1 | 9/2007 | Shahrabi et al. | |
| 2007/0220003 A1 | 9/2007 | Chern et al. | |
| 2007/0226047 A1 | 9/2007 | Ward | |
| 2007/0226093 A1 | 9/2007 | Chan et al. | |
| 2007/0233591 A1 | 10/2007 | Newton | |
| 2007/0239493 A1 | 10/2007 | Sweetland et al. | |
| 2007/0240206 A1 | 10/2007 | Wu et al. | |
| 2007/0244732 A1 | 10/2007 | Chatterji et al. | |
| 2007/0244807 A1 | 10/2007 | Andringa et al. | |
| 2007/0245245 A1 | 10/2007 | Blue et al. | |
| 2007/0250441 A1 | 10/2007 | Paulsen et al. | |
| 2007/0250459 A1 | 10/2007 | Schwarz et al. | |
| 2007/0255654 A1 | 11/2007 | Whipple et al. | |
| 2007/0255655 A1 | 11/2007 | Kemper et al. | |
| 2007/0258626 A1 | 11/2007 | Reiner | |
| 2007/0260539 A1 | 11/2007 | Delinsky | |
| 2007/0261114 A1 | 11/2007 | Pomerantsev | |
| 2007/0262137 A1 | 11/2007 | Brown | |
| 2007/0262140 A1 | 11/2007 | Long, Sr. | |
| 2007/0266439 A1* | 11/2007 | Kraft | H04L 63/083 726/26 |
| 2007/0279187 A1 | 12/2007 | Hekmatpour et al. | |
| 2007/0282730 A1 | 12/2007 | Carpenter et al. | |
| 2007/0282736 A1 | 12/2007 | Conlin et al. | |
| 2007/0282743 A1 | 12/2007 | Lovelett | |
| 2007/0284433 A1 | 12/2007 | Domenica et al. | |
| 2007/0288338 A1 | 12/2007 | Hoadley | |
| 2007/0288355 A1 | 12/2007 | Roland et al. | |
| 2007/0288360 A1 | 12/2007 | Seeklus | |
| 2007/0294195 A1 | 12/2007 | Curry et al. | |
| 2007/0294431 A1 | 12/2007 | Adelman et al. | |
| 2007/0299699 A1 | 12/2007 | Policelli et al. | |
| 2007/0299770 A1 | 12/2007 | Delinsky | |
| 2007/0299771 A1 | 12/2007 | Brody | |
| 2008/0010203 A1* | 1/2008 | Grant | G06Q 20/102 705/44 |
| 2008/0010206 A1 | 1/2008 | Coleman | |
| 2008/0010687 A1 | 1/2008 | Gonen et al. | |
| 2008/0015979 A1 | 1/2008 | Bentley | |
| 2008/0021802 A1 | 1/2008 | Pendleton | |
| 2008/0022281 A1* | 1/2008 | Dubhashi | G06F 9/547 718/102 |
| 2008/0028446 A1 | 1/2008 | Burgoyne | |
| 2008/0033742 A1 | 2/2008 | Bernasconi | |
| 2008/0033956 A1 | 2/2008 | Saha et al. | |
| 2008/0040176 A1 | 2/2008 | Ehling | |
| 2008/0046351 A1 | 2/2008 | Wiener et al. | |
| 2008/0047017 A1 | 2/2008 | Renaud | |
| 2008/0052182 A1* | 2/2008 | Marshall | G06Q 20/10 705/26.1 |
| 2008/0052244 A1 | 2/2008 | Tsuei et al. | |
| 2008/0059317 A1 | 3/2008 | Chandran et al. | |
| 2008/0059352 A1 | 3/2008 | Chandran | |
| 2008/0059364 A1* | 3/2008 | Tidwell | G06Q 20/403 705/38 |
| 2008/0065774 A1 | 3/2008 | Keeler | |
| 2008/0066188 A1 | 3/2008 | Kwak | |
| 2008/0071682 A1 | 3/2008 | Dominguez | |
| 2008/0072316 A1 | 3/2008 | Chang et al. | |
| 2008/0077526 A1 | 3/2008 | Arumugam | |
| 2008/0082536 A1 | 4/2008 | Schwabe et al. | |
| 2008/0083021 A1 | 4/2008 | Doane et al. | |
| 2008/0086400 A1 | 4/2008 | Ardelean et al. | |
| 2008/0086431 A1 | 4/2008 | Robinson et al. | |
| 2008/0091519 A1 | 4/2008 | Foss | |
| 2008/0097768 A1 | 4/2008 | Godshalk | |
| 2008/0103800 A1 | 5/2008 | Domenikos et al. | |
| 2008/0103959 A1 | 5/2008 | Carroll et al. | |
| 2008/0103972 A1 | 5/2008 | Lanc | |
| 2008/0109315 A1 | 5/2008 | Huang et al. | |
| 2008/0109422 A1 | 5/2008 | Dedhia | |
| 2008/0109740 A1 | 5/2008 | Prinsen et al. | |
| 2008/0109875 A1 | 5/2008 | Kraft | |
| 2008/0114670 A1 | 5/2008 | Friesen | |
| 2008/0115191 A1 | 5/2008 | Kim et al. | |
| 2008/0115226 A1 | 5/2008 | Welingkar et al. | |
| 2008/0120133 A1 | 5/2008 | Krishnaswami et al. | |
| 2008/0120155 A1 | 5/2008 | Pliha | |
| 2008/0120204 A1 | 5/2008 | Conner et al. | |
| 2008/0120569 A1 | 5/2008 | Mann et al. | |
| 2008/0120716 A1 | 5/2008 | Hall et al. | |
| 2008/0126233 A1 | 5/2008 | Hogan | |
| 2008/0133278 A1 | 6/2008 | Stanfield | |
| 2008/0133322 A1 | 6/2008 | Kalia et al. | |
| 2008/0140507 A1 | 6/2008 | Hamlisch et al. | |
| 2008/0140576 A1 | 6/2008 | Lewis et al. | |
| 2008/0141346 A1 | 6/2008 | Kay et al. | |
| 2008/0148368 A1 | 6/2008 | Zurko et al. | |
| 2008/0154758 A1 | 6/2008 | Schattmaier et al. | |
| 2008/0162317 A1 | 7/2008 | Banaugh et al. | |
| 2008/0162350 A1 | 7/2008 | Allen-Rouman et al. | |
| 2008/0162383 A1* | 7/2008 | Kraft | G06Q 40/00 705/500 |
| 2008/0172324 A1 | 7/2008 | Johnson | |
| 2008/0175360 A1 | 7/2008 | Schwarz et al. | |
| 2008/0177655 A1 | 7/2008 | Zalik | |
| 2008/0183480 A1 | 7/2008 | Carlson et al. | |
| 2008/0183585 A1 | 7/2008 | Vianello | |
| 2008/0184270 A1 | 7/2008 | Cole et al. | |
| 2008/0189202 A1 | 8/2008 | Zadoorian et al. | |
| 2008/0195548 A1* | 8/2008 | Chu | G06F 21/10 705/59 |
| 2008/0201257 A1 | 8/2008 | Lewis et al. | |
| 2008/0201401 A1 | 8/2008 | Pugh et al. | |
| 2008/0205655 A1 | 8/2008 | Wilkins et al. | |
| 2008/0208610 A1 | 8/2008 | Thomas et al. | |
| 2008/0208726 A1 | 8/2008 | Tsantes et al. | |
| 2008/0208735 A1 | 8/2008 | Balet et al. | |
| 2008/0208873 A1 | 8/2008 | Boehmer | |
| 2008/0221972 A1 | 9/2008 | Megdal et al. | |
| 2008/0222015 A1 | 9/2008 | Megdal et al. | |
| 2008/0222027 A1 | 9/2008 | Megdal et al. | |
| 2008/0222706 A1 | 9/2008 | Renaud et al. | |
| 2008/0228775 A1 | 9/2008 | Abhyanker et al. | |
| 2008/0229415 A1 | 9/2008 | Kapoor et al. | |
| 2008/0249869 A1 | 10/2008 | Angell et al. | |
| 2008/0255922 A1 | 10/2008 | Feldman et al. | |
| 2008/0255992 A1 | 10/2008 | Lin | |
| 2008/0263058 A1 | 10/2008 | Peden | |

(56) References Cited

U.S. PATENT DOCUMENTS

| | | |
|---|---|---|
| 2008/0270209 A1 | 10/2008 | Mauseth et al. |
| 2008/0270294 A1 | 10/2008 | Lent et al. |
| 2008/0270295 A1* | 10/2008 | Lent ................. G06Q 30/06 705/38 |
| 2008/0277465 A1 | 11/2008 | Pletz et al. |
| 2008/0281737 A1 | 11/2008 | Fajardo |
| 2008/0282324 A1 | 11/2008 | Hoal |
| 2008/0288283 A1 | 11/2008 | Baldwin, Jr. et al. |
| 2008/0288299 A1 | 11/2008 | Schultz |
| 2008/0294501 A1 | 11/2008 | Rennich et al. |
| 2008/0294540 A1 | 11/2008 | Celka et al. |
| 2008/0301016 A1 | 12/2008 | Durvasula et al. |
| 2008/0306750 A1 | 12/2008 | Wunder et al. |
| 2008/0319832 A1 | 12/2008 | Liebe |
| 2008/0319889 A1* | 12/2008 | Hammad ............... G06Q 20/04 705/35 |
| 2009/0006230 A1 | 1/2009 | Lyda et al. |
| 2009/0012889 A1 | 1/2009 | Finch |
| 2009/0024428 A1 | 1/2009 | Hudock, Jr. |
| 2009/0024484 A1 | 1/2009 | Walker et al. |
| 2009/0030776 A1 | 1/2009 | Walker et al. |
| 2009/0031426 A1 | 1/2009 | Dal Lago et al. |
| 2009/0037332 A1 | 2/2009 | Cheung et al. |
| 2009/0043691 A1 | 2/2009 | Kasower |
| 2009/0044279 A1 | 2/2009 | Crawford et al. |
| 2009/0048957 A1 | 2/2009 | Celano |
| 2009/0055322 A1 | 2/2009 | Bykov et al. |
| 2009/0055894 A1 | 2/2009 | Lorsch |
| 2009/0060343 A1* | 3/2009 | Rosca ..................... G09C 5/00 382/190 |
| 2009/0064297 A1 | 3/2009 | Selgas et al. |
| 2009/0089190 A1 | 4/2009 | Girulat |
| 2009/0094237 A1 | 4/2009 | Churi et al. |
| 2009/0094674 A1 | 4/2009 | Schwartz et al. |
| 2009/0100047 A1 | 4/2009 | Jones et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0112650 A1 | 4/2009 | Iwane |
| 2009/0119199 A1 | 5/2009 | Salahi |
| 2009/0119299 A1 | 5/2009 | Rhodes |
| 2009/0125369 A1 | 5/2009 | Kloostra et al. |
| 2009/0125972 A1 | 5/2009 | Hinton et al. |
| 2009/0138335 A1 | 5/2009 | Lieberman |
| 2009/0150166 A1 | 6/2009 | Leite et al. |
| 2009/0150238 A1 | 6/2009 | Marsh et al. |
| 2009/0157693 A1 | 6/2009 | Palahnuk |
| 2009/0158030 A1* | 6/2009 | Rasti ................... H04L 63/0421 713/156 |
| 2009/0164232 A1 | 6/2009 | Chmielewski et al. |
| 2009/0164380 A1 | 6/2009 | Brown |
| 2009/0171723 A1 | 7/2009 | Jenkins |
| 2009/0172788 A1 | 7/2009 | Veldula et al. |
| 2009/0172795 A1 | 7/2009 | Ritari et al. |
| 2009/0172815 A1 | 7/2009 | Gu et al. |
| 2009/0177529 A1 | 7/2009 | Hadi |
| 2009/0177562 A1 | 7/2009 | Peace et al. |
| 2009/0177670 A1 | 7/2009 | Grenier et al. |
| 2009/0183259 A1 | 7/2009 | Rinek et al. |
| 2009/0198557 A1 | 8/2009 | Wang et al. |
| 2009/0198602 A1 | 8/2009 | Wang et al. |
| 2009/0199294 A1 | 8/2009 | Schneider |
| 2009/0204599 A1 | 8/2009 | Morris et al. |
| 2009/0210241 A1 | 8/2009 | Calloway |
| 2009/0210807 A1 | 8/2009 | Xiao et al. |
| 2009/0216640 A1 | 8/2009 | Masi |
| 2009/0217342 A1 | 8/2009 | Nadler |
| 2009/0222308 A1 | 9/2009 | Zoldi et al. |
| 2009/0222379 A1 | 9/2009 | Choudhuri et al. |
| 2009/0228918 A1 | 9/2009 | Rolff et al. |
| 2009/0234665 A1 | 9/2009 | Conkel |
| 2009/0234775 A1* | 9/2009 | Whitney ............... G06Q 30/02 705/36 R |
| 2009/0234876 A1 | 9/2009 | Schigel et al. |
| 2009/0240624 A1 | 9/2009 | James et al. |
| 2009/0247122 A1 | 10/2009 | Fitzgerald et al. |
| 2009/0248573 A1 | 10/2009 | Haggerty et al. |
| 2009/0249451 A1 | 10/2009 | Su et al. |
| 2009/0254375 A1 | 10/2009 | Martinez et al. |
| 2009/0254476 A1 | 10/2009 | Sharma et al. |
| 2009/0254656 A1 | 10/2009 | Vignisson et al. |
| 2009/0254971 A1 | 10/2009 | Herz et al. |
| 2009/0260064 A1 | 10/2009 | Mcdowell et al. |
| 2009/0271248 A1 | 10/2009 | Sherman et al. |
| 2009/0271265 A1 | 10/2009 | Lay et al. |
| 2009/0276244 A1 | 11/2009 | Baldwin, Jr. et al. |
| 2009/0276368 A1 | 11/2009 | Martin et al. |
| 2009/0280467 A1 | 11/2009 | Ahart |
| 2009/0289110 A1 | 11/2009 | Regen et al. |
| 2009/0300066 A1 | 12/2009 | Guo et al. |
| 2009/0307778 A1 | 12/2009 | Mardikar |
| 2009/0313562 A1 | 12/2009 | Appleyard et al. |
| 2009/0327054 A1 | 12/2009 | Yao et al. |
| 2009/0327120 A1 | 12/2009 | Eze et al. |
| 2009/0327270 A1 | 12/2009 | Teevan et al. |
| 2009/0328173 A1 | 12/2009 | Jakobson et al. |
| 2010/0009320 A1 | 1/2010 | Wilkelis |
| 2010/0009332 A1 | 1/2010 | Yaskin et al. |
| 2010/0009663 A1 | 1/2010 | Chang |
| 2010/0010935 A1 | 1/2010 | Shelton |
| 2010/0011428 A1 | 1/2010 | Atwood et al. |
| 2010/0023434 A1 | 1/2010 | Bond |
| 2010/0023448 A1 | 1/2010 | Eze |
| 2010/0030578 A1 | 2/2010 | Siddique et al. |
| 2010/0030677 A1* | 2/2010 | Melik-Aslanian ..... G06Q 20/24 705/35 |
| 2010/0036697 A1 | 2/2010 | Kelnar |
| 2010/0042517 A1* | 2/2010 | Paintin ................. G06Q 30/02 705/30 |
| 2010/0042583 A1 | 2/2010 | Gervais |
| 2010/0043055 A1 | 2/2010 | Baumgart |
| 2010/0049803 A1 | 2/2010 | Ogilvie et al. |
| 2010/0063993 A1 | 3/2010 | Higgins et al. |
| 2010/0077483 A1 | 3/2010 | Stolfo et al. |
| 2010/0083371 A1 | 4/2010 | Bennetts et al. |
| 2010/0094768 A1 | 4/2010 | Miltonberger |
| 2010/0094774 A1 | 4/2010 | Jackowitz et al. |
| 2010/0094910 A1 | 4/2010 | Bayliss |
| 2010/0100945 A1 | 4/2010 | Ozzie et al. |
| 2010/0107225 A1 | 4/2010 | Spencer et al. |
| 2010/0114724 A1* | 5/2010 | Ghosh ................... G06Q 20/20 705/24 |
| 2010/0114744 A1 | 5/2010 | Gonen |
| 2010/0114747 A1* | 5/2010 | Kasower ............... G06Q 30/06 705/35 |
| 2010/0114776 A1 | 5/2010 | Weller et al. |
| 2010/0122316 A1 | 5/2010 | Lyon |
| 2010/0122324 A1 | 5/2010 | Welingkar et al. |
| 2010/0122333 A1 | 5/2010 | Noe et al. |
| 2010/0130172 A1 | 5/2010 | Vendrow et al. |
| 2010/0136956 A1 | 6/2010 | Drachev et al. |
| 2010/0142698 A1 | 6/2010 | Spottiswoode et al. |
| 2010/0145836 A1 | 6/2010 | Baker et al. |
| 2010/0153278 A1 | 6/2010 | Farsedakis |
| 2010/0153290 A1 | 6/2010 | Duggan |
| 2010/0161816 A1 | 6/2010 | Kraft et al. |
| 2010/0169159 A1 | 7/2010 | Rose et al. |
| 2010/0174638 A1 | 7/2010 | Debie et al. |
| 2010/0174813 A1 | 7/2010 | Hildreth et al. |
| 2010/0179906 A1 | 7/2010 | Hawkes |
| 2010/0185546 A1 | 7/2010 | Pollard |
| 2010/0188684 A1 | 7/2010 | Kumara |
| 2010/0205076 A1 | 8/2010 | Parson et al. |
| 2010/0205087 A1 | 8/2010 | Hubler et al. |
| 2010/0205662 A1 | 8/2010 | Ibrahim et al. |
| 2010/0211636 A1 | 8/2010 | Starkenburg et al. |
| 2010/0217837 A1 | 8/2010 | Ansari et al. |
| 2010/0223168 A1 | 9/2010 | Haggerty et al. |
| 2010/0223192 A1 | 9/2010 | Levine et al. |
| 2010/0228658 A1 | 9/2010 | Ketelsen et al. |
| 2010/0229245 A1 | 9/2010 | Singhal |
| 2010/0241535 A1 | 9/2010 | Nightengale et al. |
| 2010/0250338 A1 | 9/2010 | Banerjee et al. |

(56) References Cited

U.S. PATENT DOCUMENTS

| | | |
|---|---|---|
| 2010/0250410 A1 | 9/2010 | Song et al. |
| 2010/0250411 A1 | 9/2010 | Ogrodski |
| 2010/0250497 A1 | 9/2010 | Redlich et al. |
| 2010/0250509 A1 | 9/2010 | Andersen |
| 2010/0253686 A1 | 10/2010 | Alsbury et al. |
| 2010/0257102 A1 | 10/2010 | Perlman |
| 2010/0257577 A1 | 10/2010 | Grandison et al. |
| 2010/0262932 A1 | 10/2010 | Pan |
| 2010/0268557 A1 | 10/2010 | Faith et al. |
| 2010/0268660 A1 | 10/2010 | Ekdahl |
| 2010/0280914 A1 | 11/2010 | Carlson |
| 2010/0281020 A1 | 11/2010 | Drubner |
| 2010/0293090 A1 | 11/2010 | Domenikos et al. |
| 2010/0299251 A1 | 11/2010 | Thomas |
| 2010/0299252 A1 | 11/2010 | Thomas |
| 2010/0299260 A1 | 11/2010 | Thomas |
| 2010/0299262 A1 | 11/2010 | Handler |
| 2010/0324986 A1 | 12/2010 | Thomas |
| 2010/0325036 A1 | 12/2010 | Thomas |
| 2010/0325048 A1 | 12/2010 | Carlson et al. |
| 2010/0332393 A1 | 12/2010 | Weller et al. |
| 2011/0004498 A1 | 1/2011 | Readshaw |
| 2011/0004514 A1 | 1/2011 | Thomas |
| 2011/0004546 A1 | 1/2011 | Thomas |
| 2011/0023115 A1 | 1/2011 | Wright |
| 2011/0029388 A1 | 2/2011 | Kendall et al. |
| 2011/0029427 A1 | 2/2011 | Haggerty et al. |
| 2011/0035315 A1 | 2/2011 | Langley |
| 2011/0035452 A1 | 2/2011 | Gittleman |
| 2011/0035788 A1 | 2/2011 | White et al. |
| 2011/0040629 A1 | 2/2011 | Chiu et al. |
| 2011/0040736 A1 | 2/2011 | Kalaboukis |
| 2011/0054981 A1 | 3/2011 | Faith et al. |
| 2011/0060654 A1 | 3/2011 | Elliott et al. |
| 2011/0060673 A1 | 3/2011 | Delinsky et al. |
| 2011/0071950 A1 | 3/2011 | Ivanovic |
| 2011/0078073 A1 | 3/2011 | Annappindi et al. |
| 2011/0083181 A1 | 4/2011 | Nazarov |
| 2011/0113084 A1 | 5/2011 | Ramnani |
| 2011/0113086 A1 | 5/2011 | Long et al. |
| 2011/0113096 A1 | 5/2011 | Long et al. |
| 2011/0126275 A1 | 5/2011 | Anderson et al. |
| 2011/0131123 A1 | 6/2011 | Griffin et al. |
| 2011/0137760 A1 | 6/2011 | Rudie et al. |
| 2011/0142213 A1 | 6/2011 | Baniak et al. |
| 2011/0145899 A1 | 6/2011 | Cao et al. |
| 2011/0161218 A1 | 6/2011 | Swift |
| 2011/0166988 A1 | 7/2011 | Coulter |
| 2011/0167011 A1 | 7/2011 | Paltenghe et al. |
| 2011/0173116 A1 | 7/2011 | Yan et al. |
| 2011/0178841 A1 | 7/2011 | Rane et al. |
| 2011/0178899 A1 | 7/2011 | Huszar |
| 2011/0179139 A1 | 7/2011 | Starkenburg et al. |
| 2011/0184838 A1 | 7/2011 | Winters et al. |
| 2011/0196791 A1 | 8/2011 | Dominguez |
| 2011/0264566 A1 | 10/2011 | Brown |
| 2011/0264581 A1 | 10/2011 | Clyne |
| 2011/0270618 A1 | 11/2011 | Banerjee et al. |
| 2011/0270779 A1 | 11/2011 | Showalter |
| 2011/0270925 A1 | 11/2011 | Mina |
| 2011/0295733 A1 | 12/2011 | Megdal et al. |
| 2011/0307397 A1 | 12/2011 | Benmbarek |
| 2011/0307434 A1 | 12/2011 | Rostampour et al. |
| 2011/0307957 A1 | 12/2011 | Barcelo et al. |
| 2012/0005070 A1 | 1/2012 | McFall et al. |
| 2012/0011158 A1 | 1/2012 | Avner et al. |
| 2012/0016948 A1 | 1/2012 | Sinha |
| 2012/0022990 A1 | 1/2012 | Kasower |
| 2012/0023011 A1 | 1/2012 | Hurwitz |
| 2012/0030216 A1 | 2/2012 | Churi et al. |
| 2012/0030771 A1 | 2/2012 | Pierson et al. |
| 2012/0047219 A1 | 2/2012 | Feng et al. |
| 2012/0054088 A1 | 3/2012 | Edrington et al. |
| 2012/0054592 A1 | 3/2012 | Jaffe et al. |
| 2012/0060105 A1 | 3/2012 | Brown et al. |
| 2012/0066065 A1 | 3/2012 | Switzer |
| 2012/0066084 A1 | 3/2012 | Sneyders |
| 2012/0072382 A1 | 3/2012 | Pearson et al. |
| 2012/0072464 A1 | 3/2012 | Cohen |
| 2012/0084866 A1 | 4/2012 | Stolfo |
| 2012/0101938 A1 | 4/2012 | Kasower |
| 2012/0101939 A1 | 4/2012 | Kasower |
| 2012/0108274 A1 | 5/2012 | Acebo Ruiz et al. |
| 2012/0110467 A1 | 5/2012 | Blake et al. |
| 2012/0110677 A1 | 5/2012 | Abendroth et al. |
| 2012/0123931 A1 | 5/2012 | Megdal et al. |
| 2012/0123942 A1 | 5/2012 | Song et al. |
| 2012/0124498 A1 | 5/2012 | Santoro et al. |
| 2012/0136763 A1 | 5/2012 | Megdal et al. |
| 2012/0136774 A1 | 5/2012 | Imrey et al. |
| 2012/0150587 A1 | 6/2012 | Kruger et al. |
| 2012/0151045 A1 | 6/2012 | Anakata et al. |
| 2012/0158574 A1 | 6/2012 | Brunzell et al. |
| 2012/0158654 A1 | 6/2012 | Behren et al. |
| 2012/0173339 A1 | 7/2012 | Flynt et al. |
| 2012/0173406 A1 | 7/2012 | Fei et al. |
| 2012/0173417 A1 | 7/2012 | Lohman et al. |
| 2012/0198556 A1 | 8/2012 | Patel et al. |
| 2012/0215682 A1 | 8/2012 | Lent et al. |
| 2012/0216125 A1 | 8/2012 | Pierce |
| 2012/0226916 A1 | 9/2012 | Hahn et al. |
| 2012/0232958 A1 | 9/2012 | Silbert |
| 2012/0235897 A1 | 9/2012 | Hirota |
| 2012/0239497 A1 | 9/2012 | Nuzzi |
| 2012/0239553 A1 | 9/2012 | Gonen et al. |
| 2012/0239583 A1 | 9/2012 | Dobrowolski |
| 2012/0246060 A1 | 9/2012 | Conyack, Jr. et al. |
| 2012/0253852 A1 | 10/2012 | Pourfallah et al. |
| 2012/0265607 A1 | 10/2012 | Belwadi |
| 2012/0265661 A1 | 10/2012 | Megdal et al. |
| 2012/0278767 A1 | 11/2012 | Stibel et al. |
| 2012/0284118 A1 | 11/2012 | Mamich, Jr. et al. |
| 2012/0290660 A1 | 11/2012 | Rao et al. |
| 2012/0297484 A1 | 11/2012 | Srivastava |
| 2012/0317014 A1 | 12/2012 | Cerise et al. |
| 2012/0317016 A1 | 12/2012 | Hughes |
| 2012/0324388 A1 | 12/2012 | Rao et al. |
| 2013/0006825 A1 | 1/2013 | Robida et al. |
| 2013/0018811 A1 | 1/2013 | Britti et al. |
| 2013/0031109 A1 | 1/2013 | Roulson et al. |
| 2013/0031624 A1 | 1/2013 | Britti et al. |
| 2013/0060603 A1 | 3/2013 | Wagner |
| 2013/0066775 A1 | 3/2013 | Milam |
| 2013/0080467 A1 | 3/2013 | Carson et al. |
| 2013/0085804 A1 | 4/2013 | Leff et al. |
| 2013/0110557 A1 | 5/2013 | Kasower |
| 2013/0110565 A1 | 5/2013 | Means et al. |
| 2013/0117087 A1 | 5/2013 | Coppinger |
| 2013/0124263 A1 | 5/2013 | Amaro et al. |
| 2013/0125010 A1 | 5/2013 | Strandell |
| 2013/0132151 A1 | 5/2013 | Stibel et al. |
| 2013/0173449 A1 | 7/2013 | Ng et al. |
| 2013/0173451 A1 | 7/2013 | Kornegay et al. |
| 2013/0185293 A1 | 7/2013 | Boback |
| 2013/0205135 A1 | 8/2013 | Lutz |
| 2013/0211986 A1 | 8/2013 | Debie et al. |
| 2013/0268357 A1 | 10/2013 | Heath |
| 2013/0279676 A1 | 10/2013 | Baniak et al. |
| 2013/0298238 A1 | 11/2013 | Shah et al. |
| 2013/0332338 A1 | 12/2013 | Yan et al. |
| 2013/0332341 A1 | 12/2013 | Papadimitriou |
| 2013/0332342 A1 | 12/2013 | Kasower |
| 2013/0339249 A1 | 12/2013 | Weller et al. |
| 2014/0012733 A1 | 1/2014 | Vidal |
| 2014/0012737 A1 | 1/2014 | Evans |
| 2014/0032300 A1 | 1/2014 | Zhang et al. |
| 2014/0032723 A1 | 1/2014 | Nema |
| 2014/0061302 A1 | 3/2014 | Hammad |
| 2014/0089167 A1 | 3/2014 | Kasower |
| 2014/0096249 A1 | 4/2014 | Dupont et al. |
| 2014/0110477 A1 | 4/2014 | Hammad |
| 2014/0129942 A1 | 5/2014 | Rathod |
| 2014/0136422 A1 | 5/2014 | Jung et al. |
| 2014/0156500 A1 | 6/2014 | Lassen et al. |

(56) References Cited

U.S. PATENT DOCUMENTS

| | | |
|---|---|---|
| 2014/0156503 A1 | 6/2014 | Lassen et al. |
| 2014/0157375 A1 | 6/2014 | Britti et al. |
| 2014/0164398 A1 | 6/2014 | Smith et al. |
| 2014/0164519 A1 | 6/2014 | Shah |
| 2014/0258083 A1 | 9/2014 | Achanta et al. |
| 2014/0279329 A1 | 9/2014 | Dancel |
| 2014/0298485 A1 | 10/2014 | Gardner |
| 2015/0269506 A1 | 9/2015 | Britti et al. |
| 2015/0278944 A1 | 10/2015 | Searson et al. |
| 2015/0295906 A1 | 10/2015 | Ufford et al. |
| 2015/0310543 A1 | 10/2015 | DeBie |
| 2016/0055487 A1 | 2/2016 | Votaw et al. |
| 2016/0071175 A1 | 3/2016 | Reuss et al. |
| 2016/0092997 A1 | 3/2016 | Shen et al. |
| 2017/0200223 A1 | 7/2017 | Kasower |
| 2017/0278182 A1 | 9/2017 | Kasower |

FOREIGN PATENT DOCUMENTS

| | | |
|---|---|---|
| CN | 102663650 | 9/2012 |
| EP | 0 542 298 | 5/1993 |
| EP | 0 554 083 | 8/1993 |
| EP | 0 869 652 | 10/1998 |
| EP | 0 913 789 | 5/1999 |
| EP | 0 919 942 | 6/1999 |
| EP | 1 028 401 | 8/2000 |
| EP | 1 239 378 | 9/2002 |
| EP | 1 301 887 | 4/2003 |
| EP | 1 850 278 | 10/2007 |
| EP | 1 988 501 | 11/2008 |
| GB | 1 322 809 | 7/1973 |
| GB | 2 102 606 | 2/1983 |
| JP | 2003-016261 | 1/2003 |
| JP | 2005-208945 | 8/2005 |
| KR | 10-2000-0063313 | 11/2000 |
| KR | 10-2002-0039203 | 5/2002 |
| KR | 10-2007-0081504 | 8/2007 |
| KR | 10-2013-0107394 | 10/2013 |
| KR | 10-2004-0078798 | 9/2014 |
| RU | 2 181 216 | 4/2002 |
| WO | WO 91/16691 | 10/1991 |
| WO | WO 94/012943 | 6/1994 |
| WO | WO 95/012857 | 5/1995 |
| WO | WO 99/046710 | 9/1999 |
| WO | WO 00/011574 | 3/2000 |
| WO | WO 00/055778 | 9/2000 |
| WO | WO 00/065469 | 11/2000 |
| WO | WO 01/004821 | 1/2001 |
| WO | WO 01/009752 | 2/2001 |
| WO | WO 01/009792 | 2/2001 |
| WO | WO 01/039589 | 6/2001 |
| WO | WO 01/041355 | 6/2001 |
| WO | WO 01/057720 | 8/2001 |
| WO | WO 01/084281 | 11/2001 |
| WO | WO 02/013047 | 2/2002 |
| WO | WO 02/029636 | 4/2002 |
| WO | WO 2004/031986 | 4/2004 |
| WO | WO 2004/114160 | 12/2004 |
| WO | WO 2005/010683 | 2/2005 |
| WO | WO 2005/022348 | 3/2005 |
| WO | WO 2005/033979 | 4/2005 |
| WO | WO 2005/124619 | 12/2005 |
| WO | WO 2006/050278 | 5/2006 |
| WO | WO 2006/069199 | 6/2006 |
| WO | WO 2006/099081 | 9/2006 |
| WO | WO 2006/099492 | 9/2006 |
| WO | WO 2007/004158 | 1/2007 |
| WO | WO 2007/106393 | 9/2007 |
| WO | WO 2008/021061 | 2/2008 |
| WO | WO 2008/042614 | 4/2008 |
| WO | WO 2008/147918 | 12/2008 |
| WO | WO 2009/064694 | 5/2009 |
| WO | WO 2009/102391 | 8/2009 |
| WO | WO 2009/117468 | 9/2009 |
| WO | WO 2010/001406 | 1/2010 |
| WO | WO 2010/062537 | 6/2010 |
| WO | WO 2010/077989 | 7/2010 |
| WO | WO 2010/150251 | 12/2010 |
| WO | WO 2011/005876 | 1/2011 |
| WO | WO 2013/009920 | 1/2013 |
| WO | WO 2014/088895 | 6/2014 |
| WO | WO 2014/137759 | 9/2014 |

OTHER PUBLICATIONS

U.S. Appl. No. 12/705,489, filed Feb. 12, 2010, Bargoli et al.
U.S. Appl. No. 12/705,511, filed Feb. 12, 2010, Bargoli et al.
"A New Approach to Fraud Solutions", BasePoint Science Solving Fraud, pp. 8, 2006.
"ACS Company Birch & Davis Wins Texas CHIP Contract," PR Newswire, Section: Financial News, May 17, 2000, Dallas, TX, pp. 3.
Actuate, "Delivering Enterprise Information for Corporate Portals", White Paper, 2004, pp. 1-7.
"Aggregate and Analyze Social Media Content: Gain Faster and Broader Insight to Market Sentiment," SAP Partner, Mantis Technology Group, Apr. 2011, pp. 4.
Aharony et al., "Social Area Networks: Data Networking of the People, by the People, for the People," 2009 International Conference on Computational Science and Engineering, May 2009, pp. 1148-1155.
Aktas et al., "Personalizing PageRank Based on Domain Profiles", WEBKDD workshop: Webmining and Web Usage Analysis, Aug. 22, 2004, pp. 83-90.
Aktas et al., "Using Hyperlink Features to Personalize Web Search", WEBKDD workshop: Webmining and Web Usage Analysis, Aug. 2004.
"An Even Better Solution to Financing Elective Surgery . . . ", Unicorn Financial, pp. 7, http://web.archive.org/web/20000816161359/http://www.unicornfinancial.com/, as downloaded Oct. 15, 2008.
"Arizona Company Has Found Key in Stopping ID Theft," PR Newswire, New York, Aug. 10, 2005 http://proquest.umi.com/pqdweb?did=8801047118&sid=1&Fmt=3&clientId=19649&RQT=309&Vname=PQD.
"Authorizing Safety Net Public Health Programs," Hearing before the Subcommittee on Health of the Committee on Energy and Commerce, House of Representatives, One Hundred Seventh Congress, First Session, Serial No. 107-57, dated Aug. 1, 2001, 226 pgs.
ABC News Now:Money Matters, as broadcasted Nov. 15, 2005 with guest Todd Davis (CEO of Lifelock), pp. 6.
An Expert System for Determining Medicaid Eligibility, Journal of Medical Systems, vol. 12, Nov. 5, 1988, in 10 pages.
Announcing TrueProfiler, http://web.archive.org/web/20021201123646/http://www.truecredit.com/index.asp, dated Dec. 1, 2002, 2 pages.
Anonymous, "Credit-Report Disputes Await Electronic Resolution," Credit Card News, Chicago, Jan. 15, 1993, vol. 5, No. 19, p. 5.
Anonymous, "MBNA Offers Resolution of Credit Card Disputes," Hempstead, Feb. 2002, vol. 68, No. 2, p. 47.
Anonymous, "Feedback", Credit Management, ABI/INFORM Global, Sep. 2006, pp. 6.
Avery et al., "Consumer Credit Scoring: Do Situational Circumstances Matter?", Journal of Banking & Finance, vol. 28, 2004, pp. 835-856.
Awoonor-Williams, Princess Josephine, Ph.D. "Gender and Credit: An Analysis of Women's Experience in the Credit Market", ProQuest Dissertations and Theses, 2004, pp. 148.
Barry, Ellen, "Life, Liberty, and the Pursuit of Lipo," The Boston Phoenix, News & Opinion, dated Apr. 6, 1998, as downloaded at http://weeklywire.com/ww/04-06-98/boston_feature_1.html (1 of 12) [Oct. 15, 2008 2:35:25 PM].
Belford, Terrence, "Technology Quarterly: Computers, Internet Speeds Credit Checks System Tailored for Doctors, Dentists," The Globe and Mail (Canada), Section: Report on Business Special Reports, p. C10, Mar. 18, 1997.
"Beverly Hills Man Convicted of Operating 'Bust-Out' Schemes that Caused More than $8 Million in Losses", Department of Justice, Jul. 25, 2006, 2 Pgs.

(56) References Cited

OTHER PUBLICATIONS

"Beware of 'Who Viewed My Profile' Apps on Facebook" Tech for Luddites, Mar. 15, 2010 printed Sep. 27, 2013 http://www.techforluddites.com/2010/03/beware-of-who-viewed-my-profile-apps-on-facebook.html.
Bielski, Lauren, "Will you Spend to Thwart ID Theft?" ABA Banking Journal, Apr. 2005, pp. 54, 56-57, 60.
Bienkowski, Nik, "A New Tool for Portfolio Risk Management—Gold Bullion", Apr. 2003, pp. 6.
"Birch & Davis Wins Texas CHIP Contract," Birch & Davis Press Release, dated Jan. 4, 2000, 3 pgs., as downloaded from http://web.archive.org/web/20010304065515/www.birchdavis.com/txchip.htm (1 of 3) [Oct. 20, 2008 9:49:18 AM].
BlueCava, "What We Do", http://www.bluecava.com/what-we-do/, printed Nov. 5, 2012 in 3 pages.
Boss, J. Shira "Elective Surgery Without the Plastic: Low-Interest Medical Financing Provides Alternative to Credit Cards," factiva, Crain's New York Business, 2 pgs., dated Jun. 22, 1998.
Broward County CAP Grant Application, as printed on Aug. 10, 2009, 41 pgs.
Burr Ph.D., et al., "Utility Payments as Alternative Credit Data: A Reality Check", Asset Builders of America, Inc., Oct. 5, 2006, pp. 1-18, Washington, D.C.
"Bust-Out Schemes", Visual Analytics Inc. Technical Product Support, Newsletter vol. 4, Issue 1, Jan. 2005, pp. 7.
Buxfer, http://www.buxfer.com/ printed Feb. 5, 2014 in 1 page.
Caliendo, et al., "Some Practical Guidance for the Implementation of Propensity Score Matching", IZA:Discussion Paper Series, No. 1588, Germany, May 2005, pp. 32.
Calnan, Christopher, "Tenet, Fair Isaac invest $20M in startup," MHT, Mass High Tech: The Journal of New England Technology, dated Jul. 23, 2007, 2 pgs.
Capps et al., "Recent Changes in Texas Welfare and Work, Child Care and Child Welfare Systems," Assessing the New Federalism, The Urban Institute, State Update No. 1, 24 pgs., Jun. 2001.
CAPStone Newsletter, Sep. 2001, 8 pgs., as downloaded from http://web.archive.org/web/20011213115738/www.capcommunity.hrsa.gov/Newsletter/Newsletter12.htm (1 of 8) [Oct. 18, 2008 2:39:47 PM].
Card Marketing, Use the Latest CRM Tools and Techniques, www.CardForum.com, vol. 5 No. 10, Dec. 2001.
Check, http://check.me/ printed Feb. 5, 2014 in 3 pages.
Cheney, Karen, "Fix Your Nose, If You Wish, But Not With This New Loan," Money Magazine, vol. 27, No. 5, 1 pg., dated May 1, 1998.
Chores & Allowances, "Do Kids Have Credit Reports?" Oct. 15, 2007, http://choresandallowances.blogspot.com/2007/10/do-kids-have-credit-reports.html, pp. 5.
Comlounge.net, "plonesocial.auth.rpx" http://web.archive.org/web/20101026041841/http://comlounge.net/rpx as captured Oct. 26, 2010 in 9 pages.
CreditAnalyst, Digital Matrix Systems, as printed out Mar. 4, 2008, pp. 2.
CreditKarma, http://www.creditkarma.com printed Feb. 8, 2013 in 2 pages.
CreditSesame, http://www.creditsesame.com/how-it-works/our-technology/ printed Feb. 5, 2013 in 2 pages.
CreditSesame; "FAQ's"; http://www.creditsesame.com/how-we-help/faqs/#cb printed Dec. 5, 2011 in 8 pages.
CreditSesame; "Promote Your Financial Responsibility to Get an Edge in Life"; http://www.creditsesame.com/credit-badge/ printed Dec. 2, 2011 in 1 page.
CreditToolkit, Digital Matrix Systems, as printed out Mar. 4, 2008, pp. 2.
CreditXpert, http://www.creditxpert.com/Products/individuals.asp printed Oct. 12, 2012 in 1 page.
"Credit Information Bureaus and 'CIBIL'", http://www.icicibank.com/cibil.html printed Aug. 22, 2012 in 3 pages.

Collins, Michael J., "Exploring the Design of Financial Counseling for Mortgage Borrowers in Default," Journal of Family and Economic Issues, Springer Science+Business Media, Mar. 13, 2007, pp. 207-226.
"Consumers Gain Immediate and Full Access to Credit Score Used by Majority of U.S. Lenders", PR Newswire, ProQuest Copy, Mar. 19, 2001, p. 1.
"CreditCheck Monitoring Services," Dec. 11, 2000, pp. 1, lines 21-23.
"Credit Improvement", CreditRepair.com, Mar. 10, 2010, http://web.archive.org/web/20100310134914/http://www.creditrepair.com/credit/, as archived Mar. 10, 2010 in 2 pages.
Credit Plus, Inc., "Score Wizard", http://web.archive.org/web/20030806080310/www.creditplus.com/scorewizard.asp, as archived Aug. 6, 2003 in 1 page.
CreditXpert Inc., CreditXpert 3-Bureau Comparison™, 2002, pp. 5, http://web.archive.org/web/20030608171018/http://creditxpert.com/CreditXper%203-Bureau%20Comparison(TM)%20sample.pdf.
CreditXpert Inc., CreditXpert Credit Score & Analysis™, Jan. 11, 2000, pp. 6, http://web.archive.org/web/20030611070058/http://www.creditxpert.com/CreditXpert%20Score%20&%20Analysis%20and%20Credit%20Wizard%20sample.pdf.
CreditXpert Inc., CreditXpert Essentials™, Advisor View-Experian on Jul. 7, 2003, http://www.creditxpert.com/cx_ess_app.pdf.
CreditXpert Inc., CreditXpert Essentials™, Advisor View—TransUnion on Oct. 10, 1999, pp. 6, http://web.archive.org/web/20041211052543/http://creditxpert.com/cx_ess_app.pdf.
CreditXpert Inc., CreditXpert Essentials™, Applicant View—TransUnion on Oct. 10, 1999, pp. 6, http://www.creditxpert.com/cx_ess_app.pdf.
CreditXpert Inc., CreditXpert What-If Simulator™, 2002, pp. 8, http://web.archive.org/web/20030630132914/http://creditxpert.com/CreditXper%20What-If%20Simulator(TM)%20sample.pdf.
Cullen, Terri; "The Wall Street Journal Complete Identity Theft Guidebook:How to Protect Yourself from the Most Pervasive Crime in America"; Chapter 3, pp. 59-79; Jul. 10, 2007.
"D&B Corporate Family Linkage", D&B Internet Access for U.S. Contract Customers, https://www.dnb.com/ecomp/help/linkage.htm as printed Dec. 17, 2009, pp. 1.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Day, Jo and Kevin; "ID-ology: A Planner's Guide to Identity Theft"; Journal of Financial Planning:Tech Talk; pp. 36-38; Sep. 2004.
"Debt Settlement: Watch Video on how to Pay Your Debt Faster", http://www.debtconsolidationcare.com/debt-settlement.html printed Jan. 9, 2013 in 6 pages.
Demby, Elayne, "Special Report: Letting Consumers Know the Score—and More", Collections and Credit Risk, New York, Feb. 2003, vol. 8, Issue 2, p. 53, pp. 3.
DentalFinancing.com, "Financial services for patients and dental professionals,", 7 pgs., as downloaded from http://web.archive.org/web/20010607151954/www.dentalfinancing.com/dentist/index.asp (1 of 2) [Oct. 15, 2008 3:55:16 PM].
DiBartolomeo, Dan, "Portfolio Optimization: The Robust Solution," Prudential Securities Quantitative Conference, Dec. 21, 1993, pp. 8.
Dietz, Ellen, "Dental Office Management," 8 pgs., pp. 316-321, Copyright 2000.
Downes et al., Dictionary of Finance and Investment Terms, Fifth Edition, 1998, pp. 332-333.
Dymi, Amilda, Need for Leads Spurs Some Upgrades, Origination News—Special Report, May 1, 2008, vol. vol. 17, Issue No. 8, Pages p. 24, Atlanta, Copyright 2008 SourceMedia, Inc.
eFunds Introduces QualiFileSM, Deluxe Corporation, eFunds Press Release and Product Launch, Sep. 23, 1999, Milwaukee, WI.
Electronic Privacy Information Center, "The Fair Credit Reporting Act"15 USC 1681 (1992), 10 pgs., as downloaded from http://epic.org/privacy/financial/fcra.html on Mar. 19, 2008.
Elliehausen et al., The Impact of Credit Counseling on Subsequent Borrower Behavior, The Journal of Consumer Affairs, Summer 2007, vol. 41, No. 1, pp. 1-28.

(56) References Cited

OTHER PUBLICATIONS

Ellwood, Marilyn, "The Medicaid Eligibility Maze: Coverage Expands, but Enrollment Problems Persist, Findings from a Five-State Study," Mathematics Policy Research, Inc., Occasional Paper No. 30, 56 pgs., Dec. 1999.
Equifax Consumer Credit Report http://www.equifax.com/home/, as retrieved on Sep. 17, 2008.
Equifax; "Equifax Credit Watch"; https://www.econsumer.equifax.co.uk/consumer/uk/sitepage.ehtml, dated Jun. 27, 2007 on www.archive.org.
Ettorre, "Paul Kahn on Exceptional Marketing," Management Review, vol. 83, No. 11, Nov. 1994, pp. 48-51.
"Equifax and FICO Serve Consumers", Mortgage Servicing News, Mar. 2001, vol. 5, No. 3, p. 19.
Expensr.com http://www.expensr.com/, as retrieved on Sep. 17, 2008.
Experian Consumer Credit Report http://www.experian.com/, as retrieved on Sep. 17, 2008.
Experian, Custom Strategist and Qualifile from Funds, 2000, in 2 pages.
Experian, "Enabling e-business", White Paper, Jan. 2001, pp. 21.
Experian, "Instant Prescreen: Offer preapproved credit at the point of sale", Oct. 2000, pp. 2.
Experian, "Experian Rental Payment Data," http://www.experian.com/rentbureau/rental-data.html printed Nov. 22, 2013 in 2 pages.
Facebook, "Facebook helps you connect and share with the people in your life," www.facebook.com printed Nov. 16, 2010 in 1 page.
Fair Isaac Corporation, myFICO: Calculators: Credit Assessment, as printed Jun. 8, 2005 in 2 pages, http://www.myfico.com/CreditEducation/Calculators/CreditAssessment.aspx.
Fair Isaac Corporation, myFICO: Help: FICO Score Simulator, as printed Jun. 8, 2005 in 2 pages, http://www.myfico.com/Help/Simulator.aspx?fire=5.
Fair Isaac Corporation, myFICO: Products: Suze Orman's FICO Kit Platinum, as printed Jun. 8, 2005 in 4 pages, http://www.myfico.com/Products/FICOKit/Description.aspx.
Fair Isaac Corporation, myFICO: Products: Suze Orman's FICO® Kit Platinum: FICO Score Check, as printed Jun. 7, 2005 in 1 page, http://www.myfico.com/Products/FICOKit/Sample03.html.
Fair Isaac Corporation, myFICO: Sample: FICO Score Simulator, as printed Jun. 8, 2005 in 5 pages, http://www.rnyfico.com/Content/Samples/Sample_ScoreSimulator.asp.
Fair Isaac Corporation, myFICO: Sample: FICO Score Simulator: Max Out All Your Credit Cards, as printed Jun. 8, 2005 in 2 pages, http://www.myfico.com/Content/Samples/Sample_ScoreSimulatorResults.asp?Simulation=4&ReportID=1&productID=&Execute.x=1058tExecute.y=23.
Fair Isaac Corporation, myFICO: Sample: FICO Score Simulator: Miss Payments on All Accounts With a Payment Due, as printed Jun. 8, 2005 in 2 pages, http://www.myfico.com/Content/Samples/Sample_ScoreSimulatorResults.asp?miss_payment=radiobutton&Simulation=2&ReportID=1&ProductID=&Execute.x81&Execute.y=28.
Fair Isaac Corporation, myFICO: Sample: FICO Score Simulator: Pay Down Delinquent Balances First, as printed Jun. 8, 2005 in 2 pages, http://www.myfico.com/Content/Samples/Sample_ScoreSimulatorResults.asp?textfieldCC=750&Simulation=7&ReportID=1&ProductID=&PayDelinquent.x=78&PayDelinquent.y=30.
Fair Isaac Corporation, myFICO: Sample: FICO Score Simulator: Suggested Best Action, as printed Jun. 8, 2005 in 2 pages, http://www.myfico.com/Content/Samples/Sample_ScoreSimulatorResults.asp?Simulation=111&ReportID=1&ProductID=&TopAction.x=66&TopAction.y=16.
FamilySecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.
Felsenthal, Edward, "Health Costs; Managed Care Helps Curb Costs, Study Says," The Wall Street Journal, dated Aug. 12, 1991.
"Fictitious Business Name Records", Westlaw Database Directory, http://directory.westlaw.com/scope/default.asp?db=FBN-ALL&RS-W...&VR=2.0 as printed Dec. 17, 2009, pp. 5.
"Fighting the New Face of Fraud", FinanceTech, http://www.financetech.com/showArticle.jhtml?articleID=167100405, Aug. 2, 2005.
"Financing Medical Procedures a Lucrative But Risky Business," Credit Risk Management Report, vol. 10, Issue 15, 2 pgs., dated Aug. 7, 2000.
Fisher, Joseph, "Access to Fair Credit Reports: Current Practices and Proposed Legislation," American Business Law Journal, Fall 1981, vol. 19, No. 3, p. 319.
Fitzpatrick, Alex, "Facebook Monitors Your Chats for Criminal Activity [Report]," Mashable, Jul. 12, 2012 printed Sep. 27, 2013 http://mashable.com/2012/07/12/facebook-scanning-chats/.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
Gibbs, Adrienne; "Protecting Your Children from Identity Theft," Nov. 25, 2008, http://www.creditcards.com/credit-card-news/identity-ID-theft-and-kids-children-1282.php, pp. 4.
Gilje, Shelby, "Credit Agency Moving Into Health Care," NewsRoom, The Seattle Times, Section: SCENE, Mar. 22, 1995, pp. 3, http://web2.westlaw.com/result/documenttext.aspx?rs=WLW8.03&ss+CNT&rp=%2fWelc . . . .
Giudici, Paolo, "Bayesian Data Mining, with Application to Benchmarking and Credit Scoring," Applied Stochastic Models in Business and Industry, 2001, vol. 17, pp. 69-81.
"GLBA Compliance and FFIEC Compliance" http://www.trustwave.com/financial-services.php printed Apr. 8, 2013 in 1 page.
Goldstein, Jacob, "The Newest Vital Sign: Your Credit Score," The Wall Street Journal, Health Blog, as viewed at http://blogs.wsj.com/health/2008/03/18/the-newest-vital-sign-your-cr, 2008, pp. 3.
Gordon et al., "Identity Fraud: A Critical National and Global Threat," LexisNexis, Oct. 28, 2003, pp. 1-48.
Gualtieri et al., "The Forrester Wave™: Big Data Streaming Analytics, Q1 2016", Forrester®, Mar. 30, 2016, pp. 14, https://www.sas.com/content/dam/SAS/en_us/doc/analystreport/forrester-big-data-streaming-analytics-108218.pdf.
"Guide to Benefits, MasterCard® Cardholder Smart Shopper Benefits", May 2005, pp. 10.
Henry, M.D., Kimberly A., "The Face-Lift Sourcebook," copyright 2000, 3 pgs. (p. 207).
Herron, Janna, "Social Media-Based Credit Score?", http://www.bankrate.com/financing/credit-cards/social-media-based-credit-score/, posted Friday, Jan. 13, 2012, printed Nov. 22, 2013 in 2 pages.
Herzberg, Amir, "Payments and Banking with Mobile Personal Devices," Communications of the ACM, May 2003, vol. 46, No. 5, pp. 53-58.
Hoofnagle, Chris Jay, "Identity Theft: Making the Known Unknowns Known," Harvard Journal of Law & Technology, Fall 2007, vol. 21, No. 1, pp. 98-122.
Hunt, Robert M.; Whither Consumer Credit Counseling? Business Review, Dec. 31, 2005, pp. 9-20.
ID Analytics, "ID Analytics® Consumer Notification Service" printed Apr. 16, 2013 in 2 pages.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Columbus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire,

(56) References Cited

OTHER PUBLICATIONS

New York, Jun. 13, 2005 http://proquest.umi.com/pqdweb?did=852869731&sid=1&Fmt=3&clientId=19649&RQT=309&Vname=PQD.

Ideon, Credit-Card Registry that Bellyflopped this Year, Is Drawing some Bottom-Fishers, The Wall Street Journal, Aug. 21, 1995, pp. C2.

"Improving the Implementation of State Children's Health Insurance Programs for Adolescents Report of an Invitational Conference Sponsored by the American Academy of Pediatrics, Section on Adolescent Health," Pediatrics, Official Journal of the American Academy of Pediatrics, Section on Adolescent Health, Sep. 26-27, 1999, 9 pages.

IndiCareTM, On-Line Patient Assistant Program, Website Users Manual, JBI Associates, LLC, 1997.

Information Brokers of America, "Information Brokers of America Child Identity Theft Protection" http://web.archive.org/web/20080706135451/http://iboainfo.com/child-order.html as archived Jul. 6, 2008 in 1 page.

Information Brokers of America, "Safeguard Your Child's Credit", http://web.archive.org/web/20071215210406/http://www.iboainfo.com/child-id-protect.html as archived Dec. 15, 2007 in 1 page.

Intelius, "People Search—Updated Daily, Accurate and Fast!" http://www.intelius.com/people-search.html?=&gclid-CJqZIZP7paUCFYK5KgodbCUJJQ printed Nov. 16, 2010 in 1 page.

"Intelligent Miner Applications Guide", IBM Corp., Apr. 2, 1999, Chapters 4-7, pp. 33-132.

Iovation, Device Identification & Device Fingerprinting, http://www.iovation.com/risk-management/device-identification printed Nov. 5, 2012 in 6 pages.

Jacob et al., A Case Study of Checking Account Inquiries and Closures in Chicago, The Center for Financial Services Innovation, Nov. 2006.

"Judging Credit: Consumers Need Better Finance Tools", News Journal, Daytona Beach, FL, Dec. 28, 2002.

Kent, Heather, "Huge declines in price as competition heats up in Vancouver's booming laser-surgery market," CMAJ, Oct. 5, 1999; 161 (7), pp. 857-858.

Klein, et al., "A Constant-Utility Index of the Cost of Living", The Review of Economic Studies, pp. 84-87, vol. XV-XVI, Kraus Reprint Corporation, New York, 1960.

Klein, et al., "An Econometric Model of the United States: 1929-1952", North-Holland Publishing Company, Amsterdam, 1955, pp. 4-41.

Klein, Lawrence R., "The Keynesian Revolution", New York, The MacMillan Company, 1947, pp. 56-189.

Lan, Joe, "The Top Portfolio Management Software," http://www.aaii.com/computerizedinvesting/article/the-top-portfolio-management-software, Includes Discussion thread, Fourth Quarter 2011, pp. 17.

Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.

Lavelle, Marianne, "Health Plan Debate Turning to Privacy Some Call for Safeguards on Medical Disclosure. Is a Federal Law Necessary?," The National Law Journal, vol. 16, No. 39, dated May 30, 1994, as downloaded from http://web2.westlaw.com/result/.

Lee, W.A., "Experian Eyes Payments, Mulls Deals" American Banker: The Financial Services Daily, 2pgs., New York, NY, May 30, 2003.

Lee, W.A. "Experian, on Deal Hunt, Nets Identity Theft Insurer", American Banker: The Financial Services Daily, Jun. 4, 2003, New York, NY, 1 page.

Lee, W.A. "Fair Isaac Taps Institutions for Credit Score Distribution", American Banker: The Financial Services Daily, New York, NY, Apr. 9, 2002, vol. 167, Issue 67, 1 Page.

Lee, W.A., "Money, Quicken, and the Value of Alliances", American Banker: The Financial Services Daily, 2pgs., New York, NY, Jul. 28, 2003.

LendingTree.com, "Lender Ratings & Reviews," http://web.archive.org/web/20091015043716/http://www.lendingtree.com/lender-reviews/, Oct. 15, 2009, in 21 pages.

Leskovec, Jure, "Social Media Analytics: Tracking, Modeling and Predicting the Flow of Information through Networks", WWW 2011-Tutorial, Mar. 28-Apr. 1, 2011, Hyderabad, India, pp. 277-278.

Letter to Donald A. Robert from Carolyn B. Maloney, dated Oct. 31, 2007, pp. 2.

Letter to Donald A. Robert from Senator Charles E. Schumer, dated Oct. 11, 2007, pp. 2.

Letter to Harry C. Gambill from Carolyn B. Maloney, dated Oct. 31, 2007, pp. 2.

Letter to Harry C. Gambill from Senator Charles E. Schumer, dated Oct. 11, 2007, pp. 2.

Letter to Richard F. Smith from Carolyn B. Maloney, dated Oct. 31, 2007, pp. 2.

Letter to Richard F. Smith from Senator Charles E. Schumer, dated Oct. 11, 2007, pp. 2.

Li et al., "Automatic Verbal Information Verification for User Authentication", IEEE Transactions on Speech and Audio Processing, vol. 8, No. 5, Sep. 2000, pp. 585-596.

LifeLock, "How LifeLock Works," http://www.lifelock.com/lifelock-for-people printed Mar. 14, 2008 in 1 page.

LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.

LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.

LifeLock, Various pages, www.lifelock.com/, 2007.

Littwin, Angela, "Beyond Usury: A Study of Credit-Card Use and Preference Among Low-Income Consumers", Texas Law Review, vol. 86, No. 3, pp. 451-506; Feb. 2008.

Lobo, Jude, "MySAP.com Enterprise Portal Cookbook," SAP Technical Delivery, Feb. 2002, vol. 1, pp. 1-13.

Lorette, Kristie, "How to Successfully Dispute Inaccuracies on Your Credit Report," http://web.archive.org/web/20110531184149/http://www.quizzle.com/blog/2011/03/how-to-successfully-dispute-inaccuracies-on-your-credit-report/, Mar. 25, 2011, in * pages.

Loshin, Intelligent Enterprise: Better Insight for Business Decisions, "Value-Added Data: Merge Ahead", Feb. 9, 2000, vol. 3, No. 3, 5 pages.

Lund, Graham, "Credit Bureau Data: Maximizing the Benefits," Credit Management, May 2004, ProQuest Central, pp. 44-45.

Magid, Lawrence, J., Business Tools: When Selecting an ASP Ensure Data Mobility, Los Angeles Times, Los Angeles, CA, Feb. 26, 2001, vol. C, Issue 4, pp. 3.

"Managing Debt?" Federal Trade Commission: Consumer Information, http://www.consumer.ftc.gov/articles/0158-managing-debt, printed Mar. 22, 2013 in 4 pages.

Manilla, http://www.manilla.com/how-it-works/ printed Feb. 5, 2014 in 1 page.

Mathematics Policy Research, Inc., "1998 Health Care Survey of DoD Beneficiaries: Technical Manual," Jul. 1999.

McGovern, Celeste, Jayhawk Medical Acceptance. (Brief Article), Alberta Report, 1 pg., dated Aug. 23, 1999.

McLaughlin, Nancy H., "Homeless, pregnant and alone Dana Sides knows her baby is likely to come in a month, but she has no idea where she will go after leaving the hospital," NewsRoom, Greensboro News & Record (NC), Section: General News, dated Dec. 6, 2001.

"MediCredit Announces Major Investment from Medstone; Financing Will Enable Dramatic Expansion of Online Services," Business Wire, pp. 2, dated May 12, 2000.

MediCredit, Patient Financing, "Thought you couldn't afford Cosmetic Surgery?," 3 pgs., as downloaded from http://web.archive.org/web/19970601060333/http://www.medicredit.com/ (1 of 2) [Oct. 15, 2008 3:16:31 PM].

Medick et al., "German Agency to Mine Facebook to Assess Creditworthiness", Jun. 7, 2012, http://www.spiegel.de/international/

(56) References Cited

OTHER PUBLICATIONS germany/german-credit-agency-plans-to-analyze-individual-facebook-pages-a-837539.html printed Nov. 22, 2013 in 2 pages.
Merriam Webster's Collegiate Dictionary, 10th Edition, 1999, p. 79.
Meyers et al., "Using Your Social Networking Accounts to Log Into NPR.org," NPR.org, Jun. 24, 2010, http://web.archive.org/web/20100627034054/http://www.npr.org/blogs/inside/2010/06/24/128079309/using-your-social-networking-accounts-to-log-into-npr-org in 3 pages.
Micarelli et al., "Personalized Search on the World Wide Web," The Adaptive Web, LNCS 4321, 2007, pp. 195-230.
MicroBilt, "PRBC Credit Reporting Agency—Payment Reporting Builds Credit," retrieved from http://www.microbilt.com/nontraditional-credit-report.aspx and corresponding "Sample Report," retrieved from http://www.microbilt.com/pdfs/PRBC%20Sample%20Report%20(complete).pdf printed Nov. 21, 2013 in 8 pages.
Microfinance Africa, "Philippines: Microfinance Players to get Their Own Credit Info Bureau," Apr. 5, 2011, http://microfinanceafrica.net/microfinance-around-the-world/philippines-microfinance-players-to-get-their-own-credit-info-bureau/ printed Nov. 22, 2013 in 2 pages.
Microsoft, "Expand the Reach of Your Business," Microsoft Business Solutions, 2004, in 16 pages.
Miller, Margaret, "Credit Reporting Systems Around the Globe: The State of the Art in Public and Private Credit Registries", Jun. 2000, pp. 32, http://siteresources.worldbank.org/INTRES/Resources/469232-1107449512766/Credit_Reporting_Systems_Around_The_Globe.pdf.
Mint.com, http://www.mint.com/ printed Sep. 18, 2008 in 2 pages.
Mint.com, http://www.mint.com/how-it-works/ printed Feb. 5, 2013 in 2 pages.
MS Money Software by Microsoft http://www.microsoft.com/Money/default.mspx as retrieved on Sep. 17, 2008.
Mvelopes, http://www.mvelopes.com/ printed Feb. 5, 2014 in 2 pages.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
My ID Alerts, "Why ID Alerts" http://www.myidalerts.com/why-id-alerts.jsps printed Apr. 3, 2012 in 2 pages.
My ID Alerts, "How it Works" http://www.myidalerts.com/how-it-works.jsps printed Apr. 3, 2012 in 3 pages.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
"Name Availability Records", Westlaw Database Directory, http://directoy.westlaw.com/scope/default.asp?db=NA-ALL&RS=W . . .&VR=2.0 as printed Dec. 17, 2009, pp. 5.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm DVD and Child Identification Kit", Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
NewsRoom, "CIGNA Report Withdrawn As Foe Sees Opening," Insurance Regulator, State Survey, Sep. 9, 1996, vol. 8, Issue 34, pp. 4.
"New for Investors: Asset Allocation, Seasoned Returns and More," Prosper, http://blog.prosper.com/2011/10/27/new-for-investors-asset-allocation-seasoned-returns-and-more/, pp. 4.
Next Card: About Us, http://web.cba.neu.edu/~awatson/NextCardCase/NextCardAboutUs.htm printed Oct. 23, 2009 in 10 pages.
Occasional CF Newsletter; http://www.halhelms.com/index.cfm?fuseaction=newsletters.oct1999; Oct. 1999.
Ogg, Erica "Apple Cracks Down on UDID Use", http://gigaom.com/apple/apple-cracks-down-on-udid-use/ printed Nov. 5, 2012 in 5 pages.
Organizing Maniac's Blog—Online Receipts Provided by MyQuickReceipts.com, http://organizingmaniacs.wordpress.com/2011/01/12/online-receipts-provided-by-myquickreceipts.com/ dated Jan. 12, 2011 printed Oct. 16, 2012 in 3 pages.
Pagano, et al., "Information Sharing in Credit Markets," Dec. 1993, The Journal of Finance, vol. 48, No. 5, pp. 1693-1718.
Partnoy, Frank, Rethinking Regulation of Credit Rating Agencies: An Institutional Investor Perspective, Council of Institutional Investors, Apr. 2009, pp. 21.
Paustian, Chuck, "Every Cardholder a King Customers get the Full Treatment at Issuers' Web Sites," Card Marketing, New York, Mar. 2001, vol. 5, No. 3, pp. 4.
Pennsylvania Law Weekly, "Discriminating Against Victims Admitting Domestic Abuse Can Lead to Denial of Insurance Coverage," vol. XVIII, No. 26, dated Jun. 26, 1996, 2 pgs., as downloaded from http://web2.westlaw.com/result/documenttext.aspx?rs-WLW8.
People Finders, http://www.peoplefinders.com/?CMP=Google&utm_source=google&utm_medium=cpc printed Nov. 16, 2010 in 1 page.
People Lookup, "Your Source for Locating Anyone!" www.peoplelookup.com/people-search.html printed Nov. 16, 2010 in 1 page.
People Search, "The Leading Premium People Search Site on the Web," http://www.peoplesearch.com printed Nov. 16, 2010 in 2 pages.
PersonalCapital.com, http://www.personalcapital.com/how-it-works printed Feb. 5, 2014 in 5 pages.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
Planwise, http://planwise.com printed Feb. 8, 2013 in 5 pages.
Polatoglu et al., "Theory and Methodology, Probability Distributions of Cost, Revenue and Profit over a Warranty Cycle", European Journal of Operational Research, Jul. 1998, vol. 108, Issue 1, pp. 170-183.
Powerforms: Declarative Client-Side for Field Validation, ISSN 1386-145x, Dec. 2000.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
Privacy Rights Clearinghouse, "Identity Theft: What to do if it Happens to You," http://web.archive.org/web/19990218180542/http://privacyrights.org/fs/fs17a.htm printed Feb. 18, 1999.
"Qualifying for Debt Settlement", http://www.certifieddebt.com/debt/settlement-qualifications.shtml printed Jan. 9, 2013 in 2 pages.
Quantix Software, "Investment Account Manager," available at https://www.youtube.com/watch?v=1UwNTEER1Kk, as published Mar. 21, 2012.
Quicken Online by Intuit http://www.quicken.intuit.com/, as retrieved on Sep. 17, 2008.
"Quicken Support", http://web.archive.org/web/20071231040130/http://web.intuit.com/support/quicken/docs/d_gif.html as archived Dec. 31, 2007 in 6 pages.
Ramaswamy, Vinita M., Identity-Theft Toolkit, The CPA Journal, Oct. 1, 2006, vol. 76, Issue 10, pp. 66-70.
Rap Interactive, Inc. and Web Decisions: Proudly Presents Live Decisions, A Powerful New Information and Technology Resource that Revolutionizes Interactive Marketing, downloaded from www.webdecisions.com/pdf/LiveDecisions_Bro.pdf, as printed on Aug. 13, 2007.
Rawe, Julie; "Identity Thieves", Time Bonus Section, Inside Business, Feb. 2002, pp. 2.
"Recognition and use by Appraisers of Energy-Performance Benchmarking Tools for Commercial Buildings," prepared by the Institute for Market Transformation, NYSERDA, Feb. 2003, pp. 6.

(56) References Cited

OTHER PUBLICATIONS

Repici et al., "The Comma Separated Value (CSV) File Format", http://creativyst.com/Doc/Articles/CSV/CSV01.htm, Creativyst, Inc., 2002, pp. 10.
"Resolve Debt for Less: With Help from Freedom Financial" http://www.debtsettlementusa.com/ printed Jan. 9, 2013 in 6 pages.
Romig, Shane, "The Truth About Credit Repair", Credit.com, May 5, 2010, http://web.archive.org/web/20100505055526/http://www.credit.com/credit_information/credit_help/The-Truth-About-Credit-Repair.jsp printed Mar. 22, 2013 in 4 pages.
Roth, Andrew, "CheckFree to Introduce E-Mail Billing Serving," American Banker, New York, Mar. 13, 2001, vol. 166, No. 49, pp. 3.
Rubin, Rita, "Cosmetic Surgery on Credit, Finance plans let patients reconstruct now, pay later," The Dallas Morning News, 2 pgs., dated Sep. 10, 1988.
SAS, "SAS® Information Delivery Portal", Fact Sheet, 2008, in 4 pages.
Scholastic Inc.:Parent's Request for Information http://web.archive.org/web/20070210091055/http://www.scholastic.com/inforequest/index.htm as archived Feb. 10, 2007 in 1 page.
Scholastic Inc.:Privacy Policy http://web.archive.org/web/20070127214753/http://www.scholastic.com/privacy.htm as archived Jan. 27, 2007 in 3 pages.
Screenshot for Investment Account Manager v.2.8.3, published at http://www.aaii.com/objects/get/1642.gif by at least Aug. 30, 2011 in 1 page.
SearchAmerica, "Payment Advisor Suite TM", Solutions, 2009, pp. 2.
Selz, Michael, "Lenders Find Niche in Cosmetic Surgery That Isn't Insured—But Since You Can't Repossess a Nose Job, Risks Aren't Restricted to the Patients," Wall Street Journal, New York, N.Y., Jan. 1997, p. A.1, 3 pgs.
ServiceObjects, "DOTS Web Services—Product Directory", http://www.serviceobjects.com/products/directory_of_web_services.asp printed Aug. 17, 2006 in 4 pages.
"Settling Your Debts—Part 1 in Our Debt Settlement Series", http://www.creditinfocenter.com/debt/settle_debts.shtml printed Jan. 9, 2013 in 6 pages.
ShoeBoxed, https://www.shoeboxed.com/sbx-home/ printed Oct. 16, 2012 in 4 pages.
Simpson, Glyn, "Microsoft (MS) Money (MSMoney FAQ, Help and Information Pages", pp. 2, Copyright © Glyn Simpson 1998-2007, http://web.archive.org/web/20071018075531/http://money.mvps.org/faq/article/196.aspx.
Singletary, Michelle "Ratings for the Credit Raters", The Washington Post, The Color of Money column, Mar. 24, 2002 in 1 page.
Singletary, Michelle, "Score One for Open Credit Ratings", The Washington Post, Washington DC, Jun. 18, 2000, 3 pages.
Singletary, Michelle, "The Littlest Victims of ID Theft", The Washington Post, The Color of Money, Oct. 4, 2007.
Stanton, T.H., "Credit Scoring and Loan Scoring as Tools for Improved Management of Federal Credit Programs", Financier, Philadelphia, Summer 1999, vol. 6, 36 pages.
"StarNet Financial, Inc. Acquires Proprietary Rights to Sub-Prime Underwriting System Through Strategic Alliance With TRAkkER Corporation", PR Newswire, Dallas, TX, Sep. 13, 1999.
State of Wisconsin, Division of Health Care Financing, Department of Health and Family Services: 1999-2001 Biennial Report, pp. 17-21.
Stauffer et al., "Using HTML 3.2," Second Edition, 1996, Que Publishing, pp. 192-193.
Stein, Benchmarking Default Prediction Models: Pitfalls and Remedies in Model Validation, Moody's KMV, Revised Jun. 13, 2002, Technical Report #020305; New York.
Sumner, Anthony, "Tackling the Issue of Bust-Out Fraud", Experian: Decision Analytics, Dec. 18, 2007, pp. 24.
Sumner, Anthony, "Tackling the Issue of Bust-Out Fraud", e-News, Experian: Decision Analytics, pp. 4, [Originally Published in Retail Banker International Magazine Jul. 24, 2007].

Tao, Lixin, "Shifting Paradigms with the Application Service Provider Model"; Concordia University, IEEE, Oct. 2001, Canada.
Texas Department of Human Services, 1999 Annual Report, 60 Years of Progress, Medial Services 9P137, Publication No. DHS-600-FY99.
thatlook.com, Cosmetic Surgery Financing, 3 pgs, as downloaded from http://web.archive.org/web/200001214113900/www.thatlook.com/cosmetic_surger_financing.cfm (1 of 2) [Oct. 15, 2008 4:11:47 PM].
Thoemmes, Felix, "Propensity Score Matching in SPSS", Center for Educational Science and Psychology, University of Tübingen, Jan. 2012.
Thomas, David, "Report on Networks and Electronic Communications Newcourt Credit Turns to Extranet Services / A PC Connects to 1,200 Users At Once", The Globe and Mail (Canada), Section: Report on Business Special Report, Nov. 12, 1996, pp. 2.
TRAkkER Corporation website, trakkercorp.com, TRAkkER Software Description, May 26, 2000, available at http://web.archive.org/web/20000526234204/http://trakkercorp.com/page4.html.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
TransUnion Consumer Credit Report http://www.transunion.com/, as retrieved on Sep. 17, 2008.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
US Legal, Description, http://www.uslegalforms.com/us/US-00708-LTR.htm printed Sep. 4, 2007 in 2 pages.
Vamosi, Robert, "How to Handle ID Fraud's Youngest Victims," Nov. 21, 2008, http://news.cnet.com/8301-10789_3-10105303-57.html.
Waggoner, Darren J., "Having a Global Identity Crisis," Collections & Credit Risk, Aug. 2001, vol. vol. 6, No. 8, pp. 6.
Washington State Office of Public Defense, "Criteria and Standards for Determining and Verifying Indigency," dated Feb. 9, 2001.
Watts, Craig, "Consumers Now Can Know What Loan Rate Offers to Expect Based on Their FICO Credit Score at MyFICO.com," Mar. 6, 2002, pp. 2, http://www.myfico.com/PressRoom/PressReleases/2002_03_06.aspx.
Watts, Craig, "Fair, Isaac and Equifax Give Consumers New Score Power Tools Offering Greater Insights for Managing Their Credit Health," May 21, 2002, pp. 3, http://www.myfico.com/PressRoom/PressReleases/2002_05_21.aspx.
Webpage printed from http://www.magnum.net/pdfs/RapUpBrochure.pdf as printed Mar. 3, 2008.
"We Eliminate Bad Debt", as printed from http://www.webcreditbureau.com/start/, dated Aug. 22, 2012, 1 Page.
"Web Site Fuels Elective Surgery Trend; The Complete Resource to Paying for Cosmetic Surgery, Laser Vision Correction and Cosmetic Dentistry," Business Wire, Apr. 7, 1999, pp. 2.
Wesabe.com http://www.wesabe.com/, as retrieved on Sep. 17, 2008.
West, David, "Neural Network Credit Scoring Models", Computers & Operations Research, vol. 27, 2000, pp. 1131-1152.
Wilson, Andrea, "Escaping the Alcatraz of Collections and Charge-Offs", http://www.transactionworld.net/articles/2003/october/riskMgmt1.asp, Oct. 2003.
Window on State Government, Susan Combs, Texas Comptroller of Public Accounts, Chapter 8: Health and Human Services, "Improve the Medicaid Eligibility Determination Process," 9 pgs., as downloaded at http://www.window.state.tx.us/etexas2001/recommend/ch08.
Wisconsin Department of Workforce Development, BadgerCare Medicaid Application Credit Report Authorization Form, dated Jun. 21, 2001, effective date, Jul. 1, 2001.
Wisconsin Department of Workforce Development, BadgerCare Medicaid Notification of Eligibility, dated Jul. 25, 2000, effective date, Jul. 1, 2000.

(56) References Cited

OTHER PUBLICATIONS

Wood, Greg, "Top Streaming Technologies for Data Lakes and Real-Time Data", http://blog.zaloni.com/top-streaming-technologies-for-data-lakes-and-real-time-data, Sep. 20, 2016 in 3 pages.
Yahoo! Search, "People Search," http://people.yahoo/com printed Nov. 16, 2010 in 1 page.
Yodlee | Money Center, https://yodleemoneycenter.com/ printed Feb. 5, 2014 in 2 pages.
You Need a Budget, http://www.youneedabudget.com/features printed Feb. 5, 2014 in 3 pages.
Yücesan et al., "Distributed Web-Based Simulation Experiments for Optimization", Simulation Practice and Theory 9, 2001, pp. 73-90.
Zimmerman et al., "A Web-Based Platform for Experimental Investigation of Electric Power Auctions," Decision Support Systems, 1999, vol. 24, pp. 193-205.
Zoot—Decision Engine, www.zootweb.com/decision_engine.html, as printed on Mar. 3, 2008.
Zoot—Instant Rules GUI, www.zootweb.com/instant_rules_GUI.html as printed Mar. 3, 2008.
Zoot—Pre-Built Standard Attributes, www.zootweb.com/credit_attributes.html as printed Mar. 3, 2008.
Zoot—Rules Management GUI, www.zootweb.com/business_rules_GUI.html as printed Mar. 3, 2008.
Official Communication in Australian Patent Application No. 2012281182, dated Jul. 8, 2014.
Official Communication in Australian Patent Application No. 2012281182, dated May 19, 2015.
Official Communication in Chinese Patent Application No. 201280041782.2, dated Mar. 4, 2016.
Official Communication in European Patent Application No. 12811546.6, dated Nov. 25, 2014.
Official Communication in European Patent Application No. 12811546.6, dated Sep. 18, 2015.
Official Communication in Russian Patent Application No. 2014101674/08, dated Dec. 15, 2014.
International Search Report and Written Opinion for Application No. PCT/US2012/046316, dated Sep. 28, 2012.
International Preliminary Report on Patentability and Written Opinion for Application No. PCT/US2012/046316, dated Jan. 14, 2014.
Official Communication in Australian Patent Application No. 2013356451, dated Jun. 22, 2015.
Official Communication in Chinese Patent Application No. 201380006862.9, dated Aug. 2, 2016.
Official Communication in European Patent Application No. 13860724.7, dated May 21, 2015.
Official Communication in Russian Patent Application No. 2014127000, dated Dec. 23, 2015.
International Search Report and Written Opinion for Application No. PCT/US2013/072102, dated Apr. 18, 2014.
International Preliminary Report on Patentability and Written Opinion for Application No. PCT/US2013/072102, dated Jun. 9, 2015.
Official Communication in Australian Patent Application No. 2014203430, dated Aug. 15, 2015.
Official Communication in Chinese Patent Application No. 201480000626.0, dated Aug. 1, 2016.
Official Communication in European Patent Application No. 14733951.9, dated Sep. 11, 2015.
Official Communication in Russian Patent Application No. 2014127320, dated Jul. 5, 2016.
International Search Report and Written Opinion for Application No. PCT/US2014/019142, dated Jun. 20, 2014.
International Preliminary Report on Patentability and Written Opinion for Application No. PCT/US2014/019142, dated Sep. 17, 2015.
Provisional Application as filed in U.S. Appl. No. 60/168,272, dated Dec. 1, 1999 in 14 pages.
Provisional Application as filed in U.S. Appl. No. 60/168,276, dated Dec. 1, 1999 in 82 pages.
Provisional Application as filed in U.S. Appl. No. 60/213,367, dated Jun. 23, 2000 in 20 pages.
Application as filed in U.S. Appl. No. 09/653,595, dated Aug. 31, 2000.

\* cited by examiner

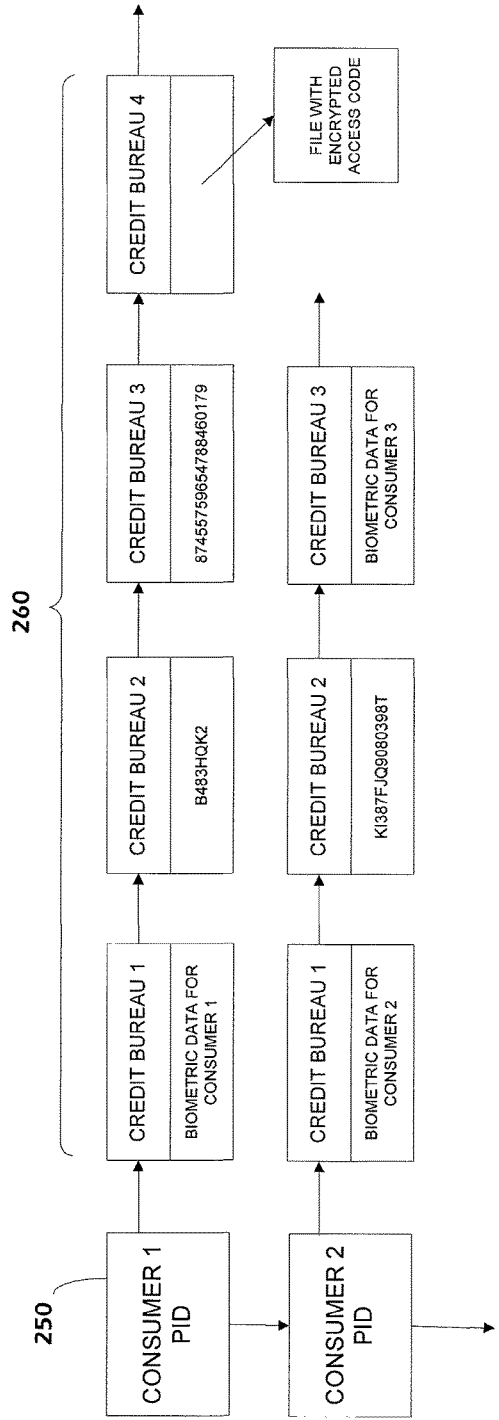

MULTI-BUREAU CREDIT FILE FREEZE AND UNFREEZE

PRIORITY CLAIM

This application is a continuation of U.S. patent application Ser. No. 15/344,003, filed on Nov. 4, 2016, which is a continuation of U.S. patent application Ser. No. 15/015,407, filed on Feb. 4, 2016, which is a continuation of U.S. patent application Ser. No. 12/541,835, filed on Aug. 14, 2009, which claims the benefit of priority under 35 U.S.C. § 119(e) of U.S. Provisional Application No. 61/088,905, filed on Aug. 14, 2008, the entireties of which are incorporated herein by reference.

BACKGROUND

Field of the Disclosure

This disclosure generally relates to credit files. More specifically, this disclosure relates to locking and unlocking credit files.

Description of the Related Art

Credit bureaus provide consumers with the ability to lock or unlock, also referred to as freezing and thawing, respectively, their credit files in order to prevent information in a credit file from being accessed. When the file is unlocked, information in the file can be accessed, for example by creditors that wish to perform credit checks.

Typically, a consumer provides information to a credit bureau that confirms their identity, as well as possibly a lock/unlock identifier (e.g., a number or alphanumeric code) in order to initiate locking or unlocking of their credit file. Unfortunately, this can be inconvenient because the consumer may need to memorize a separate identifier that is provided by the credit bureau for each credit bureau that maintains a credit file for the consumer. Moreover, if the consumer forgets an identifier he or she may need to request a new identifier by, for example, phone or certified mail from the credit bureau, which can result in a delay in locking their file. Additionally, when the consumer wishes to unlock their file they may need to wait a specified period of time, often three days, for the file to be unlocked. Besides imposing risks to a consumer's credit file, these delays may cause lenders, such as those looking to provide instant credit, to lose out on credit opportunities.

In merchant environments, such as department stores, credit file locking and unlocking can be especially problematic. For example, a store may offer a credit card to a consumer at a point of sale. The consumer may decide that applying for the store card is not worthwhile because their credit file is locked and unlocking the file will take significant time and effort (e.g., the consumer may be required to call each of one or more credit bureaus and provide credit bureau specific credit file unlock codes to each credit bureau, and the credit unlocks may require significant time periods for implementation by respective credit bureaus). Alternatively, a consumer may apply for the store card using the credit application process, only to discover that their credit file is locked. In this situation, the consumer may then decide not to proceed further with the application process because additional effort will be needed to unlock their file. As a result, merchants may lose out on significant sales and credit opportunities.

SUMMARY

The present disclosure relates to credit file locking and unlocking. In some embodiments, a system that implements a multi-bureau service for locking and unlocking credit files is disclosed. The systems and methods described herein may also be used to simplify request of other changes to a consumer's credit file at each of multiple credit bureaus, such as freezing and unfreezing credit files, and setting fraud alerts on a consumer's credit file. The service may allow a consumer to provide identifying information, such as a personal identifier (PID), which may include a numeric or alphanumeric personal identification number (PIN), using, for example, a mobile device, RFID tag, or token, to lock or unlock credit files at a plurality of credit bureaus over a network. Alternatively, a consumer may provide other identifying information, such as a fingerprint or other biometric data to identify themselves and/or provide the necessary PIN to initiate locking/unlocking of their credit file. Upon receiving the identifying information, the system may authenticate the identity of the consumer that wishes to lock or unlock the credit files. In some embodiments, the system may then use the identifying information to search a data structure, such as a database or table, that stores lock or unlock information associated with the consumer and associates each consumer with information regarding locking and/or unlocking the consumer's credit files with each of multiple credit bureaus. The system may then use the lock or unlock information to automatically initiate locking or unlocking of credit files for the consumer at the respective credit bureaus.

Embodiments of the present disclosure may be particularly advantageous in merchant environments. For example, in point of sale environments a consumer may enter identifying information, such as a PID, into a keypad to unlock their credit file. In response to receiving the identifying information, the system can unlock the consumer's credit files at a plurality of credit bureaus in real-time or near real-time. By providing consumers with a simplified interface and an expedient mechanism for unlocking their credit files, the system can increase credit opportunities for the merchant.

In one embodiment, a computer system configured to manage access of consumer credit files at a plurality of credit bureaus comprises a processor, a network interface, and a computer readable storage medium configured to store a data structure having personal identifiers for each of a plurality of consumers and, for at least some of the personal identifiers, a plurality of access codes associated with respective credit bureaus, wherein the access codes are usable to lock or unlock credit files associated with the respective consumer at the respective credit bureaus. In one embodiment, the computer system further comprises a credit file locking module for execution by the processor in order to cause the computer system to receive personal identifiers from respective consumers via the network interface, receive access codes for respective credit files of the respective consumers via the network interface, store the received personal identifiers and the received access codes in the data structure so that the personal identifiers are associated with the access codes of the respective consumers, and in response to receiving a request to lock or unlock one or more credit files associated with a particular consumer, the request comprising the personal identifier of the particular consumer, translate the personal identifier into access codes of the particular consumer based on the data structure, and initiate transmission of the access codes of the particular consumer to the respective credit bureau.

In one embodiment, a computerized method for allowing a consumer to lock or unlock credit information at a plurality of credit bureaus, the method being configured for execution by at least one computing device, comprises receiving information comprising a personal identifier from a consumer, storing the personal identifier in a data structure in a computer readable storage medium, receiving a plurality of access codes associated with respective credit bureaus, wherein the access codes are usable to lock or unlock associated credit information at the respective credit bureau, and storing the access codes in the data structure, wherein the access codes are associated with the personal identifier of the consumer. In one embodiment, the method further comprises receiving a request to allow access to credit information of the consumer, the request comprising the personal identifier, determining the access codes associated with the personal identifier as stored in the data structure, and initiating transmission of the associated access codes to each of the respective credit bureaus to allow access to the credit information of the consumer at the respective credit bureaus.

In one embodiment, a computer system configured to manage access of consumer credit files at a plurality of credit bureaus comprises a processor, a network interface, means for translating a personal identifier of a consumer into a plurality of associated access codes, wherein the access codes are usable to lock or unlock credit files associated with the consumer at respective credit bureaus, and means for initiating transmission of the access codes to the respective credit bureaus.

In one embodiment, a computer readable medium stores software instructions that are readable by a computing system, wherein the software code is executable on the computing system in order to cause the computing system to perform a method that comprises receiving a personal identifier of a consumer from a computing device, determining access codes associated with the personal identifier based on a data structure stored in a computer readable storage device, wherein each access code is associated with a credit file of the consumer at a respective credit bureau, and initiating transmission of the access codes to the respective credit bureaus to initiate locking or unlocking of the credit information of the associated consumer at the respective credit bureaus.

In one embodiment, a computerized method for allowing a consumer to lock or unlock credit information at a plurality of credit bureaus, the method being configured for execution by at least one computing device, comprises storing a plurality of access codes associated with respective credit bureaus in a data structure, wherein the access codes are usable to lock or unlock associated credit information at the respective credit bureau and the access codes are associated with a personal identifier of a consumer, receiving a request to allow access to credit information of the consumer, the request comprising the personal identifier, and determining the access codes associated with the personal identifier as stored in the data structure.

BRIEF DESCRIPTION OF THE DRAWINGS

FIG. 2A is a diagram illustrating one embodiment of a PID translation data structure.

FIG. 2B is a diagram illustrating another embodiment of a PID translation data structure.

DESCRIPTION OF THE EMBODIMENTS

Figure 1A:
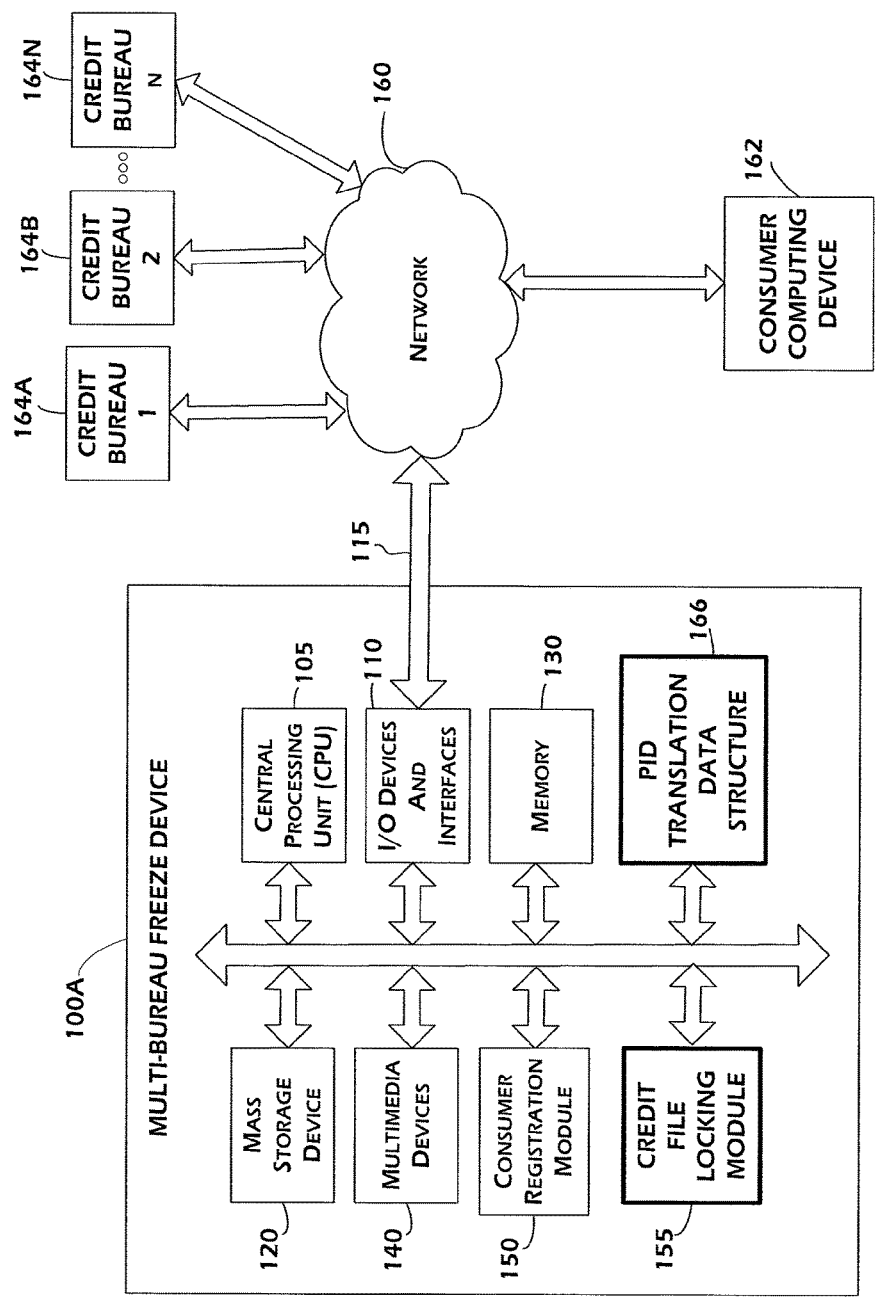
FIG. 1A is a block diagram illustrating one embodiment of a multi-bureau freeze device that is in communication with a consumer computing device and a plurality of credit bureaus via a network.

The present disclosure generally relates to credit file locking and unlocking. In one embodiment, a system that implements a credit file locking service is disclosed. In contrast to existing frameworks where credit files of consumers at multiple credit bureaus are locked or unlocked separately, the systems and methods described herein allow consumers to lock or unlock their credit files at multiple credit bureaus in real-time or near real-time. Additionally, the systems and methods in the present disclosure may be used with a fraud alert. In one embodiment, if a fraud alert is placed on a consumer's credit file, each time a third party, for example a merchant, requests access to the consumer's credit file a credit bureau sends notice to the requesting third party that the third party should take steps to verify the identity of the party requesting credit prior to extending credit in the name of the consumer on the requested credit report. For example, the consumer may be contacted with a request for permission to allow the third party to access the credit file for purposed of determining eligibility for a credit account, for example. The systems and methods disclosed herein may permit the consumer to allow access to the consumer's credit files at multiple credit bureaus, such as in response to a fraud alert inquiry, in a single reply.

In an illustrative embodiment, a consumer may provide one or more personal identifier (also referred to herein as "PID") to a multi-bureau freeze device, for example over a computer network. As used herein, a PID may comprise any personal identifier, including without limitation a name, an address, a phone number, a date of birth, a maiden name, a social security number, an account number, a driver's license number, a password, a RFID tag or token, biometric data, such as a fingerprint, and/or a personal identification number (also referred to herein as a "PIN" or a PIN code"), which may comprise a sequence of numerals, a sequence of alphanumeric characters, or any combination of personal identifiers. A consumer selected PID may indicate that the consumer has selected the type of data in the PID (e.g., a consumer selects a PID that is a password, a PIN, or a fingerprint) and/or that the consumer has selected the content of the PID (e.g., the consumer selects the particular password or PIN or provides a fingerprint). A consumer selected PID may advantageously be easier for the consumer to remember and/or provide to a requesting entity or device A consumer may provide the PID using a computing device, such as, for example, a mobile device, a keypad, a card reader, or a biometric data reader. A multi-bureau freeze device may then validate the identity of the consumer using the PID provided. After verifying the identity of the consumer, the multi-bureau freeze device may initiate unlocking or locking of the consumer's credit files at each of a plurality of credit bureaus. In one embodiment, the credit files may be unlocked or locked for a predetermined period of time, and the predetermined period of time may be specified by the consumer.

Some embodiments of the systems and methods described herein may allow merchants to increase credit opportunities, especially in point of sale environments. For example, a merchant can request a consumer to enter a PID, such as a PIN code, into a keypad (e.g., a credit card reader keypad). After the consumer enters a PID, the consumer's credit files can be unlocked in real-time or in near real-time, and the merchant may then receive copies of the consumer's credit files from a plurality of credit bureaus. Similarly, the consumer may be able to quickly and easily lock their credit files after the desired credit pulls have occurred by entry of their PID. Thus, the system may increase credit opportunities for merchants and other financial service providers of mortgages, automobile loans, credit card accounts, and the like by allowing them to access credit files quickly.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

FIG. 1A is a block diagram illustrating one embodiment of a multi-bureau freeze device 100 that is in communication with a consumer computing device 162 and a plurality of credit bureaus 164 (including credit bureaus 164A, 164B, 164N that are representative of any quantity of credit bureaus) via a network 160. Generally, the credit bureaus 164 comprise one or more computing systems that gather and make available information about how consumers use credit, such as a credit score or credit report, for example.

Figure 1B:
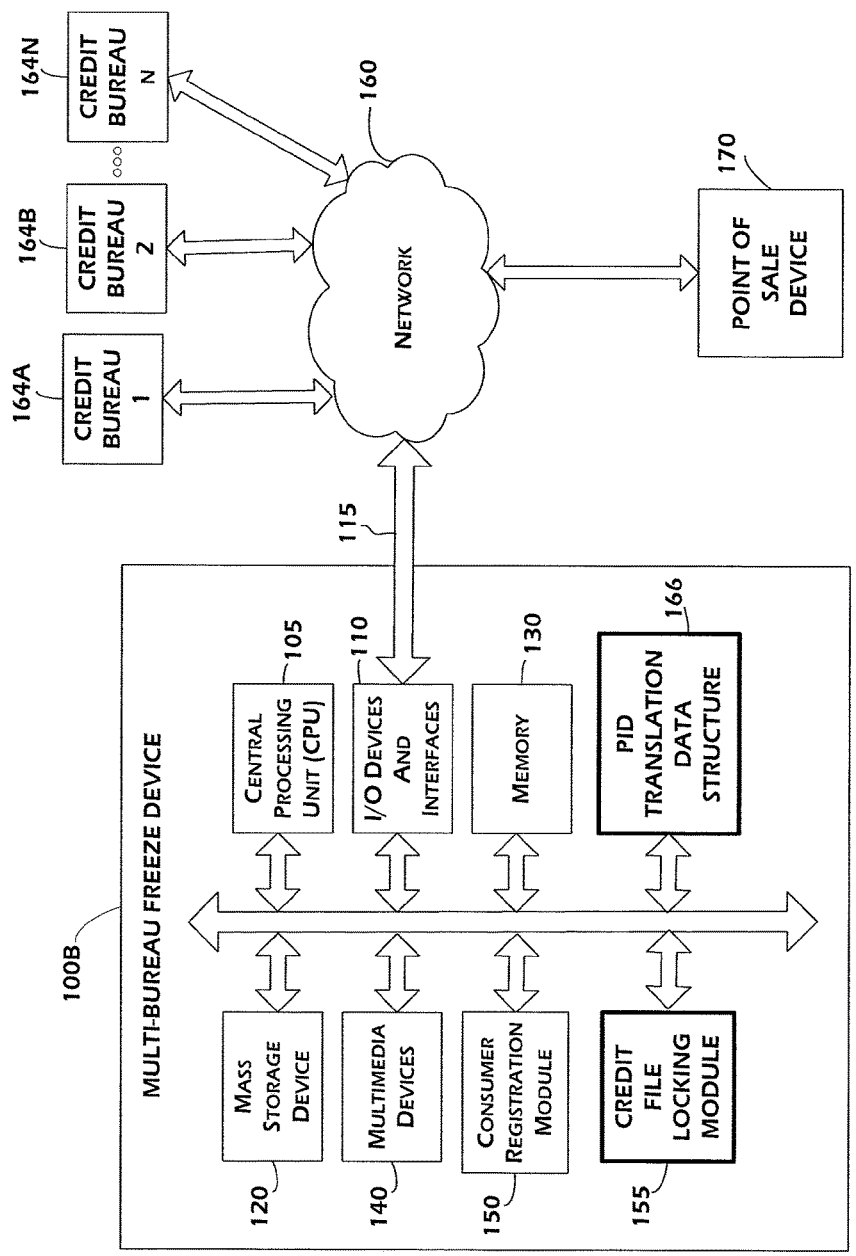
FIG. 1B is a block diagram illustrating another embodiment of a multi-bureau freeze device that is in communication with a point of sale device and a plurality of credit bureaus via a network.
Figure 1C:
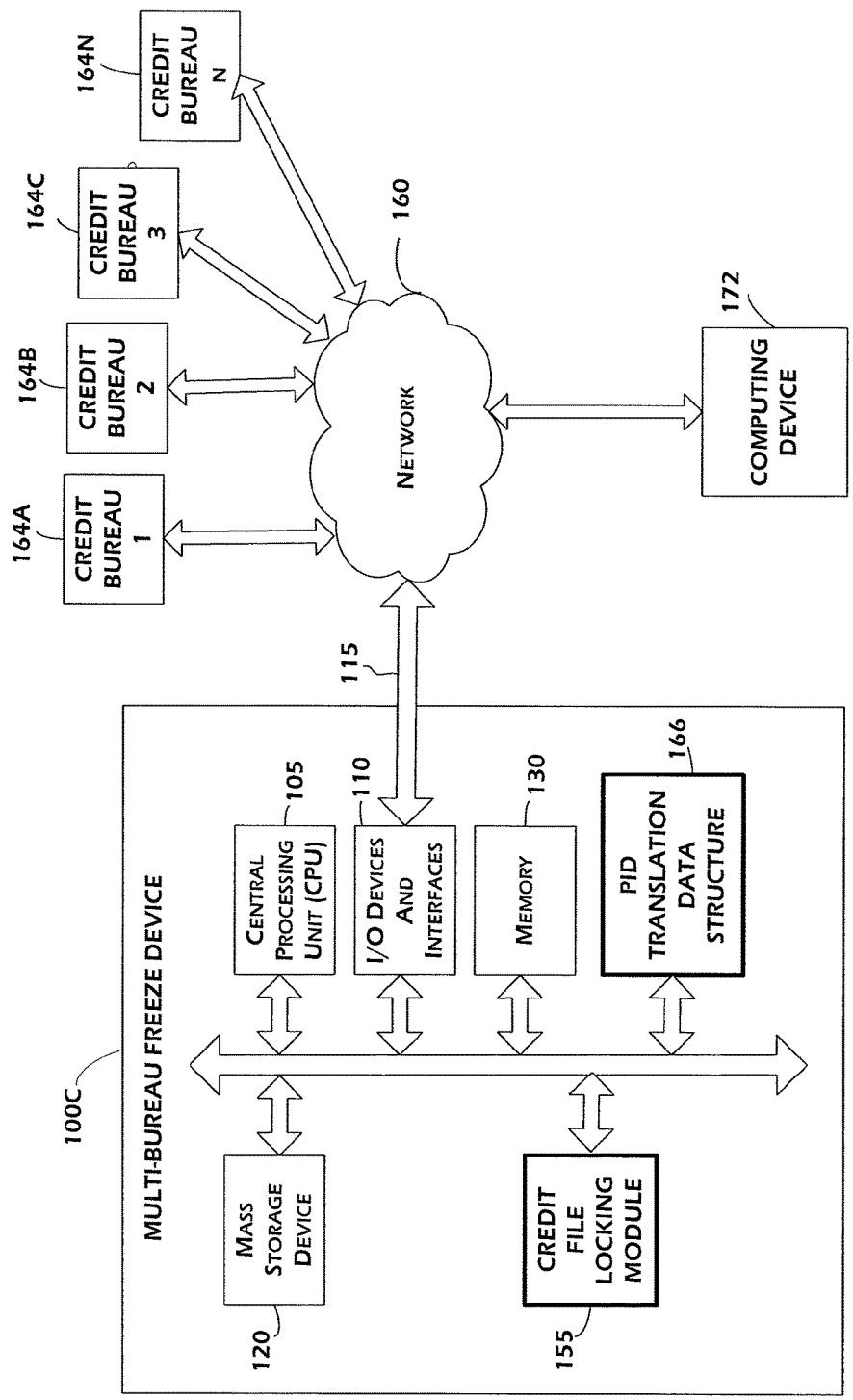
FIG. 1C is a block diagram illustrating another embodiment of a multi-bureau freeze device that is in communication with a plurality of credit bureaus and a computing device via a network.

FIG. 1B is a block diagram illustrating one embodiment of a multi-bureau freeze device 100B that is in communication with a point of sale device 170 and the plurality of credit bureaus 164A, 164B, through 164N via the network 160. FIG. 1C is a block diagram illustrating one embodiment of a multi-bureau freeze device 100C that is in communication with a plurality of credit bureaus, including credit bureaus 164A, 164B, 164C, 164D, through 164N, and a computing device 172 via a network 160. The computing device 172 may be associated with any entity, for example a consumer, a retailer, an account provider, etc. The client computing device 162, point of sale device 170, and computing device 172 of FIGS. 1A, 1B, and 1C may each comprise one or more computing system, mobile device, keypad, card reader, biometric data reader, or other device that allows a user, such as a consumer, merchant, bank, etc., to exchange information with the multi-bureau freeze device 100. In particular, the client computing device 162 or the computing device 172 may allow the consumer to register for the credit file locking service. In addition, the client computing device 162, the point of sale device 170, and/or the computing device 172 may allow the consumer to unlock or lock credit files at multiple credit bureaus by communicating with the multi-bureau freeze device 100. In a merchant environment, such as a department store, the point of sale device 170 or the computing device 172 may include a keypad, such as a keypad associated with a credit card reader at a store checkout, that allows a consumer to enter in information to unlock (or lock) their credit files at the plurality of credit bureaus 164 nearly instantaneously and using a simplified process.

The multi-bureau freeze devices 100 may be used to implement certain systems and methods described herein. For example, in one embodiment the multi-bureau freeze device 100 may be configured to implement a credit file freeze or lock and/or a credit file thaw or unlock process. The functionality provided for in the components and modules of the multi-bureau freeze device 100 may be combined into fewer components and modules or further separated into additional components and modules. As used herein, reference to the multi-bureau freeze device 100, or simply to the device 100, refers generally to any one of the computing device 100A, 100B, and 100C, to the extent that the device 100A, 100B, and/or 100C includes the component or modules discussed with reference to device 100. Each of the devices 100A, 100B, and 100C include unique components or modules and/or combinations of components or modules and, therefore, each represents a separate embodiment that may operate without regard to the differing components or modules of the other systems described herein.

The multi-bureau freeze device 100 may include, for example, a computing system, such as a personal computer that is IBM, Macintosh, or Linux/Unix compatible. In one embodiment, the computing device comprises one or more servers, desktop computers, laptop computers, cell phones, personal digital assistants, and/or kiosks, for example. In one embodiment, the multi-bureau freeze devices 100 include a central processing unit ("CPU") 105, which may include one or more conventional microprocessors. The multi-bureau freeze devices 100s may further include a memory 130, such as random access memory ("RAM"), a flash memory, and/or a read only memory ("ROM"), and a mass storage device 120, such as one or more hard drives, diskettes, and/or optical media storage devices. Typically, the components and modules of the multi-bureau freeze devices 100 are connected using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The multi-bureau freeze devices 100 are generally controlled and coordinated by operating system software, such as Windows 95, Windows 98, Windows NT, Windows 2000, Windows XP, Windows Vista, Windows 7, Linux, SunOS, Solaris, or other compatible operating systems. In Macintosh systems, the operating system may be any available operating system, such as MAC OS X. In other embodiments, the multi-bureau freeze devices 100 may be controlled by a proprietary operating system. Conventional operating systems control and schedule computer processes for execution, perform memory management, provide file system, networking, and I/O services, and provide a user interface, such as a graphical user interface ("GUI"), among other things.

The illustrative multi-bureau freeze devices 100 may include one or more commonly available input/output (I/O) devices and interfaces 110, such as a keyboard, mouse, touchpad, and printer. In one embodiment, the I/O devices and interfaces 110 include one or more display devices, such as a monitor, that allows the visual presentation of data to a user. More particularly, a display device provides for the presentation of GUIs, application software data, and multimedia presentations, for example. The multi-bureau freeze devices 100 may also include one or more multimedia devices 140, such as speakers, video cards, graphics accelerators, and microphones, for example.

In the embodiments of FIGS. 1A, 1B, and 1C, the I/O devices and interfaces 110 provide a communication interface to various external devices. In the embodiments of FIGS. 1A, 1B, and 1C, the multi-bureau freeze devices 100 are coupled to a network 160 that comprises any combination of one or more of a LAN, WAN, or the Internet, for example, via a wired, wireless, or combination of wired and wireless, communication link 115. The network 160 communicates with various computing devices and/or other electronic devices via wired or wireless communication links.

In the illustrative embodiments of FIGS. 1A, 1B, and 1C, the multi-bureau freeze devices 100 include, or may be coupled to, for example via a network connection, a device that includes a PID translation data structure 166 that includes lock or unlock information that associates one or more particular consumers with access codes for locking and/or unlocking a particular consumer's credit files at each of a plurality of credit bureaus. The PID translation data structure 166 may be implemented in any suitable format, including objects, tables, arrays, hash tables, linked lists, and/or trees. The PID translation data structure 166 may be implemented and stored in a database. As used herein, a database may comprise a relational database, such as Sybase, Oracle, CodeBase and Microsoft® SQL Server as well as other types of databases such as, for example, a flat file database, an entity-relationship database, an object-oriented database, and/or a record-based database. The data structure 166 may be stored in any computer readable medium, including a hard drive, a random-access memory, an optical disc, a tape drive, and/or a diskette. The information stored by the PID translation data structure 166 may include a consumer PID that may be selected by a consumer. The consumer PID is associated with multiple credit bureau specific access codes that are associated with the consumer's credit file at respective credit bureaus and that are configured to initiate locking or unlocking of the consumer's credit files at the respective credit bureaus 164. In addition to the components and devices that are illustrated in FIGS. 1A, 1B, and 1C, the multi-bureau freeze device 100 may be connected to other data structures that store access codes for consumer credit files and/or other computing devices through a bus or network 160.

In the embodiments of FIGS. 1A, 1B and 1C, the multi-bureau freeze devices 100 also include application modules that may be executed by the CPU 105. In the embodiments of FIGS. 1A and 1B, the application modules include the consumer registration module 150 and the credit file locking module 155, which are discussed in further detail below. The embodiment of FIG. 1C includes the credit file locking module 155.

In general, the word "module," as used herein, refers to logic embodied in hardware or firmware, or to a collection of software instructions, possibly having entry and exit points, written in a programming language, such as, for example, Java, Lua, C, C++, or C#. A software module may be compiled and linked into an executable program, installed in a dynamic link library, or may be written in an interpreted programming language such as, for example, BASIC, Perl, or Python. Software modules may include, by way of example, components, such as class components and task components, processes, functions, attributes, procedures, subroutines, segments of program code, drivers, firmware, microcode, circuitry, data, databases, tables, arrays, and variables. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. When executed by the multi-bureau freeze devices 100, modules may allow the multi-bureau freeze devices 100 to perform operations, such as storing data, accessing stored data, modifying stored data, communicating with other computing devices and systems, and other operations described herein. For ease of explanation, the modules may be referred to as performing an operation or a method, even though other systems and/or components of the multi-bureau freeze device 100 may actually perform the operation or method in response to executing software of a module, for example.

In the embodiments described herein, the multi-bureau freeze devices 100A and 100B are configured to execute the consumer registration module 150, among other modules, in order to create a single point of service for consumers to freeze and thaw their credit files at multiple credit bureaus 164A-N. For example, in one embodiment, the consumer registration module 150 allows a consumer to set up the file locking service by creating an account. The consumer registration module 150 may request a consumer to provide enrollment information, including information that verifies their identity, in order to register the consumer, such as a name, driver's license number, address, social security number, birth date, phone number, account number, and the like. The consumer registration module 150 may then request the consumer to select a consumer PID. When the consumer PID is later provided to the multi-bureau freeze device 100, the multi-bureau freeze device 100 may initiate locking or unlocking of credit files of the consumer at a plurality of credit bureaus 164A-N using access codes associated with the consumer's credit files at respective credit bureaus.

The consumer registration module 150 may further be configured to send requests to the plurality of credit bureaus 164 to obtain access codes and/or other information about unlocking or locking credit files of a registering consumer. In one embodiment, the consumer registration module 150 may automatically register the consumer at the plurality of credit bureaus 164 and receive the respective access codes for locking/unlocking the consumer's credit files at those credit bureaus 164. In one embodiment, an access code authenticates the identity of the consumer at a particular credit bureau for credit file locking or unlocking. The consumer registration module 150 may store these credit bureau specific access codes in the PID translation data structure 166 and associate some or all of the credit bureau specific access codes of a consumer with the consumer PID of the consumer.

The multi-bureau freeze devices 100 may also execute the credit file locking module 155 to provide a simplified mechanism or interface to lock or unlock credit files at the plurality of credit bureaus 164A-N. In one embodiment, the credit file locking module 155 can receive a consumer PID that is inputted by a consumer from consumer computing device 162, point of sale device 170, or other device. After receiving the consumer PID, the credit file locking module 155 may access the PID translation data structure to translate the received consumer PID into access codes corresponding to multiple respective credit bureaus. The access codes may then be sent over the network 160 to corresponding respective credit bureaus 164 to lock or unlock one or more credit files of the consumer.

In some embodiments, when the multi-bureau freeze devices 100 are operated or associated with one or more of the credit bureaus 164, the consumer PID may be used to lock or unlock credit files without any translation. This may be particularly advantageous in reducing processing time that may otherwise be expended to translate a consumer PID into lock or unlock information.

FIG. 2A illustrates one embodiment of a PID translation data structure, for example the PID translation data structure 166 of FIG. 1. As shown, the PID translation data structure 166 may include enrollment information 210 associated with a consumer, such as a name and an address, for example. The PID translation data structure may also include various consumer PIDs 220 associated with the enrollment information of respective consumers that authenticate a consumer's identity to the multi-bureau freeze device 100. In the illustrated embodiment, a consumer PID comprises a consumer-selected PID, in particular a PIN. In addition, the PID translation data structure 166 further includes access codes 230 that can be used to lock or unlock credit files of the associated consumer at respective credit bureaus. In the embodiment shown in FIG. 2A, the access codes include PINs. Thus, in the embodiment shown in FIG. 2A, once a particular consumer is identified in the PID translation data structure, e.g., by locating a consumer PID received from a merchant POS device in the data structure, the access codes for each of multiple credit bureaus are identified and may be used to initiate locking/unlocking of the consumer's credit files without further involvement from the consumer.

FIG. 2B illustrates one embodiment of a PID translation data structure that is implemented using linked lists. As shown, the PID translation data structure includes a linked list of consumer PID links 250. Each consumer PID link 250 indicates the consumer PID for a consumer, including Consumer 1 and Consumer 2. Furthermore, each consumer PID link 250 is linked to a list of access code links 260. In other embodiments, the PIDs 250 and corresponding access codes for respective credit bureaus may be stored in any other data structure, such as a database or a table, for example. In the embodiment shown, each access code link 260 comprises access codes for a consumer for the respective credit bureau. As illustrated in FIG. 2B, access codes corresponding to different credit bureaus and/or different consumers may include different types of information. Some non-limiting examples of different access codes are shown in FIG. 2B. The access codes corresponding to credit bureau 1 include an access code that comprises biometric data for respective consumers. The access codes corresponding to credit bureau 2 include access codes that each comprise an alphanumeric character sequence. The alphanumeric character sequence for one consumer does not need to be the same length as the alphanumeric character sequence for another consumer, as shown by the different sample access codes for Consumers 1 and 2 in FIG. 2B.

The access codes associated with a credit bureau do not need to comprise the same type of access code information, as shown by the access codes corresponding to credit bureau 3. One access code corresponding to credit bureau 3 comprises a numeric PIN, and another access code comprises biometric data. Also, an access code link may not itself comprise the access code, but may instead include a reference, such as a pointer, to a location of an access code. In FIG. 2B, the access code link corresponding to credit bureau 4 includes a reference to a file that stores an encrypted access code, such as an XML file, for example. To enhance access code security, the multi-bureau freeze device 100 may receive and store an encrypted access code from a credit bureau, and only the credit bureau may have the decryption key for the access code. Alternatively, the multi-bureau freeze device 100 may encrypt a received access code and store the encrypted access code.

Figure 3:
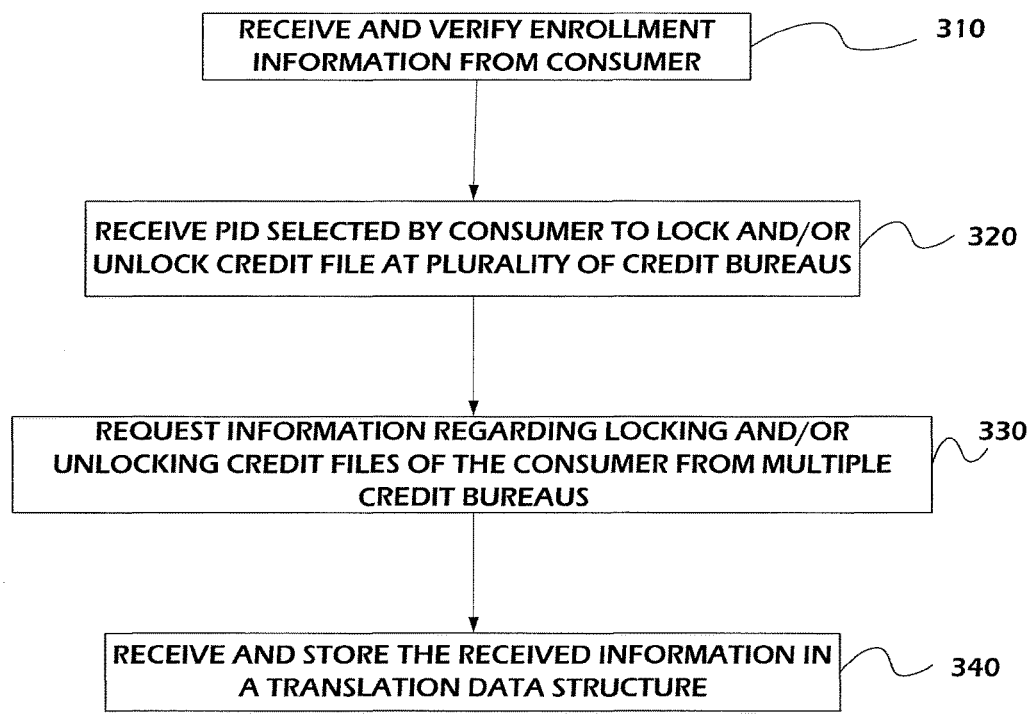
FIG. 3 is a flowchart illustrating one embodiment of a method of registering a user account for the credit file locking/unlocking service.

FIG. 3 is a flowchart illustrating one embodiment of a method of registering a user account for the credit file locking/unlocking service. Depending on the embodiment, certain of the blocks described below may be removed, others may be added, and the sequence of the blocks may be altered. The illustrative method may be stored as a process that is accessible by the consumer registration module 150 and/or other modules or components of the multi-bureau freeze device 100. The method, including each block of the method, may be implemented by computing systems and devices, including the multi-bureau freeze device 100. For ease of explanation, rather than by way of limitation, the following description will use the multi-bureau freeze device 100 as an example of a computing device that may implement the method.

Beginning in block 310, enrollment information from a consumer is received and verified. The enrollment information may include various types of information that may identify the consumer, such as a name, social security number, date of birth, etc., including the types of information discussed above. As those of skill in the art will recognize, the specific criteria for being categorized as identifying a consumer may vary greatly and may be based on a variety of possible data types. The enrollment information can be verified by checking the enrollment information provided against a database that includes personal information about consumers. The enrollment information may be received though I/O Devices and Interfaces 110 of a multi-bureau freeze device 100, such as enrollment information entered through a web browser and transmitted through the network or enrollment information received from an I/O device. The enrollment information may be stored in a memory 130 and/or a mass storage device 120.

Moving to block 320, a consumer PID that is selected by the consumer to lock or unlock their credit files at a plurality of credit bureaus is received. The consumer PID may then be stored, for example in the PID translation data structure 166. In one embodiment, the consumer may provide the selected consumer PID to the multi-bureau freeze device through a browser, through an I/O device, or through a hard copy that may be analyzed by a computing device using optical character recognition. Alternatively, the consumer PID may be assigned to the consumer, for example by the multi-bureau freeze device or by an employee associated with an entity that operates the multi-bureau freeze device 100.

Moving to block 330, information regarding locking and/or unlocking credit files of the consumer from multiple credit bureaus is requested. For example, requests may be sent to credit bureaus for lock or unlock information, such as an access code, that enables locking or unlocking of the consumer's credit files at the respective credit bureau. The requests may automatically register the consumer with one or more of the credit bureaus. For example, the multi-bureau freeze device 100 may initiate transmission of enrollment information of a consumer to computing systems associated with respective credit bureaus and/or may initiate transmission of a request for lock or unlock information to the credit bureaus.

Continuing to block 340, credit bureau lock and unlock information, such as access codes, are received from the credit bureaus and stored in a translation data structure (e.g., the PID translation data structure) where the access codes are associated with the consumer PID. For example, the multi-bureau freeze device 100 may receive the access codes from computing devices associated with respective credit bureaus via the network and store the access codes in the PID translation data structure.

Figure 4:
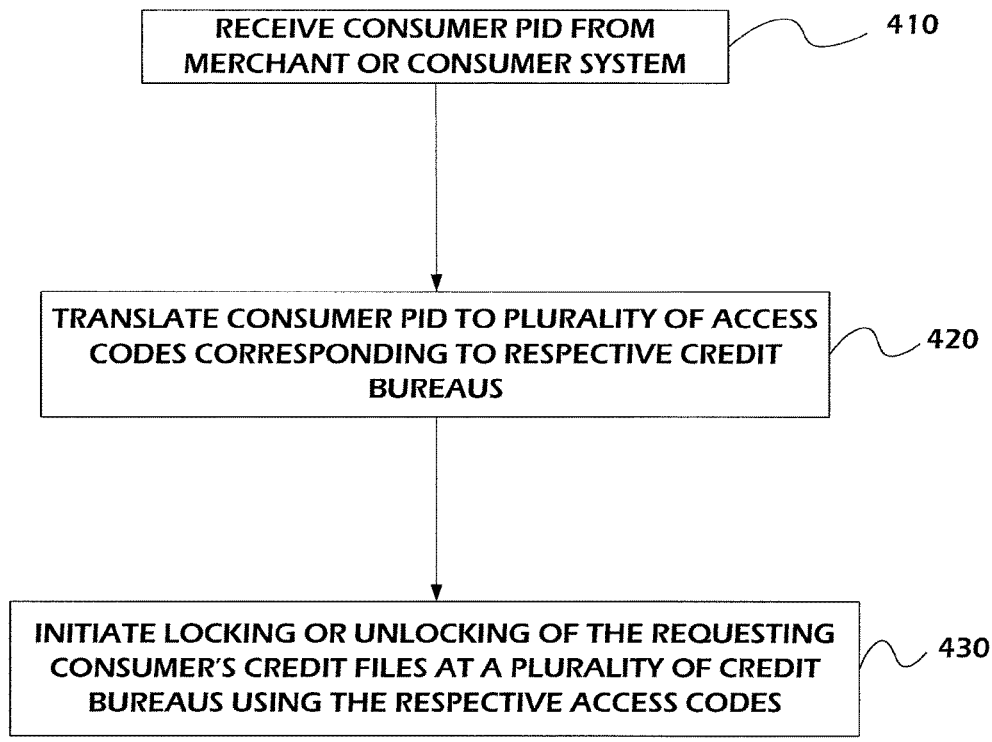
FIG. 4 is a flowchart illustrating one embodiment of a method of locking or unlocking credit files at multiple credit bureaus.

FIG. 4 illustrates one embodiment of a method of locking or unlocking credit files at multiple credit bureaus. The illustrative method may be stored as a process accessible by the credit file locking module 155 and/or other modules or components of the multi-bureau freeze device 100. Depending on the embodiment, certain of the blocks described below may be removed, others may be added, and the sequence of the blocks may be altered. The method illustrated by FIG. 4 may be implemented by various computing systems and devices, including a multi-bureau freeze device 100. For ease of explanation, rather than by way of limitation, the following description will use the multi-bureau freeze device 100 as an example of a computing device that may implement the method.

Beginning in block 410, a consumer PID is received from a consumer or merchant system and verified. Once received, the consumer PID may be checked against a data source, such as PID translation data structure 166 or some other data structure that associates access codes for locking and/or unlocking consumer credit files with consumer identifiers, to further authenticate the identity of the consumer. For example, a multi-bureau freeze device 100 may receive a consumer PID from a consumer or merchant system via a network 160 and store the received PID in a memory 130 or a mass storage device 120. The multi-bureau freeze device may access information in the PID translation data structure 166 to further authenticate the identity of the consumer.

Moving to block 420, the consumer PID is translated into lock or unlock information, such as access codes, for each of multiple respective credit bureaus. The plurality of access codes can be used to authenticate the consumer at each of the credit bureaus and/or initiate locking or locking of the consumer's credit files at the respective credit bureau. In one embodiment, the lock or unlock information is associated with the consumer PID and stored in the PID translation data structure 166. For example, the multi-bureau freeze device 100 may access a PID translation data structure to determine a plurality of access codes associated with a received consumer PID. A skilled artisan will recognize that the identification information can be translated to a plurality of access codes using a query language, such as SQL.

Moving to block 430, locking or unlocking of the requesting consumer's credit files at a plurality of credit bureaus using the respective access codes is initiated. In one embodiment, the access codes are sent to respective credit bureaus by the multi-bureau freeze device 100 indicating a request for the credit files of the consumer to be locked or unlocked at the respective credit bureaus. The access codes may be electronically transmitted to the respective credit bureaus in real-time or substantially in real-time.

Figure 5:
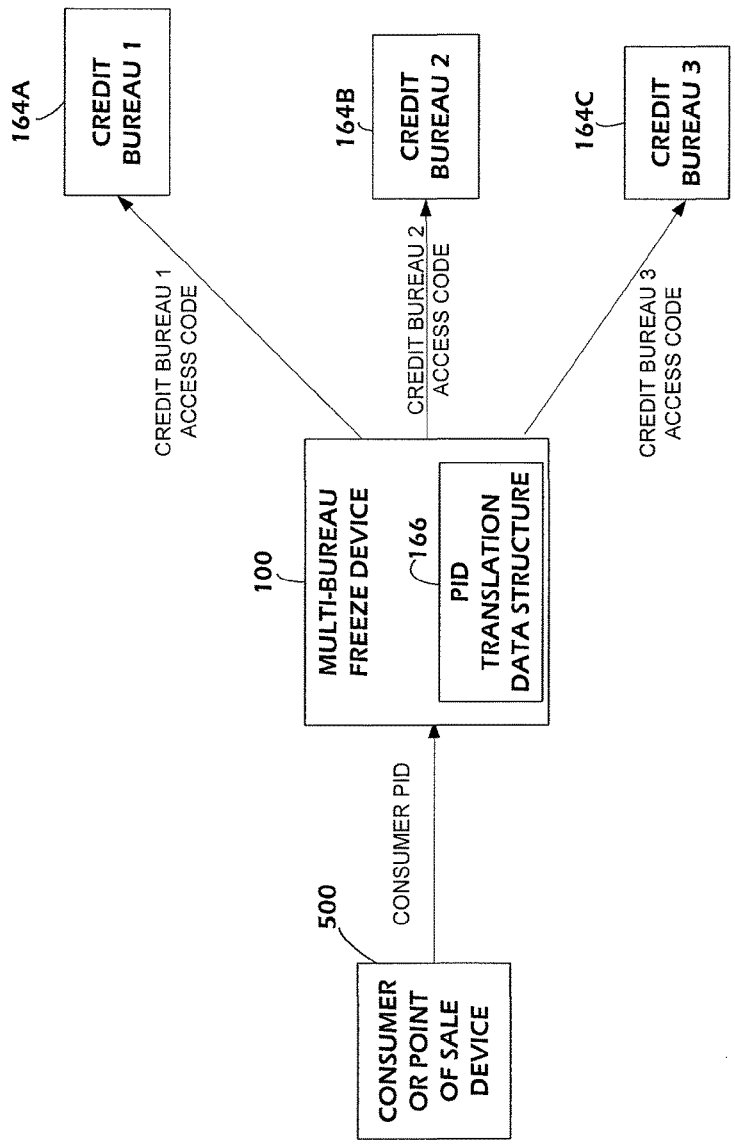
FIG. 5 is a flow diagram illustrating an example flow of data between computing systems and devices to lock and/or unlock credit files at multiple credit bureaus.

FIG. 5 is a flow diagram illustrating an example flow of data between computing systems and devices to lock and/or unlock credit files at multiple credit bureaus. As shown, the data flows between a consumer or point of sale device 500, a multi-bureau freeze device 100, and a plurality of credit bureaus computing systems 164A, 164 B, and 164C. In other embodiments, the flow of data may include fewer or additional blocks and the blocks may be performed in a different order than is illustrated and discussed with reference to FIG. 5.

In FIG. 5, a consumer or point of sale device 500 transmits a consumer PID to the multi-bureau freeze device 100. In response to receiving the consumer PID, the multi-bureau freeze device 100 may search a PID translation data structure 166 for a plurality of access codes associated with the consumer PID that lock or unlock credit files at corresponding credit bureaus.

After the plurality of access codes are retrieved, for example from the PID translation data structure 166, the access codes are sent to respective credit bureaus 164A, 164B, and 164C. The plurality of credit bureaus 164 may then lock or unlock the credit files of the corresponding consumer in response to authenticating the request to lock or unlock the consumer's credit file in view of the received respective access code. In other embodiments (not shown), the credit bureaus 164 may then transmit credit information, such as a credit score or report, that are associated with the corresponding consumer to the multi-bureau freeze device 100. The credit information can then be forwarded to the consumer or point of sale device 500.

Figure 6:
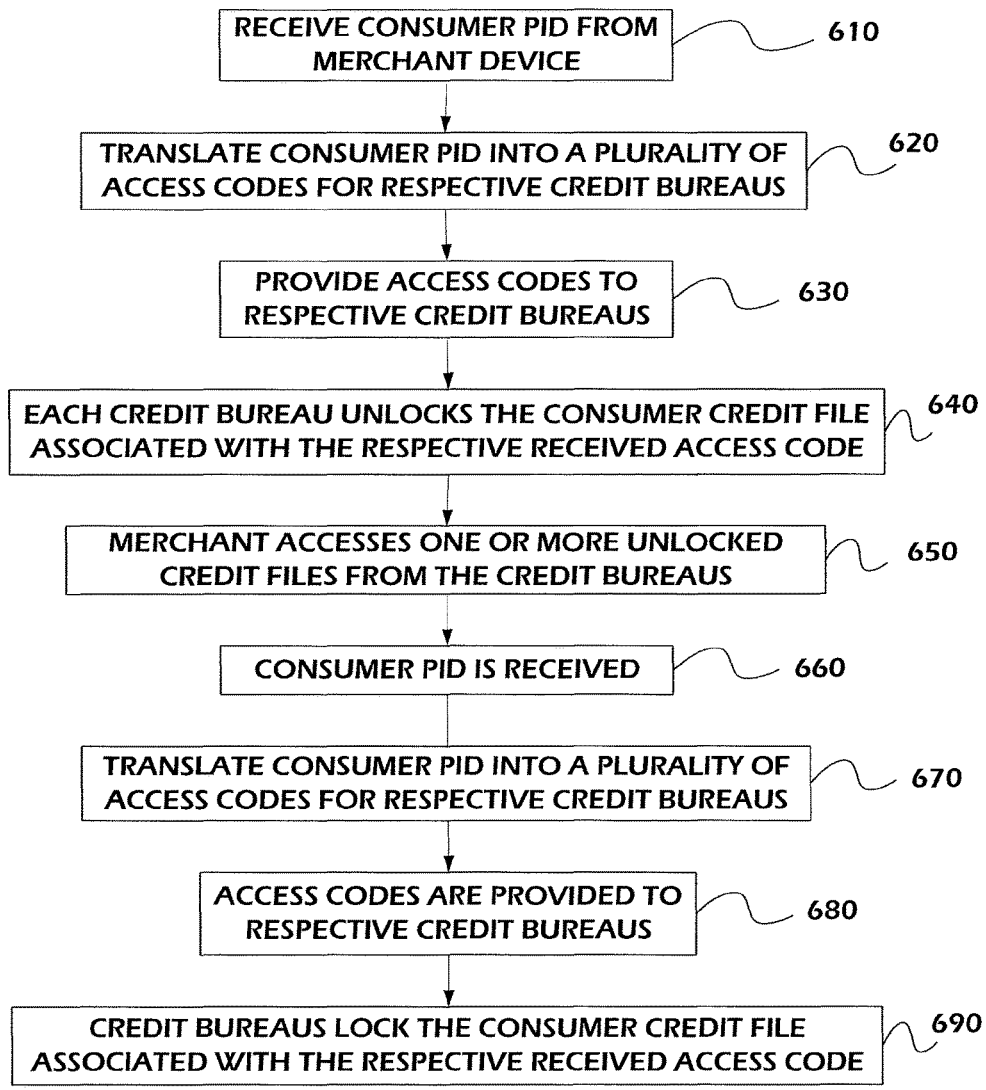
FIG. 6 is a flowchart illustrating one embodiment of a method of translating a consumer PID into multiple access codes, unlocking credit files at multiple credit bureaus using the access codes, and relocking the credit files.

FIG. 6 is a flowchart illustrating one embodiment of a method of translating a consumer PID into multiple access codes, unlocking credit files at multiple credit bureaus using the access codes, and relocking the credit files. Depending on the embodiment, certain of the blocks described below may be removed, others may be added, and the sequence of the blocks may be altered. The method illustrated by FIG. 6 may be implemented by various computing systems and devices, including a multi-bureau freeze device 100 or any subset of the components thereof. For ease of explanation, rather than by way of limitation, the following description refers to the multi-bureau freeze device 100 as an example of a computing device that may implement the method. The illustrative method may be stored as a process accessible by the credit file locking module 155 and/or other modules or components of the multi-bureau freeze device 100.

Beginning in block 610, a consumer PID is received from a computing device associated with a merchant (or other computing device). Moving to block 620, the consumer PID is translated into a plurality of access codes for respective credit bureaus. First, the received PID may be checked against a data source to verify the identity of the consumer. For example, a multi-bureau freeze device 100 may receive a consumer PID from a point of sale device 170 and verify the consumer PID by accessing data in a PID translation data structure or in other lock or unlock information data sources. Next, the consumer PID is translated into the plurality of access codes.

For example, a consumer PID may be received for consumer 1. The PID for consumer 1 may then be translated into three access codes, one access code corresponding to each of credit bureaus 1, 2, and 3. The PID of consumer 1 may be translated into the plurality of access codes using a PID translation data structure. For example, the multi-bureau freeze device may access the PID translation data structure and determine the access codes associated with the PID of consumer 1 in the PID translation data structure.

Moving to block 630, the access codes are provided to the respective credit bureaus. For example, the multi-bureau freeze device may initiate transmission of the access codes to the credit bureaus 164 via the network. In block 640 the credit bureaus may unlock the consumer credit file associated with the access code received by the respective credit bureau.

Moving to block 650, the merchant accesses one or more unlocked credit files from the credit bureaus. Depending on the embodiment, the merchant, for example through a computing device, may receive a credit file directly from one or more of the credit bureaus. Alternatively, one or more credit files may be provided to the multi-bureau freeze device 100 which may then provide the credit files to the merchant.

Moving to block 660, a consumer PID is received again, though in some embodiments, the PID may be stored by the multi-bureau freeze device or merchant device so that the consumer may not be required to re-provide the PID. It may be the same consumer PID received in block 610 or a different consumer PID that indicates that the consumer would like to lock credit files associated with the consumer. The consumer PID may be received by a multi-bureau freeze device 100 from the merchant device from which the consumer PID was received in block 610. This may allow a consumer to easily unlock a plurality of credit files for access by a merchant from a single device, thereby providing the merchant access to the credit files associated with the consumer, and relock the plurality of credit files. Alternatively, the consumer PID may be received from a different device, such as a consumer computing device 162 or a computing device 172.

Moving to block 670, the consumer PID is translated into a plurality of access codes for respective credit bureaus. The access codes for the respective credit bureaus may be the same access codes described above in block 620, or may be different access codes. For example, the multi-bureau freeze 100 device may access a PID translation data structure to translate a received consumer PID into a plurality of access codes. In block 680, at least some of the plurality of access codes are provided to the corresponding credit bureaus.

Finally, in block 690, the credit bureaus lock the credit files associated with the access code received by the respective credit bureau. The blocks shown in FIG. 6 may be performed substantially in real time. For example, after the consumer provides the PID in block 610, the merchant may be given access to the credit files of the consumer in substantially real time. Then the consumer may again enter the consumer PID and the credit files may be locked by the credit bureaus in substantially real time. This increases the likelihood that only a desired party, for example the merchant, may access the consumer's credit files during the interval in which the credit files are unlocked. Alternatively, after block 650, the credit files may again be locked without entry of a consumer PID. For example, the credit files may be locked after a predetermined period of time. Some examples of predetermined periods of time include 10 seconds, 30 seconds, 10 minutes, 20 minutes, 40 minutes, one hour, one day, or one week, though the predetermined time interval may be any other period of time. The credit files may also be locked immediately after access is given to the merchant device, such an in response to responding to a first request for a credit file for the unlocked consumer's credit file, or after a predetermined number of access of the respective credit files.

Although the foregoing invention has been described in terms of certain embodiments, other embodiments will be apparent to those of ordinary skill in the art from the disclosure herein. Moreover, the described embodiments have been presented by way of example only, and are not intended to limit the scope of the inventions. Indeed, the novel methods and systems described herein may be embodied in a variety of other forms without departing from the spirit thereof. Accordingly, other combinations, omissions, substitutions and modifications will be apparent to the skilled artisan in view of the disclosure herein. Thus, the present invention is not intended to be limited by the preferred embodiments, but is to be defined by reference to the appended claims.

What is claimed is:

1. A computing system configured to allow a user to remotely unlock credit data of the user at each of a plurality of credit bureaus, wherein the credit data of the user can be unlocked at the plurality of credit bureaus only with authorization from the user, the computing system comprising:
   a touchpad computing device configured to receive an identifier of the user; and
   a communication interface configured to allow the touchpad computing device to communicate a credit data sharing authorization to a server computing system, wherein the server computing system stores a database indicating an identifier of the user in association with at least each of a first access protocol for a first credit bureau of the plurality of credit bureaus and a second access protocol for a second credit bureau of the plurality of credit bureaus;
   wherein the touchpad computing device is configured to:
      present a user interface indicating an option for the user to unlock the credit data of the user at each of the first credit bureau and the second credit bureau;
      detect input requesting unlocking of credit data of the user; and
      in response to detecting the input requesting unlocking of credit data of the user, transmit the credit data sharing authorization to the server computing system;
   wherein the server computing system is further configured to, in response to receiving the credit data sharing authorization from the touchpad computing device:
      determine, based on an association with the identifier of the user, a first access protocol associated with the first credit bureau;
      request unlocking of the credit data of the user at the first credit bureau using the first access protocol;
      determine, based on an association with the identifier of the user, a second access protocol associated with the second credit bureau; and
      request unlocking of the credit data of the user at the second credit bureau using the second access protocol.

2. The computing system of claim 1, wherein the server computing system is further configured to request locking of the credit data of the user at the first credit bureau when a predetermined time period from unlocking the credit data of the user has passed.

3. The computing system of claim 1, wherein the touchpad computing device comprises at least one of: a mobile device, a keypad, a card reader, a point of sale terminal, or a biometric data reader.

4. The computing system of claim 1, wherein the server computing system is further configured to receive, from the touchpad computing device, an identification of a third party.

5. The computing system of claim 4, wherein the server computing system is further configured to, in response to receiving, from the touchpad computing device, the identification of the third party:
- transmit a first access request for the first credit bureau to provide access to credit data of the user to the third party; and
- transmit a second access request for the second credit bureau to provide access to credit data of the user to the third party.

6. A computerized method for allowing a user to remotely unlock credit data of the user at each of a plurality of credit bureaus, wherein the credit data of the user can be unlocked at the plurality of credit bureaus only with authorization from the user, the computerized method comprising:
- coordinating communication between:
  - a server computing system storing a database indicating an identifier of the user in association with at least each of a first access protocol for a first credit bureau of the plurality of credit bureaus and a second access protocol for a second credit bureau of the plurality of credit bureaus;
  - a touchpad computing device, remotely located from the server and configured to receive an identifier of the user; and
- wherein the touchpad computing device is configured to:
  - present a user interface indicating an option for the user to unlock the credit data of the user at each of the first credit bureau and the second credit bureau;
  - detect input requesting unlocking of credit data of the user; and
  - in response to detecting the input requesting unlocking of credit data of the user, transmit a credit data sharing authorization to the server computing system;
- wherein the server computing system is further configured to, in response to receiving the credit data sharing authorization from the touchpad computing device:
  - determine, based on an association with the identifier of the user, a first access protocol associated with the first credit bureau;
  - request unlocking of the credit data of the user at the first credit bureau using the first access protocol;
  - determine, based on an association with the identifier of the user, a second access protocol associated with the second credit bureau; and
  - request unlocking of the credit data of the user at the second credit bureau using the second access protocol.

7. A non-transitory computer readable storage medium having computer-executable instructions stored thereon, the computer-executable instructions executable by a computing system having one or more hardware processors, wherein the computer-executable instructions are executable on the computing system in order to cause the computing system to perform operations comprising:
- coordinating communication between:
  - a server computing system storing a database indicating an identifier of the user in association with at least each of a first access protocol for a first credit bureau of the plurality of credit bureaus and a second access protocol for a second credit bureau of the plurality of credit bureaus;
  - a touchpad computing device, remotely located from the server and configured to receive an identifier of the user; and
- wherein the touchpad computing device is configured to:
  - present a user interface indicating an option for the user to unlock the credit data of the user at each of the first credit bureau and the second credit bureau;
  - detect input requesting unlocking of credit data of the user; and
  - in response to detecting the input requesting unlocking of credit data of the user, transmit a credit data sharing authorization to the server computing system;
- wherein the server computing system is further configured to, in response to receiving the credit data sharing authorization from the touchpad computing device:
  - determine, based on an association with the identifier of the user, a first access protocol associated with the first credit bureau;
  - request unlocking of the credit data of the user at the first credit bureau using the first access protocol;
  - determine, based on an association with the identifier of the user, a second access protocol associated with the second credit bureau; and
  - request unlocking of the credit data of the user at the second credit bureau using the second access protocol.

* * * * *